United States Patent [19]
Kanetsuku et al.

[11] Patent Number: 5,940,243
[45] Date of Patent: Aug. 17, 1999

[54] CARTRIDGE DIRECT ENTRY/EXIT STATION FOR LIBRARY APPARATUS

[75] Inventors: Toshihito Kanetsuku; Kenichi Utsumi, both of Kawasaki; Takahisa Miyamoto, Inagi; Tomoyuki Okada, Inagi; Yuji Katoh, Inagi; Osamu Ohmori, Kawasaki, all of Japan

[73] Assignee: Fujitsu Limited, Kawasaki, Japan

[21] Appl. No.: 09/021,665

[22] Filed: Feb. 10, 1998

[30] Foreign Application Priority Data

Feb. 28, 1997 [JP] Japan .................................. 9-046192

[51] Int. Cl.⁶ .................................................. G11B 15/68
[52] U.S. Cl. ................................................ 360/92; 369/36
[58] Field of Search ........................ 360/92, 94; 369/34, 369/36

[56] References Cited

U.S. PATENT DOCUMENTS

| | | | |
|---|---|---|---|
| 5,231,552 | 7/1993 | Schneider et al. ........................ | 360/92 |
| 5,442,500 | 8/1995 | Hidano et al. ........................ | 360/92 X |
| 5,703,843 | 12/1997 | Katsujama et al. ........................ | 369/34 |
| 5,731,926 | 3/1998 | Gallo et al. ............................ | 369/36 X |
| 5,781,367 | 7/1998 | Searle et al. .............................. | 360/92 |

*Primary Examiner*—John H. Wolff
*Attorney, Agent, or Firm*—Greer, Burns, & Crain, Ltd.

[57] ABSTRACT

A cartridge direct entry/exit station for a library apparatus, the library apparatus transferring selected cartridges to a drive unit through a transferring mechanism for processing of information recorded therein. The cartridge direct entry/exit station is configured to accommodate a magazine storing a plurality of cartridges, thereby facilitating the simultaneous entry or exit of plural cartridges. The cartridge direct entry/exit includes a communication space defined to establish direct communication between an operating space in the interior of the library apparatus and an external space of the library apparatus, and a magazine holding mechanism for holding the magazine in a state where an insertion/removal side of the cartridges faces the operating space.

14 Claims, 38 Drawing Sheets

CARTRIDGE DIRECT ENTRY/EXIT STATION FOR LIBRARY APPARATUS

The present invention relates to a cartridge direct entry/exit station for use in a library apparatus that stores a number of cartridges such as magnetic tape cartridges and optical disc cartridges. In particular, the present invention relates to a library apparatus including a cartridge direct entry/exit station for receiving a magazine accommodating a plurality of cartridges. In this manner, the insertion and/or removal of plural cartridges simultaneously is possible.

BACKGROUND OF THE INVENTION

In general, a library apparatus, such as a magnetic tape library apparatus, includes an access unit having a cartridge entry/exit station for loading and unloading a storage medium cartridge, a drive unit for performing recording/reproduction of data to and from the storage medium, and an accessor robot (accessor) for conveying the cartridge between the access unit and the drive unit.

The library apparatus can be equipped with a drum unit for housing a large number of cartridges, and a cartridge direct entry/exit station (DEE). The DEE enables the simultaneous entry or exit of a plurality of cartridges into the drum unit.

Using the DEE, an operator enters a magazine containing a plurality of cartridges into the outer circumference of a magazine drum in the drum unit from the external side (outside) of the apparatus. In order to access a cartridge from the magazine, the magazine drum must be rotationally driven so that the desired cartridge housed in the magazine is turned to face inside of the apparatus. Likewise, a reverse process is used for removing cartridges. Namely, the magazine drum must be rotationally driven so that the magazine to be discharged is turned to face towards the outside of the apparatus.

However, the structure of a library apparatus using the conventional DEE is unduly large and complex. In particular, a drive unit (motor) is required to rotate the drum unit and the drum unit must be configured for rotation.

Accordingly, one object of the present invention is to provide a cartridge direct entry/exit station facilitating the simultaneous entry/exit of a plurality of cartridges, while also facilitating an overall reduction in the size and complexity of the associated apparatus.

Another object of the invention is to ensure the safety of an operator by preventing the operator from inadvertently reaching the operating space for the transferring mechanism.

Another object of the invention is to provide a simple arrangement to prevent the insertion of a cartridge in an incorrect orientation.

Another object of the invention is to provide an arrangement to ensure that the magazine is always positioned within a constant allowable range with respect to the body of the library apparatus.

Yet another object of the invention is to provide a cartridge direct entry/exit station that allows for active maintenance while maintaining the safety of the operator.

These and other objects of the present invention are discussed or will become apparent from the following detailed description of the invention.

SUMMARY OF THE INVENTION

The above objects are met or exceeded by the present cartridge direct entry/exit station configured to receive a magazine holding a plurality of cartridges. The magazine and cartridges do not rotate after installation in the entry/exit station. In particular, the direct entry/exit station of the present invention includes a communication space defined to establish direct communication and connection between an operating space for the transferring mechanism in the interior of the library apparatus and an external space outside of the library apparatus. This is accomplished by locating the communication space adjacent to the operating space and the outside. Moreover, the communication space has no substantial mechanisms with moving parts, which would require a larger area for the communication space. The direct entry/exit station further includes a magazine holding mechanism for holding the magazine in a state where an insertion/removal side of the cartridges is oriented to face the operating space within the communication space.

The direct communication and connection allow the transferring mechanism directly to access cartridges inserted into the DEE via a magazine, and therefore the simultaneous entry or exist of a plurality of cartridges is possible with a simple and compact arrangement.

According to one embodiment the cartridge direct entry/exit station can include a shutter for covering the magazine held by the magazine holding mechanism from the operating space side, and a drive mechanism for driving the shutter into an open or closed condition. The shutter is configured to reduce the potential of operator injuries by having the drive mechanism position the shutter in a closed state when the magazine is detached for replacement.

According to another embodiment, the cartridge direct entry/exit station can include a first shutter locking mechanism for inhibiting an opening operation of the shutter when the magazine is not engaged with the magazine holding mechanism. Moreover, the first shutter locking mechanism allows an opening operation of the shutter when the magazine is fully engaged. The cartridge direct entry/exit station can further include a magazine locking mechanism for inhibiting a detaching operation of the magazine when the shutter is in an open condition. Correspondingly, the cartridge direct entry/exit station permits the detachment of the magazine when the shutter is in a closed condition.

The first shutter locking mechanism inhibits the opening operation of the shutter if the magazine is detached from the magazine holding mechanism. In contrast, the magazine locking mechanism inhibits the magazine from being detached while the shutter is open. Accordingly, the first shutter locking mechanism and the magazine locking mechanism prevent the operator from inserting a hand or the like into the operating space of the transferring mechanism.

Furthermore, the magazine may be configured to restrict entry of improperly oriented cartridges. In particular, the magazine may be provided with an inner surface configured to engage with a chamfered portion of a oriented cartridge. The attempted insertion of an improperly oriented cartridge is signaled by the interference between the cartridge and the inner surface of the magazine.

According to another embodiment, the storage medium cartridge is a magnetic tape cartridge, and includes a leader block for drawing out the magnetic tape. Further, the magazine is equipped with a contact portion for reseating the leader block at the time of insertion of the cartridge. Moreover, leader block related errors are reduced because the projection reseats the leader block each time a cartridge is inserted.

Furthermore, the cartridge direct entry/exit station can include a shutter unit having a shutter, and a mechanical unit fitted inside the shutter unit. The mechanical unit includes the drive mechanism and the magazine holding mechanism, and is configured to be detachable from the shutter unit.

The cartridge direct entry/exit station can also include a second shutter locking mechanism for inhibiting an opening operation of the shutter when the mechanical unit is detached from the shutter unit. The cartridge direct entry/exit station allows the shutter to be opened only when the mechanical unit is attached to the shutter unit. This embodiment of the DEE may include a mechanical unit locking mechanism for inhibiting a detaching operation of the mechanical unit from the shutter unit when the shutter is in an open condition. The mechanical unit locking mechanism allows the mechanical unit to be detached from the shutter unit only when the shutter is in a closed condition.

The above aspects ensure that the mechanical unit may only be detached when the shutter is closed. Accordingly, the mechanical unit may be replaced without stopping operation of the transferring mechanism. In particular, the above aspects facilitate the active maintenance of the library apparatus without sacrificing the safety of the operator.

BRIEF DESCRIPTION OF THE DRAWINGS

The preferred embodiments of the present invention will be described herein with reference to the drawings in which.

DESCRIPTION OF THE PREFERRED EMBODIMENTS

Arrangement of a Library Apparatus

Figure 2:
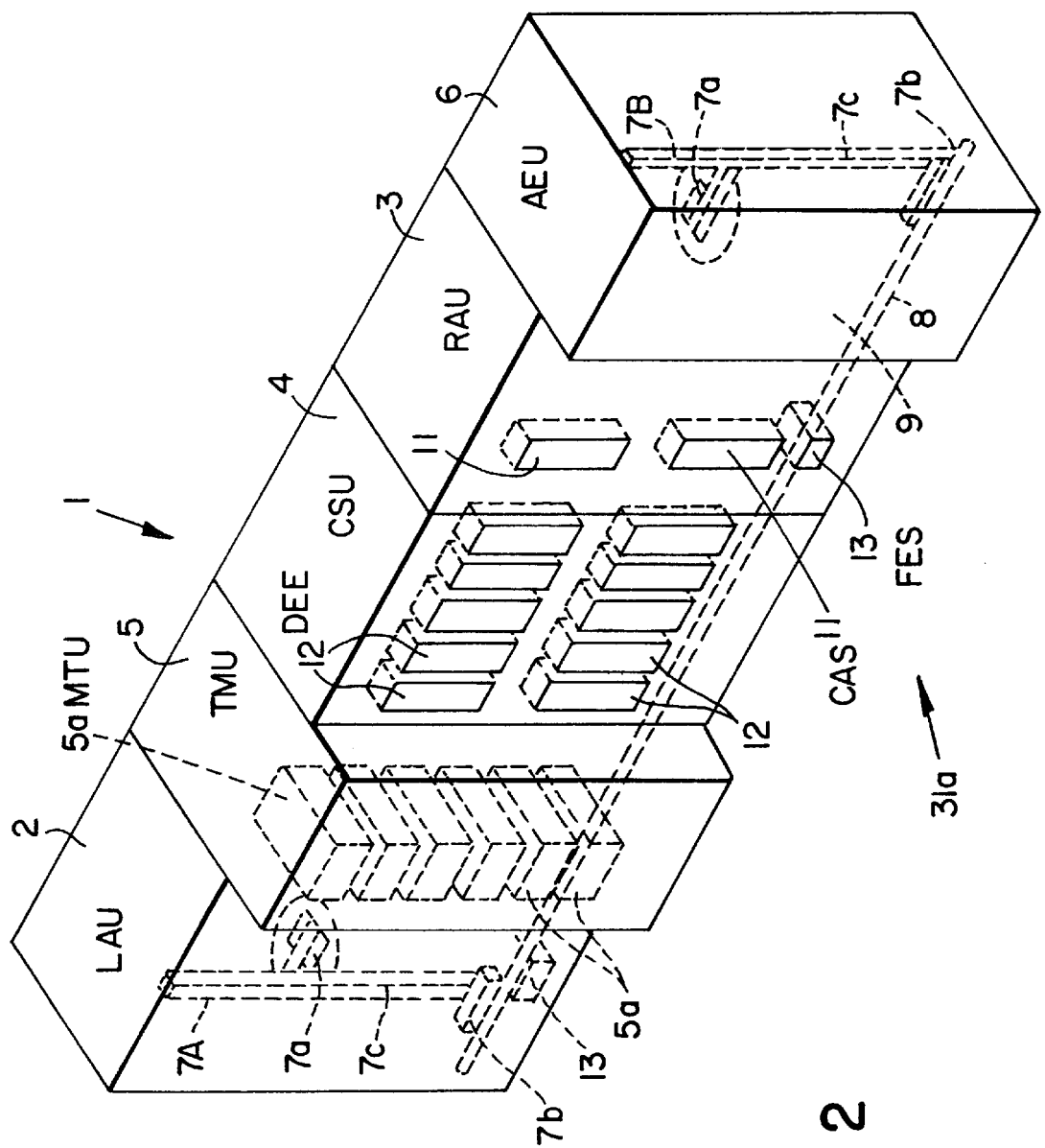
FIG. 2 is a perspective view illustratively showing the overall form of a library apparatus according to the present invention.

Referring now to FIG. 2, a library apparatus 1 according to one embodiment of the present invention is shown in perspective view. The library apparatus 1 stores a number of cartridges 10, each cartridge accommodating a storage medium such as magnetic tape. The library apparatus performs recording and reproduction processing to/from each cartridge 10. The apparatus 1 has left and right accessor units (LAU, RAU, respectively) 2, 3, a cartridge storage unit 4 (CSU), a drive unit (tape mount unit or TMU) 5 and an accessor extend unit 6 (AEU), and are in a connected relation to each other. Transferring mechanisms or accessor robots 7A, 7B (accessors) are provided on left and right sides of the apparatus 1. The accessors 7A, 7B transfer the cartridge 10 within a passage 9 defined within units 2–6.

The LAU 2 and RAU 3/AEU 6 function as garages for the accessors 7A, 7B, respectively. A pair of upper and lower cartridge entry/exit stations 11 (Cartridge Access Station; hereinafter CAS) and a cartridge forced exit station (FES) 13 are provided on the front of the RAU 3. The CAS facilitate the entry or exit of the cartridge 10 into or from the library apparatus 1; whereas, the (FES) 13 is provided for forcibly discharging a defective cartridge out of the library apparatus. In addition, another FES 13 is placed on the front of the LAU 2.

According to one embodiment, for example, the upper CAS 11 serves for only the entry of the cartridge while the lower CAS 11 acts for only the exit of the cartridge, and their structures are the same.

The CSU 4 stores a large number of cartridges 10, and according to the embodiment shown, includes five cartridge direct entry/exit stations 12 (hereinafter DEE) on the upper side and five DEEs 12 on the lower side. Each DEE 12 is configured to receive a magazine 15 storing a plurality of cartridges 10; thereby permitting the simultaneous entry or exit of the plurality of cartridges 10 into or from the library apparatus 1 (see FIGS. 1 and 3). The present invention relates to the DEE 12, and a detailed description will be made later with reference to FIGS. 1 and 3–36.

The TMU 5 has a plurality of magnetic tape drive units 5a (processing sections; hereinafter MTU), each of which performs recording and reproduction of data onto/from the cartridge 10 transferred by the accessor 7A or 7B.

A power source (not shown) for supplying an operating power to the accessor 7A or 7B and a controller (not shown) for control of the accessors 7A, 7B is provided in the AEU 6.

The units 2 to 6 are placed in a coupled relation to one another such that their respective rear surfaces contact a wall surface or the like, and cooperatively define the library apparatus 1. The accessors 7A, 7B travel within an operating space 9 (accessor passage) which penetrates the units 2 to 6. A rail 8 for guiding the respective accessors 7A, 7B is placed on the bottom surface of the operating space. Each of the accessors 7A, 7B has a hand mechanism 7a for holding the cartridge 10, a carriage 7b for allowing each accessor 7A or 7B to move horizontally along the rail 8, and a vertical column 7c for vertically guiding the hand mechanism 7a on the carriage 7b.

In the library apparatus 1 thus constructed, a selected cartridge 10 held in the CAS 11 (of the RAU 3) or the DEE 12 (of the CSU 4), is grasped by the hand mechanism 7a of the accessor 7A or 7B and conveyed by the accessor 7A or 7B through the operating space 9 and inserted into the MTU 5a (of the TMU 5).

After the recording/reproduction processing on the cartridge 10, the cartridge 10 is gripped by the hand mechanism 7a and conveyed by the accessor 7A or 7B through the operating space 9 to the CAS 11 or the DEE 12 and placed at a given location (rack, cell) of the CAS 11 or the DEE 12.

Arrangement of a Cartridge Direct Entry/Exit Station (DEE) And A Magazine

Figure 1:
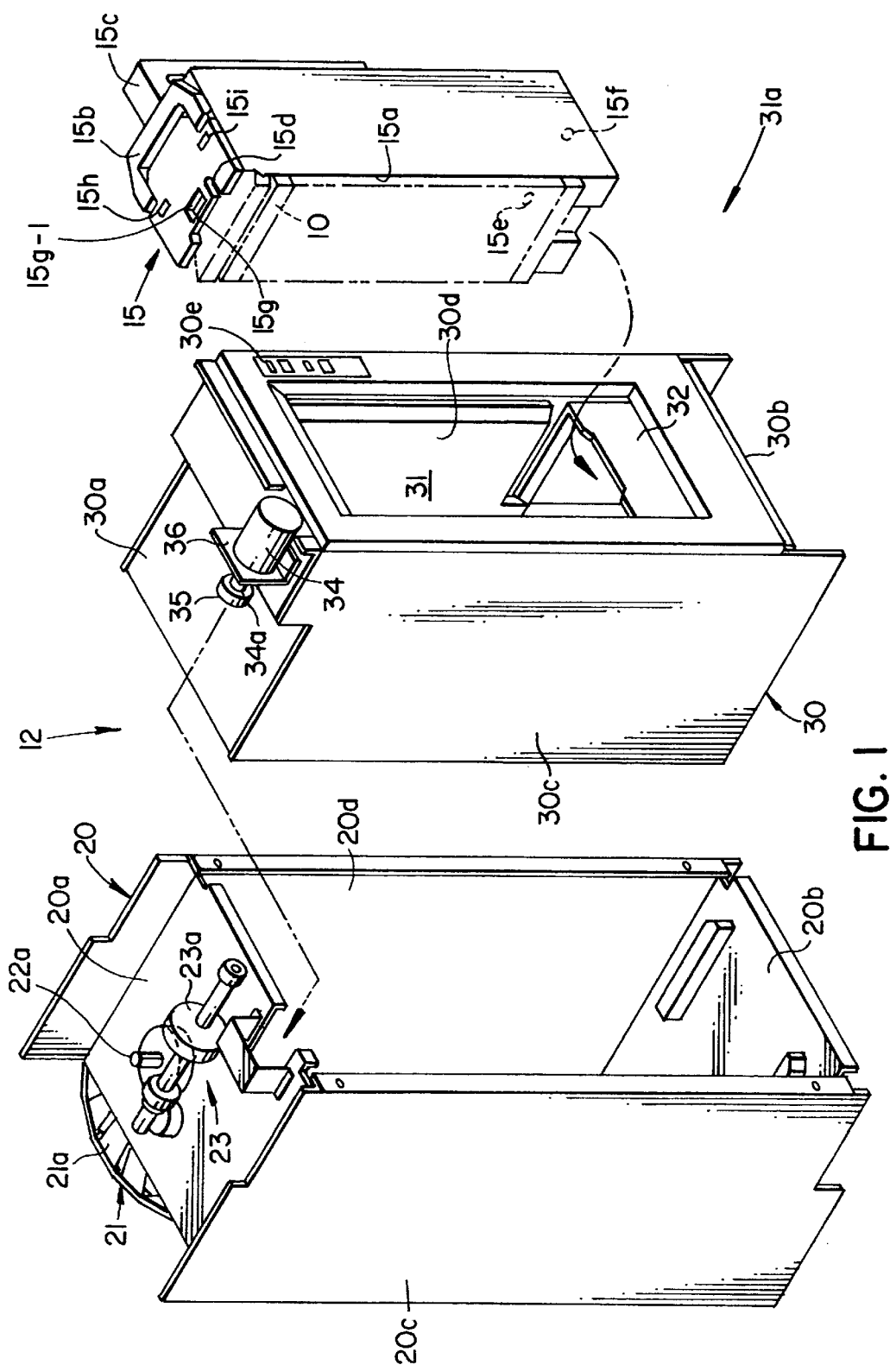
FIG. 1 is an exploded perspective view showing a basic arrangement of a cartridge direct entry/exit station (DEE) of a library apparatus and a magazine according to an embodiment of the present invention.

FIG. 1 is an exploded perspective view illustratively showing the basic arrangement of the DEE 12 of a library apparatus 1 according to the present invention and shows the magazine 15. Moreover, FIG. 3 is a vertical cross-sectional view showing the DEE 12, and FIG. 4 is a plan view showing a shutter drive mechanism in the DEE 12.

Description of a Magazine

Figure 3:
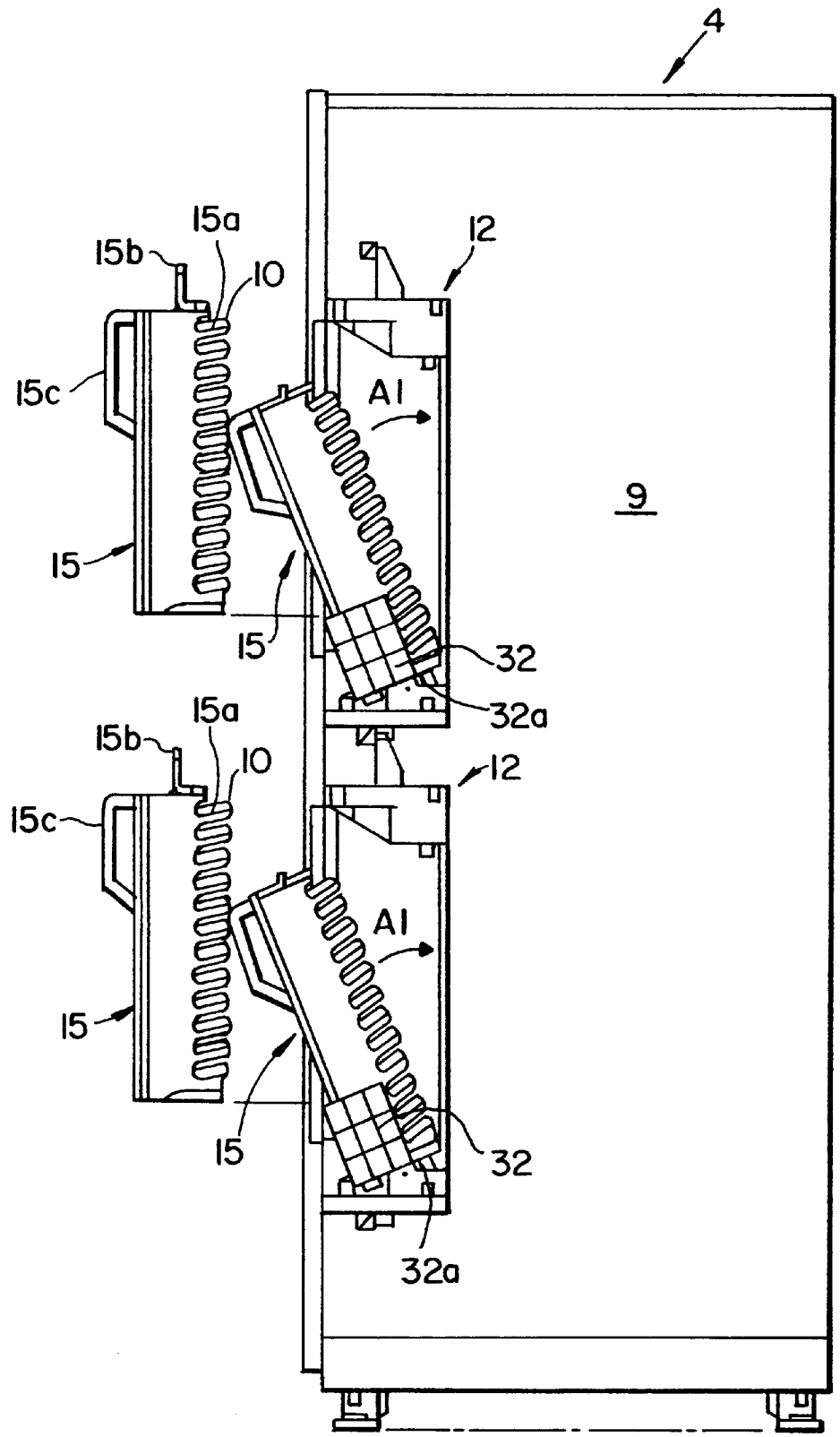
FIG. 3 is a vertical cross-sectional view showing a DEE fitting condition and a procedure of entering a magazine into the DEE in the library apparatus according to the present invention.
Figure 4:
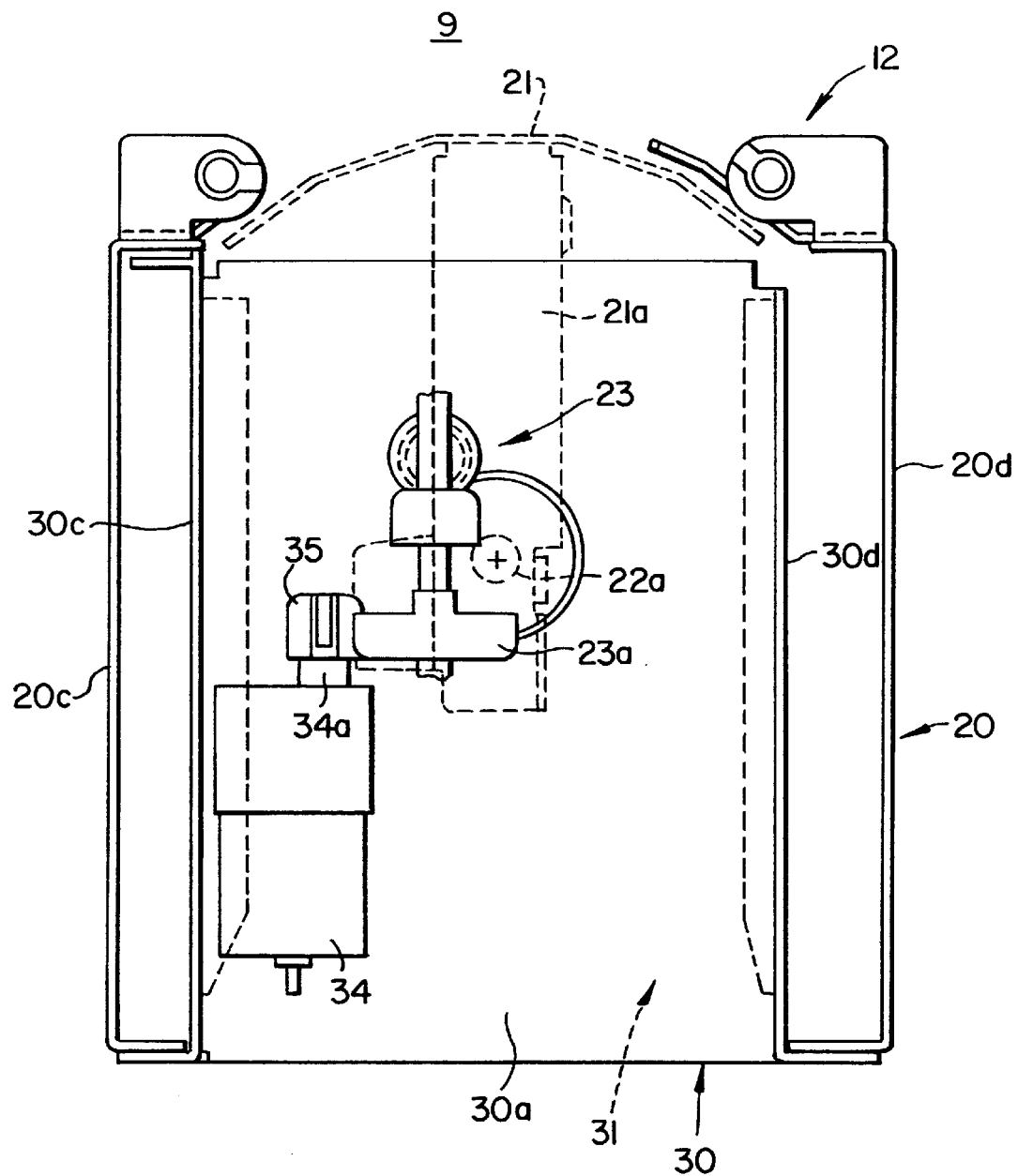
FIG. 4 is a plan view showing a shutter drive mechanism according to the present invention.

As shown in FIGS. 1 and 3, the magazine 15 is provided with cells 15a for accepting the cartridges 10. The insertion and removal of the cartridge 10 into and from each cell 15a can be done only from the front of the magazine 15.

Fitted onto the top surface of the magazine 15 is an upper handle 15b for use by an operator in carrying the magazine 15. A proximal portion of the upper handle 15b is rotatably supported on the magazine 15 so that the upper handle 15b is pulled to a raised position only when used. Further, fitted onto the rear surface of the magazine 15 is a setting handle 15c for use by an operator in inserting or removing the magazine 15 in/from the DEE 12.

In addition, on the top surface of the magazine 15 there is formed a positioning groove 15d that assumes an engaging relation to a mechanical unit 30 side magazine positioning pin 17 (see FIGS. 25 to 27) when the magazine 15 is set in the DEE 12. Positioning holes 15e, 15f (see FIGS. 1 and 29) are formed in a bottom portion of the magazine 15. Moreover, a magazine tray 32 (see FIGS. 28, 30 and 31) is provided with positioning pins 32b, 32c. The correct orientation of the magazine 15 on the magazine tray 32 is assured by the engagement of the positioning pins 32b, 32c within the positioning holes 15e, 15f. An alternative positioning structure using a groove 15d and positioning holes 15e, 15f will be described in detail later with reference to FIGS. 25 to 31.

Figure 25:
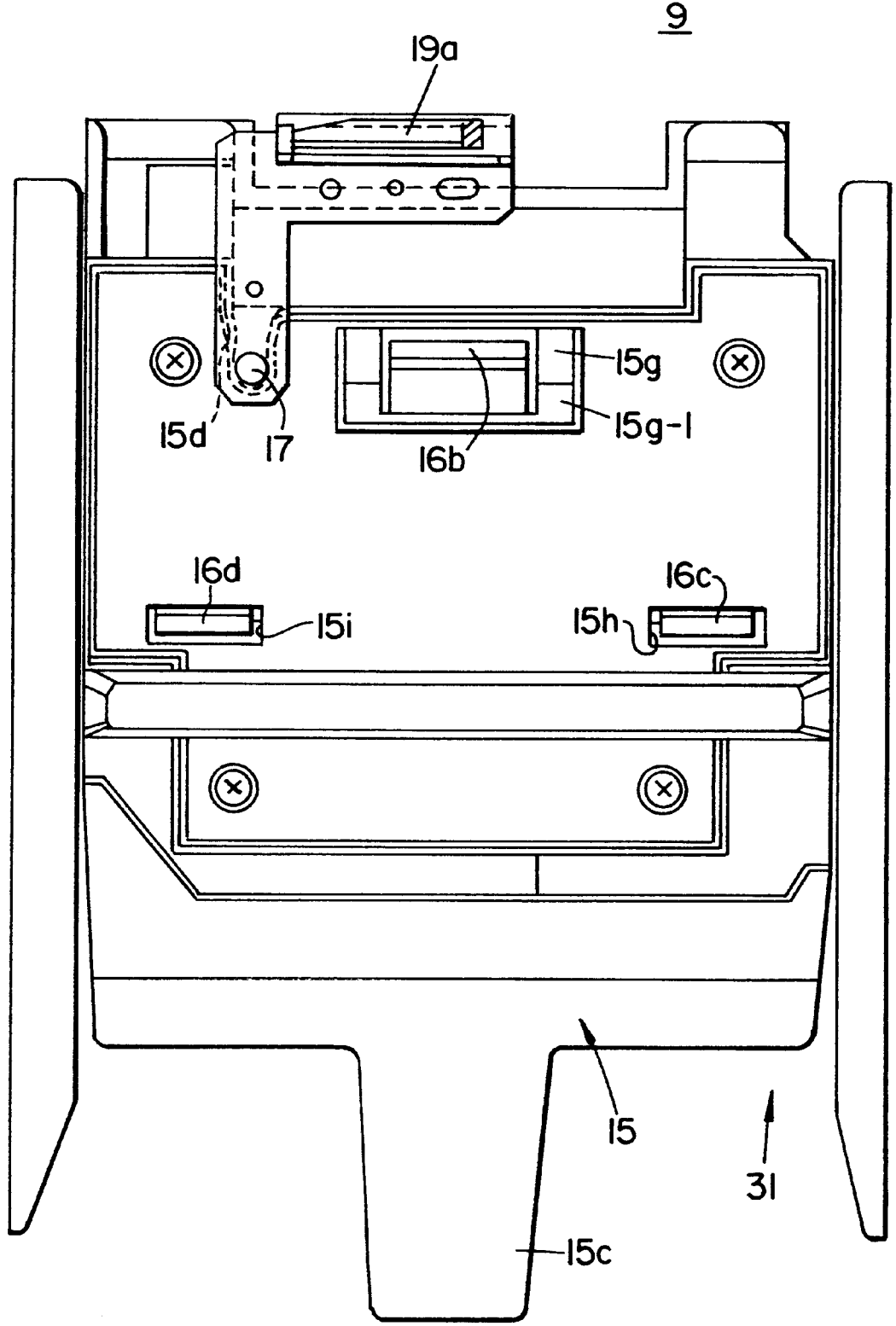
FIG. 25 is a plan view showing a positioning structure on the upper side of the magazine according to the present invention.

The top surface of the magazine 15 is further provided with three rectangular holes 15g, 15h and 15i, as shown in FIGS. 1 and 25.

A magazine holding lever 28a of a magazine holding mechanism (see FIGS. 10 to 13) engages with the hole 15g when the magazine 15 is set in the DEE 12. The hole 15g has a tapered surface 15g-1 formed at its magazine rear surface side portion to be inclined upwardly toward the magazine rear surface side.

Although not shown in FIG. 1, a swingable interlocking lever 16 is formed in an upper section of the magazine 15

(shown in FIGS. 11 to 20). An end portion 16b of the interlocking lever 16 is engaged within the hole 15g. Further, end portions 16c, 16d of the interlocking lever 16 are configured to protrude upwardly from the holes 15h, 15i, respectively.

Figure 17:
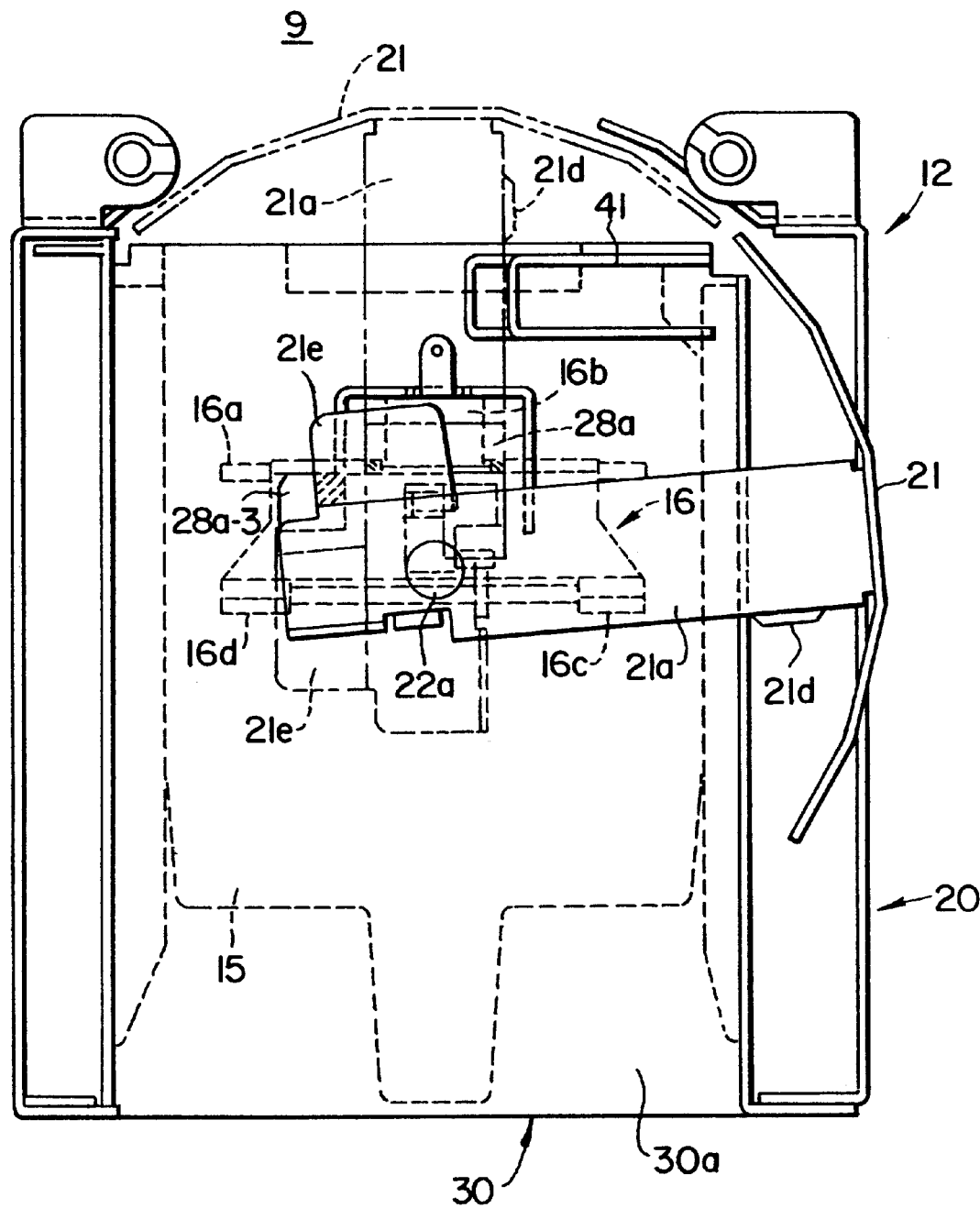
FIG. 17 is a plan view showing the magazine locking mechanism (locking condition and unlocking condition) according to the present invention.
Figure 18:
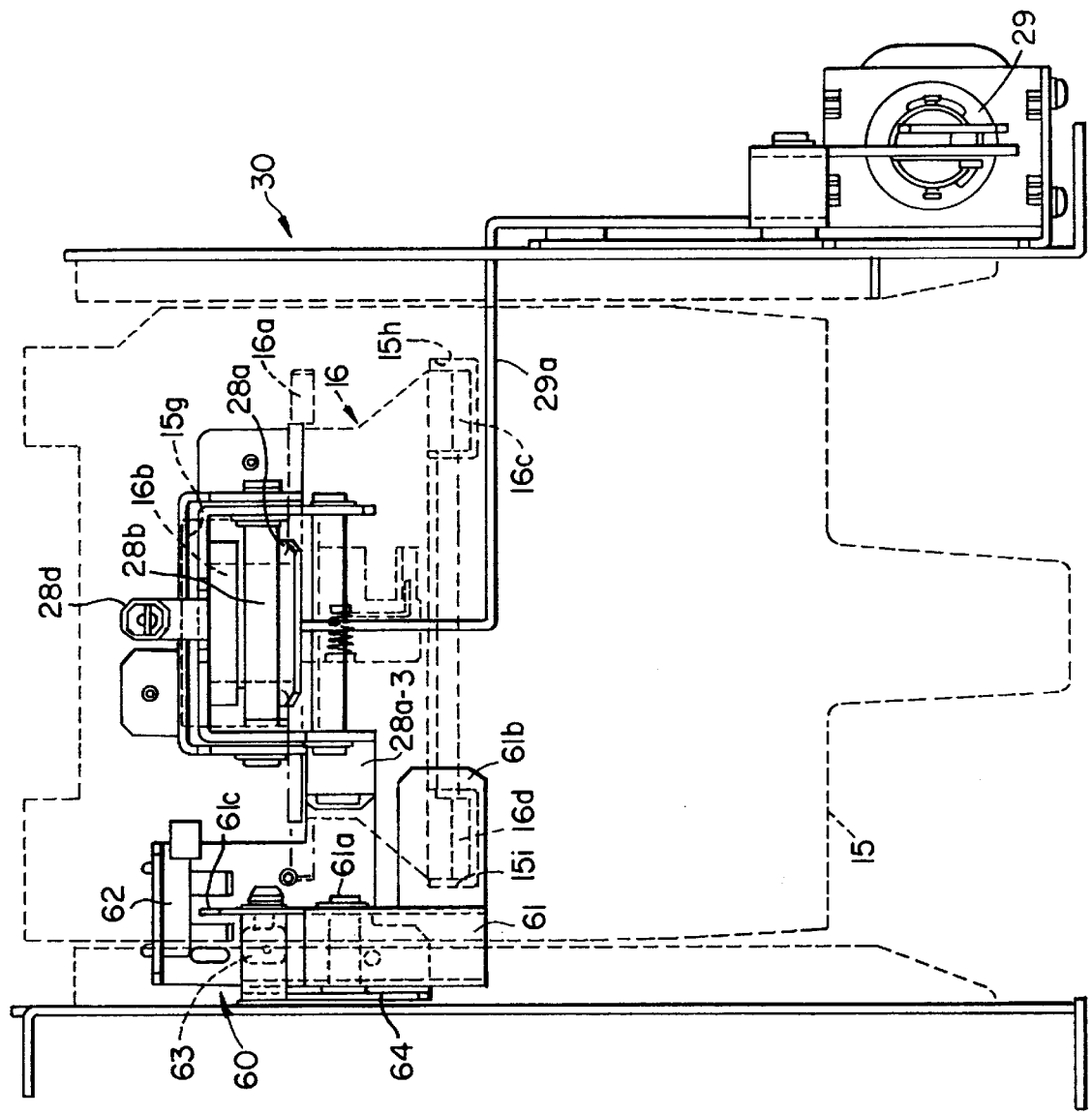
FIG. 18 is a plan view showing a magazine set condition detecting mechanism according to the present invention.

The two end portions 16c, 16d branch off symmetrically from the end portion 16b of the interlocking lever 16 (FIGS. 17 and 18). Further, the interlocking lever 16 is swingable such that a portion close to the end portion 16b and between the end portion 16b and the two end portions 16c, 16d is supported by a rotary shaft 16a.

Figure 11:
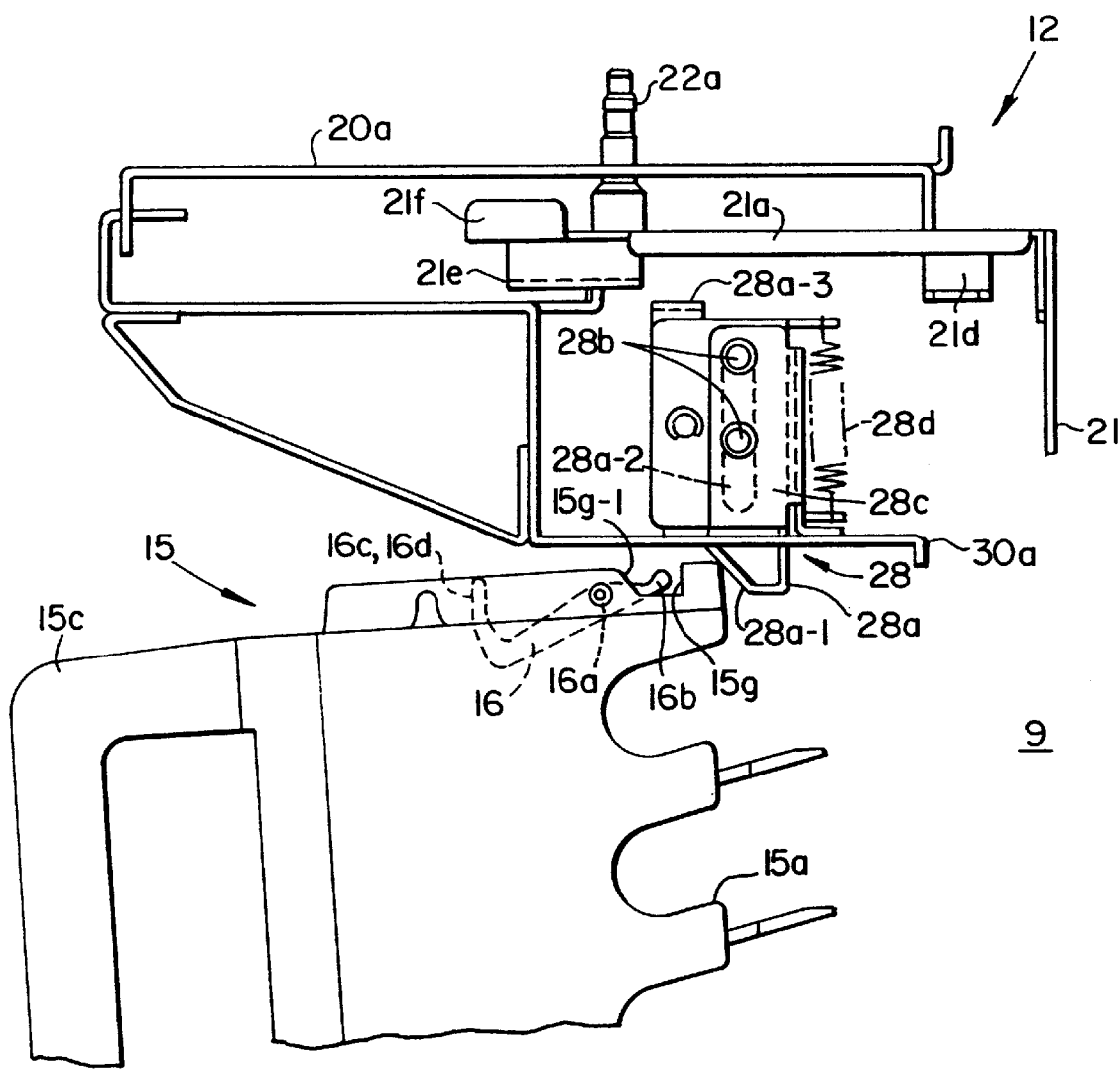
FIG. 11 is a side elevational view showing the magazine holding mechanism according to the present invention.
Figure 12:
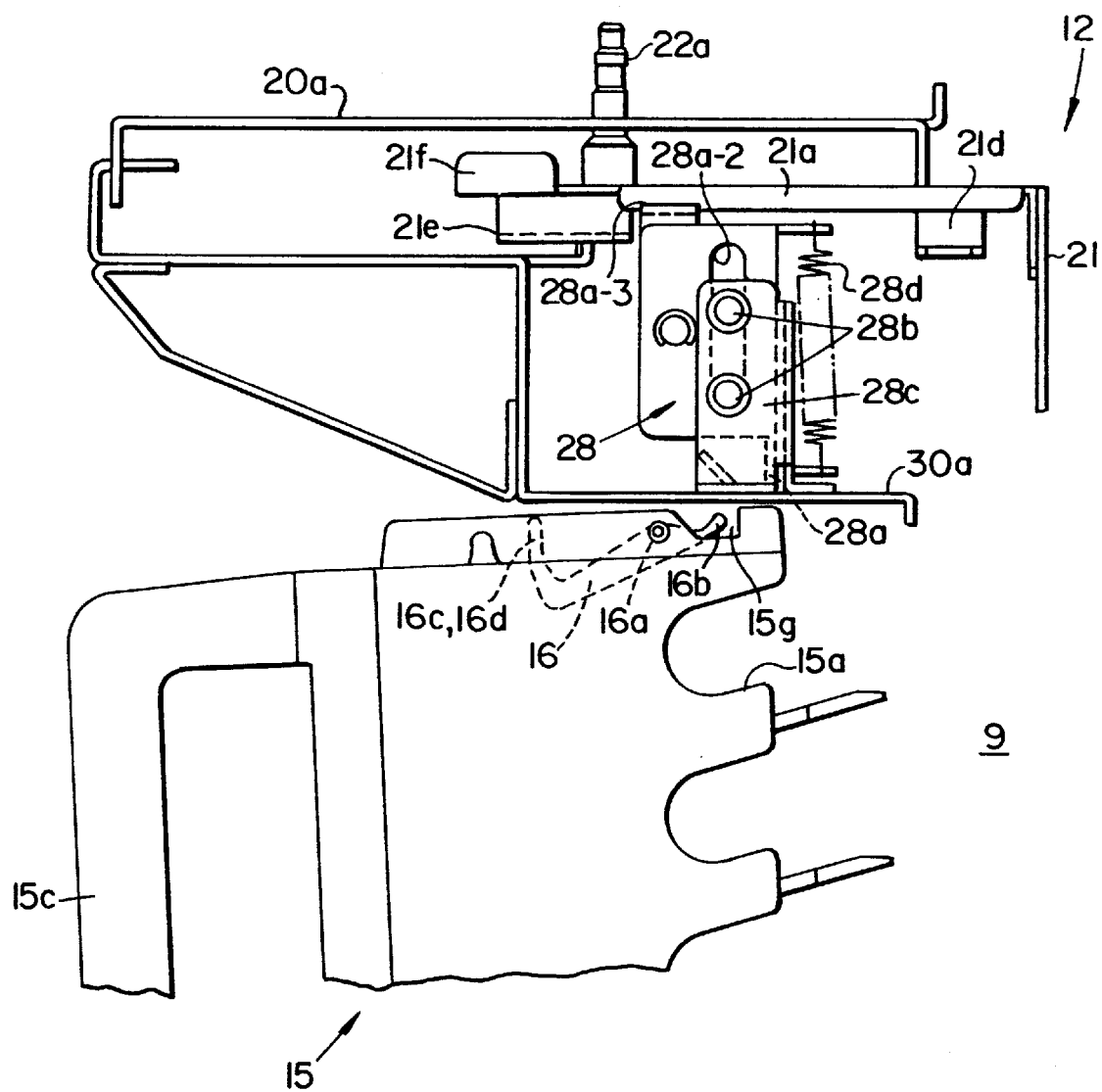
FIG. 12 is a side elevational view showing the magazine holding mechanism according to the present invention.

Accordingly, when the magazine holding lever 28a is not in the hole 15g, the interlocking lever 16 rotates about the rotary shaft 16a due to its own weight and is held in a state where its end portions 16c, 16d take a lower position (see, FIGS. 11 and 12). Further, the end portion 16b of the interlocking lever 16 is situated in the hole 15g while the end portions 16c, 16d thereof are located in the holes 15h, 15i in a plane generally equal to the top surface of the magazine 15.

On the other hand, when the magazine holding lever 28a is put in the hole 15g, as shown in FIGS. 13, 15, 16 and 20, the end portion 16b of the interlocking lever 16 is pressed downwardly by the magazine holding lever 28a, and the interlocking lever 16 rocks along the rotary shaft 16a so that the end portions 16c, 16d are held in a state of protruding upwardly from the holes 15h, 15i.

The interlocking lever 16 is used for actuating a first shutter locking mechanism 40 and a magazine set condition detecting mechanism 60 as will be described later with reference to FIGS. 11 to 20. In particular, the end portions 16c, 16d are, respectively, brought into contact with a contact surface 41b of a lever 41 (first shutter locking mechanism 40) and a contact surface 61b of a sensor lever 61 (magazine set condition detecting mechanism 60).

Additionally, the magazine 15 is provided with a structure for preventing the erroneous insertion of the cartridge 10 and a structure for pushing the leader block 10a in the cartridge 10 (which will be described later with reference to FIGS. 21 to 24).

Description of the Basic Arrangement of the DEE

As shown in FIGS. 1, 3 and 4, the DEE 12 is broken into two sections: a shutter unit 20 and a mechanical unit 30. The mechanical unit 30 is detachably fitted inside the shutter unit 20. A communication space 31 is established adjacent to and in direct communication and connection between the operating space 9 for the accessors 7A, 7B within the library apparatus 1 (CSU 4) and an external space 31a outside of the library apparatus 1 (CSU 4).

Figure 5:
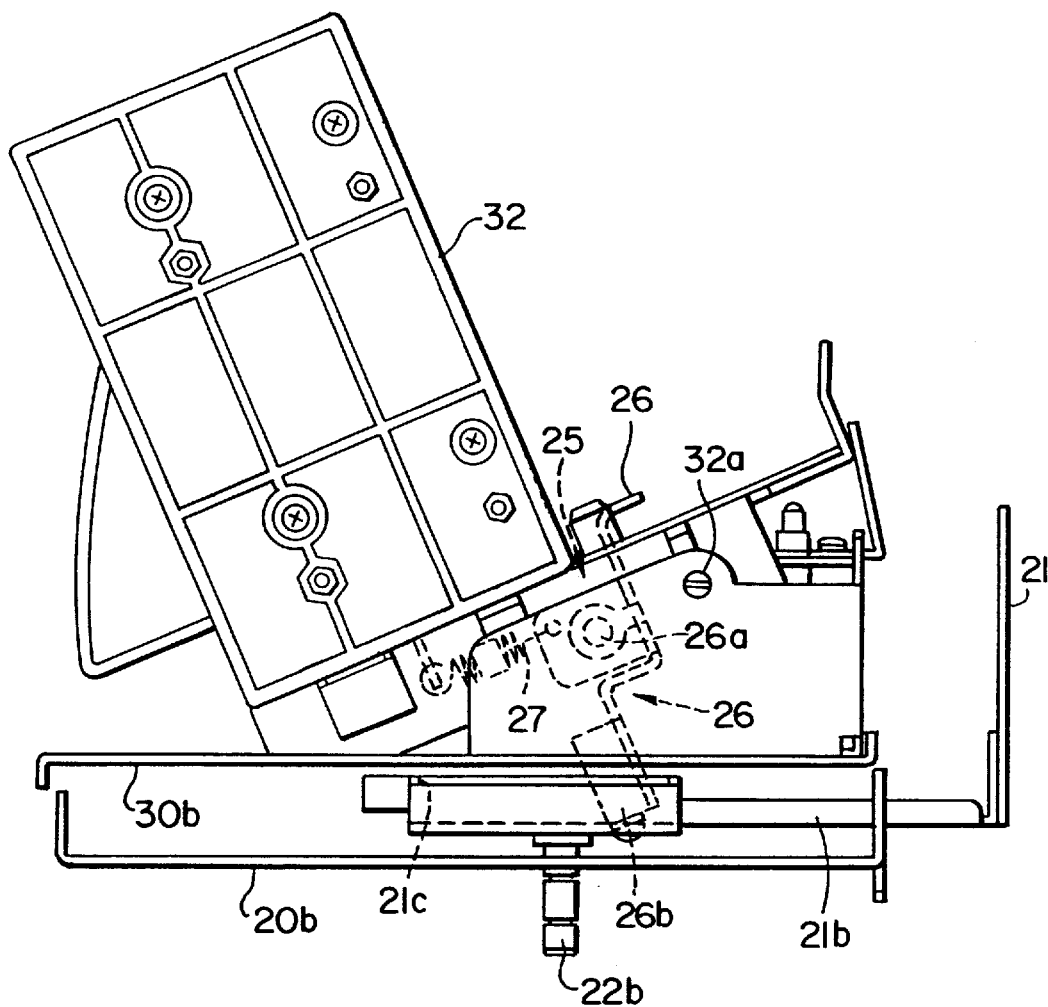
FIG. 5 is a side elevational view showing a first shutter locking mechanism (locking condition) according to the present invention.

A tray 32 configured to support the magazine 15 is attached to a lower portion of the mechanical unit 30 to be rotatable about a tray supporting shaft 32a (see FIGS. 3 and 5 to 8). The tray 32 is designed to rotate (when not bearing the magazine 15) about the tray supporting shaft 32a due to the force of its own weight. Notably, the tray 32 (without the magazine 15) is designed to rotate so as to be inclined to the external space side (the state as shown in FIG. 3 or 5).

Correspondingly, in a state where the tray 32 supports the magazine 15, the tray 32 is rotated along the tray supporting shaft 32a toward the operating space 9. The magazine 15 is supported on the tray such that the insertion/removal side of the cartridge 10 faces the operating space 9. Moreover, in this state the communication space 31 is closed by the rear surface of the magazine 15 from the external space side.

Figure 36:
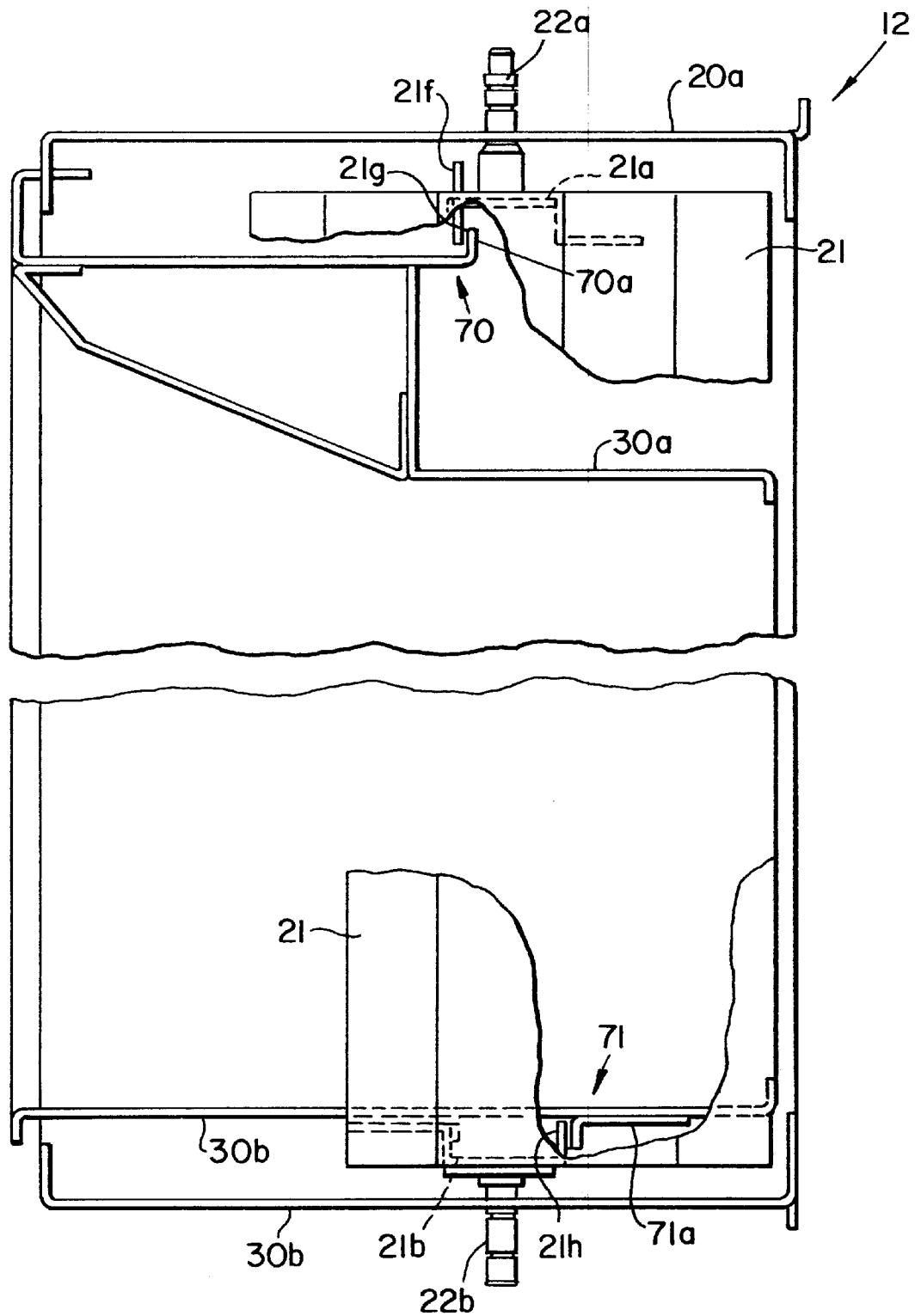
FIG. 36 is a partially broken side elevational view showing the locking conditions of the mechanical unit locking mechanism on the upper and lower sides of the shutter according to the present invention.

Further, the shutter unit 20 is equipped with a shutter 21 which can cover the magazine 15 while the magazine is held within the communication space 31. As shown in FIGS. 1 or 36, the shutter 21 is fitted through a pair of upper and lower supporting plates 21a, 21b and upper and lower rotary shafts 22a, 22b to be rotatable about a vertical shaft. That is, the supporting plates 21a, 21b of the shutter 21 are rotatably supported on a top board 20a and bottom board 20b of the mechanical unit 20 through the rotary shafts 22a, 22b, respectively.

In FIG. 1, the supporting plate 21 for supporting the lower side of the shutter 21 and the rotary shaft 22b are omitted. FIG. 1 illustrates a state (closed state) in which the communication space 31 (magazine 15) is covered by the shutter 21 from the operating space 9 side. However, the communication space 31 may be opened to the operating space 9 to facilitate access to the magazine 15 by rotationally driving the shutter 21 clockwise when viewed from above (FIG. 17).

A gear mechanism 23 for rotationally driving the shutter is attached on the top board 20a of the shutter unit 20. The gear mechanism includes a plurality of gears connected to the rotary shaft 22a, and a drive motor (shutter motor) 34 is placed through a fitting plate 36 on the mechanical unit 30.

The drive motor 34 has a gear 35 fixedly secured onto its rotary drive shaft 34a. In the fully assembled state, i.e., when the mechanical unit 30 is fitted in the shutter unit 20, the gear 35 and a gear 23a (portion of the gear mechanism 23) mesh with each other as shown in FIG. 4. The meshing of these gears constitutes a shutter drive mechanism. In particular, the rotational driving force from the drive motor 34 can be transferred to the shutter 21 through the rotary drive shaft 34a, the gear 35, the gear mechanism 23 and the rotary shaft 22a. Accordingly, the shutter 21 may be driven between opened and closed conditions by switching the rotating direction of the drive motor 34.

In a fully assembled state, i.e., where the mechanical unit 30 is fitted in the shutter unit 20, the supporting plate 21 a is placed between the top board 20a of the shutter unit 20 and the top board 30a of the mechanical unit 30. Further, the supporting plate 21b is located between the bottom board 20b of the shutter unit 20 and the bottom board 30b of the mechanical unit 30. In the open condition, the shutter 21 is situated outside the right-hand board 30d of the mechanical unit 30 (see the solid line in FIG. 17). In FIG. 4, the illustrations of the top board 20a of the shutter unit 20 and the shutter 21 are omitted to show clearly the mechanism for driving the shutter 21.

The mechanical unit 30 is provided with various kinds of locking mechanisms which will be described later with reference to FIGS. 5 to 17 and 32 to 36. The mechanical unit is also provided with a magazine set condition detecting mechanism 60 (see FIGS. 18 to 20) and a structure for determining a holding position of the magazine 15, i.e., the holding position of the magazine 15 by the tray 32 (see FIGS. 25 to 31). In addition, the shutter 21 is provided with a second shutter locking mechanism 45 (see FIGS. 32 and 33). In FIGS. 1, 3 and 4, the mechanisms and structures are omitted.

In FIG. 1, reference numerals 20c and 20d, respectively, represent right- and left-hand side boards of the shutter unit 20. Numeral 30c designates a left-hand board of the mechanical unit 30, and numeral 30e denotes a control panel placed on the front surface of the mechanical unit 30. The control panel 30e has a LED (MAGAZINE REMOVE) which lights when the magazine 15 is detached from the DEE 12, and a switch (REMOVE SW) actuated when the magazine 15 is detached therefrom.

An explanation of the process of inserting the magazine 15 from the DEE 12 will now be made with reference to FIG. 3. The operator puts the magazine 15 accommodating the cartridges 10 on the tray 32 such that the magazine is inclined toward the external space side. Then, the operator rotates the magazine in a direction of arrow A1 such that the cartridge assumes a generally vertical position with respect to the tray 32. Moreover, as the magazine is rotated, the magazine lever 28a engages the hole 15g in the top surface of the magazine 15 so that the magazine 15 is held in the communication space 31. In this state, the insertion/removal side of the cartridge 10 faces the operating space 9 allowing the cartridges 10 to be taken out by the accessors 7A, 7B from the operating space side.

The process of removing the magazine 15 is reverse of the process of inserting the magazine 15. First, the operator actuates the switch on the control panel 30e to release the magazine holding lever 23a from engagement with the hole 15g. Then, the operator grasps the handle 15c of the magazine 15 to pull out the magazine 15 from the tray 32. A detailed description of the entry/exit operation of the DEE 12 will be made later with reference to the flow charts of FIGS. 37 and 38. In addition, the disengaging of the magazine holding lever 28a from the hole 15g is made by exciting a solenoid 29 (see FIGS. 10 and 18) as will be described later.

It should further be noted that the DEE is designed such that the shutter 21 is positioned in the closed condition whenever the magazine 15 is detached. This construction enhances operator safety by preventing the operator from inserting a hand or the like into the operating space 9.

Moreover, according to one aspect of the present invention, the shutter 21 opening and closing drive motor 34 and various mechanical mechanisms subject to maintenance, are located on the mechanical unit side. This aspect provides an advantage in that it facilitates ease of maintenance. In particular, the systems of the mechanical unit may be maintained with small disruption to the library apparatus by simply replacing the mechanical unit 30.

Description of a First Shutter Locking Mechanism, A Magazine Holding Mechanism and a Magazine Locking Mechanism As described previously, the shutter 21 is provided to prevent the operator from inadvertently inserting a hand or the like into the operating space 9 when the magazine 15 is detached. Further security measures include first shutter locking mechanisms 25 and 40 and a magazine locking mechanism 50. The first shutter locking mechanisms 25 and 40 inhibit the opening of the shutter 21 by a person when the magazine 15 is not in place in the DEE 12 (see FIGS. 5 to 15). Moreover, the magazine locking mechanism 50 inhibits the removal of the magazine 15 when the shutter 21 is in the open condition (see FIGS. 16 and 17). Referring to FIGS. 5 to 17, a detailed description will be made of the arrangement of these locking mechanisms 25 and 40.

Description of the First Shutter Locking Mechanisms and Magazine Holding Mechanism In the DEE 12 according to this embodiment, the first shutter locking mechanisms 25, 40 are provided on the lower and upper sides of the shutter 21, respectively.

Figure 6:
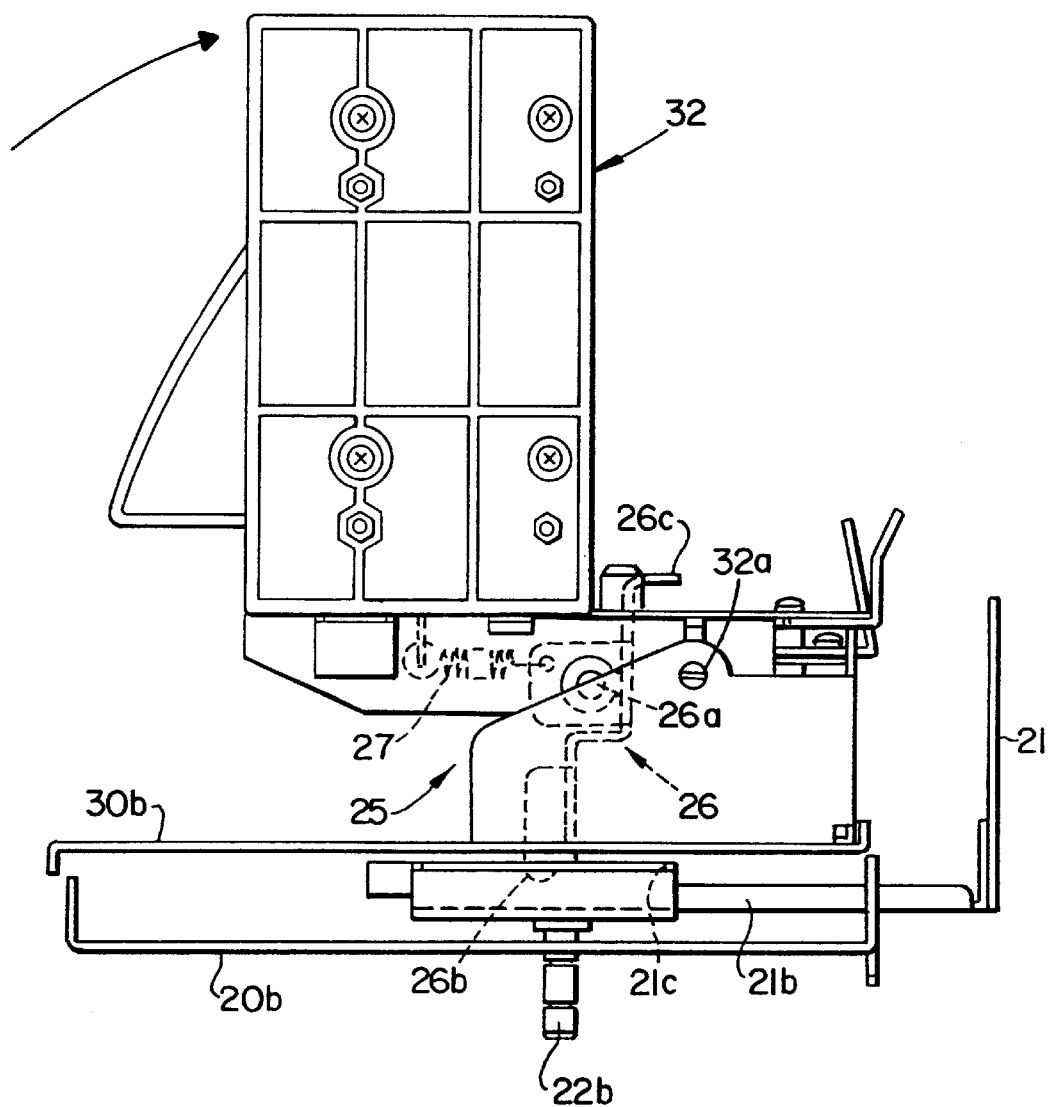
FIG. 6 is a side elevational view showing the first shutter locking mechanism (locking condition) according to the present invention.
Figure 7:
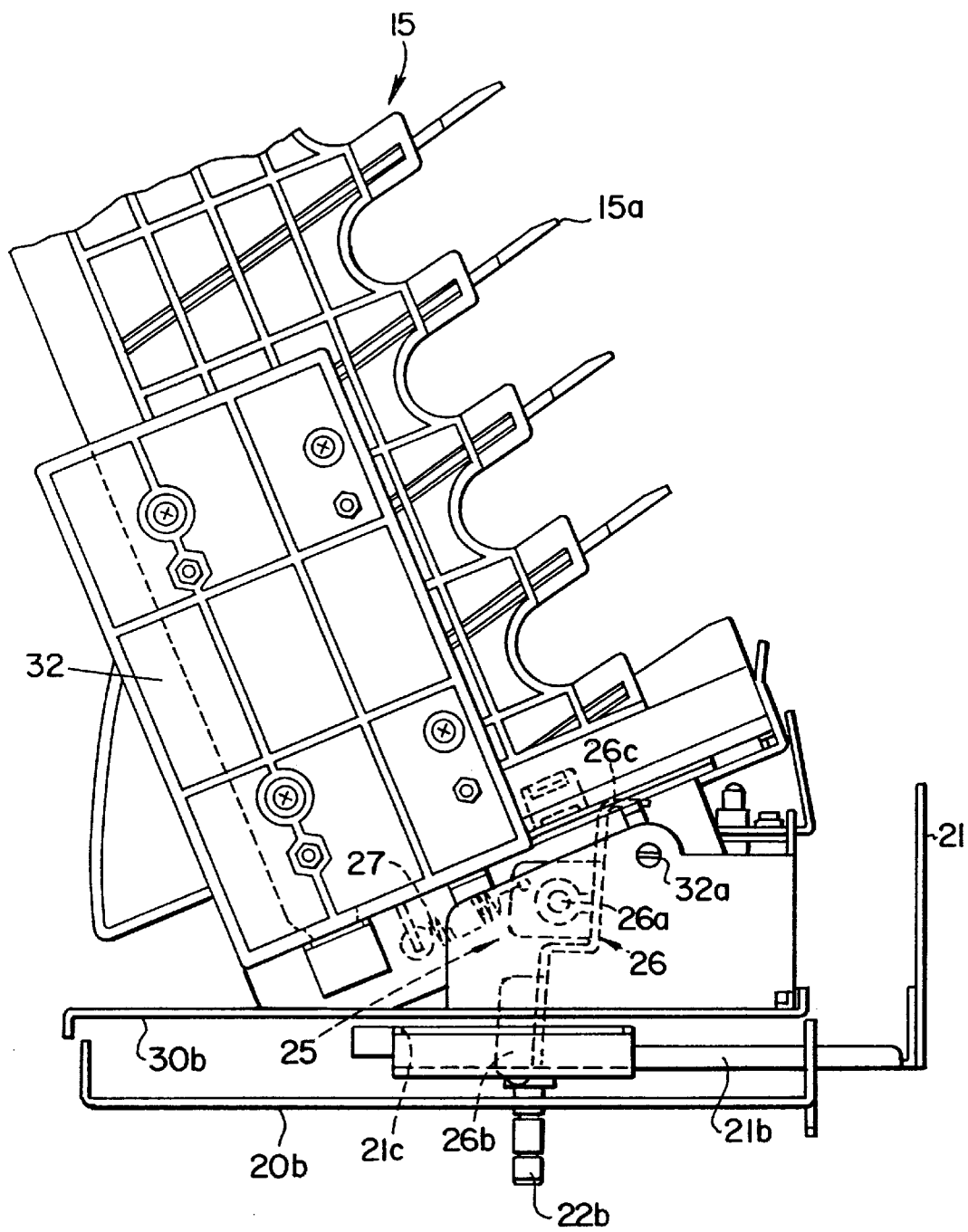
FIG. 7 is a side elevational view showing the first shutter locking mechanism (locking condition) according to the present invention.

The shutter locking mechanism 25 inhibits (locks) the opening operation of the shutter 21 when the magazine 15 is detached from the DEE 12 (see FIGS. 5 and 6) or where the magazine 15 is not in a fully engaged position (see FIG. 7). In contrast, the shutter locking mechanism 25 allows the opening operation of the shutter 21 when the magazine 15 is fully engaged with the DEE 12 (see FIG. 8). As shown in FIGS. 5 to 9, the shutter locking mechanism 25 includes a locking hole 21c made in the supporting plate 21b of the shutter 21, a locking lever 26 attached to a lower surface of the tray 32, and a spring 27.

The locking lever 26 is attached to a lower surface of the tray 32, and is configured to be rotatable about a supporting shaft 26a. As best seen in FIG. 5, the supporting shaft 26a is closer to the external space side than the tray supporting shaft 32a. The locking lever 26 is located above the locking hole 21c when the shutter 21 is in the closed condition, and is biased by the spring 27 to be perpendicular to the bottom surface of the tray 32 when the magazine 15 is not placed on the tray 32 (see FIGS. 5 and 6).

Furthermore, the locking lever 26 has a locking contact portion 26b formed on a portion lower than the supporting shaft 26a and made to engage with locking hole 21c. The locking level also has a magazine contact portion 26c formed on a portion higher than the supporting shaft 26b and made to protrude upwardly from the bottom surface of the tray 32 and contact the bottom surface of the magazine 15. When the magazine contact portion 26c is pressed by the bottom surface of the magazine 15, the entire locking lever 26 rotates about the supporting shaft 26a against the biasing force of the spring 27, so that the locking contact portion 26b moves toward the external space side. Incidentally, the bottom board 30b of the mechanical unit 30 has a hole (not shown) through which the locking lever 26 (locking contact portion 26b) passes.

Still further, the downwardly protruding amount of the locking contact portion 26b is determined so that the locking contact portion 26b engages with the locking hole 21c in each of three states: (1) when the magazine 15 is not placed on the tray 32 (see FIG. 5); (2) when the tray 32 is rotated up to the set position without placing the magazine 15 on the tray 32 (see FIG. 6); and (3) when the magazine 15 is put on the tray 32 and inclined to the external space side. Moreover, the contact portion 26b shifts above the supporting plate 21b side locking hole 21c only when the tray 32 carrying the magazine 15 is rotated up to the set position (see FIG. 8).

Figure 9:
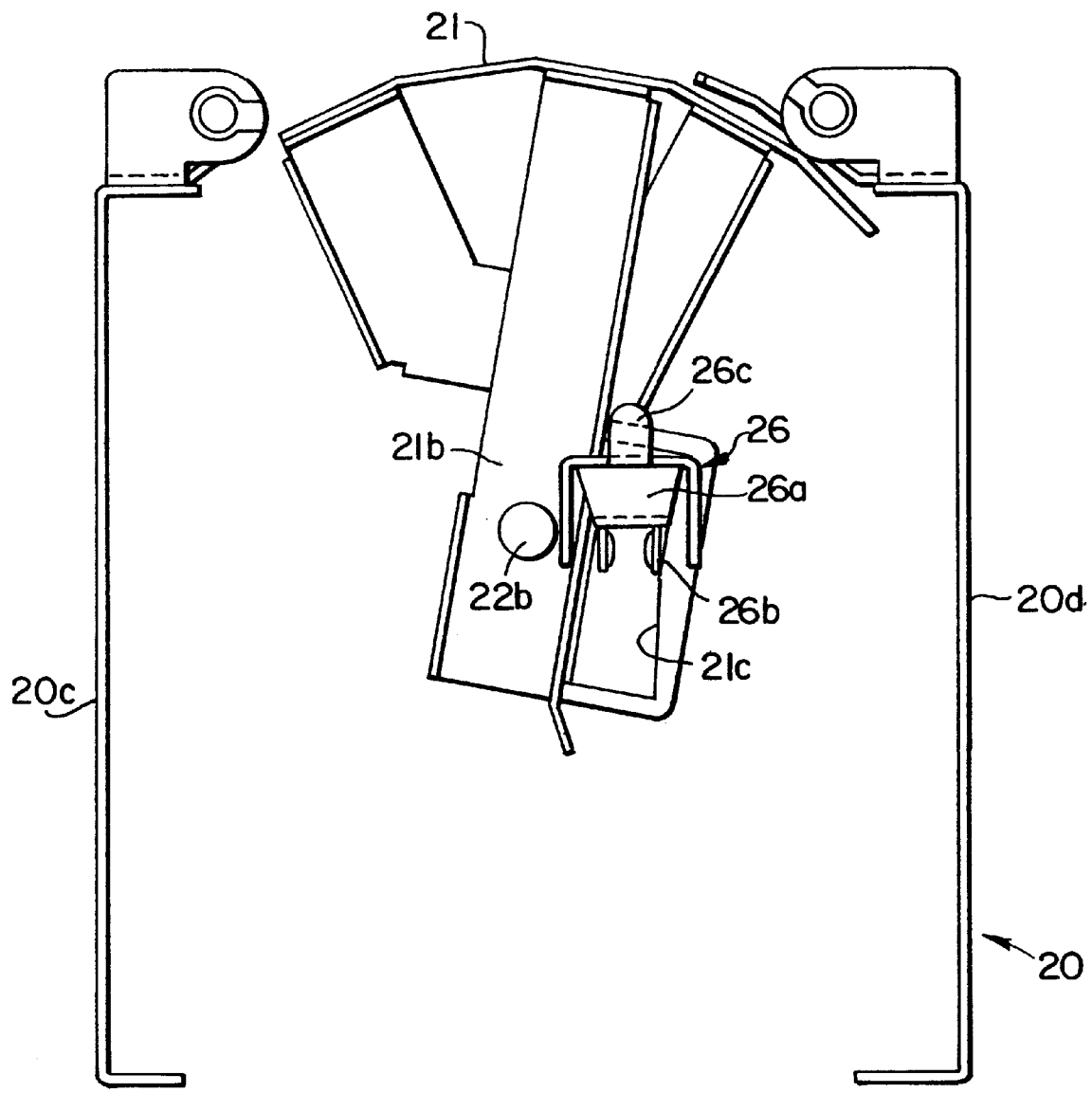
FIG. 9 is a plan view showing the first shutter locking mechanism (locking condition) according to the present invention.

As seen in FIGS. 5 and 9, the tray 32 is inclined to the external space side when the magazine 15 is detached from the DEE 12, and the locking contact portion 26b of the locking lever 26 engages the locking hole 21c. In this state, the locking contact portion 26b and the circumferential portion of the locking hole 21c interfere with each other, producing the shutter 21 locking condition that inhibits the opening operation of the shutter 21.

Moreover, if the tray 32 is rotated while the magazine 15 is detached, the shutter 21 will maintain a locked condition due to the absence of engagement between the locking contact portion 26b and the locking hole 21c (FIG. 6). When the magazine 15 is placed on the tray 32, the magazine contact portion 26c is pressed by the bottom surface of the magazine 15 so that the locking contact portion 26b shifts to the external space side (FIG. 5). Nevertheless, the shutter 21 is maintained in the locked condition due to the lack of engagement between the locking contact portion 26b and the locking hole 21c (FIG. 7).

Figure 8:
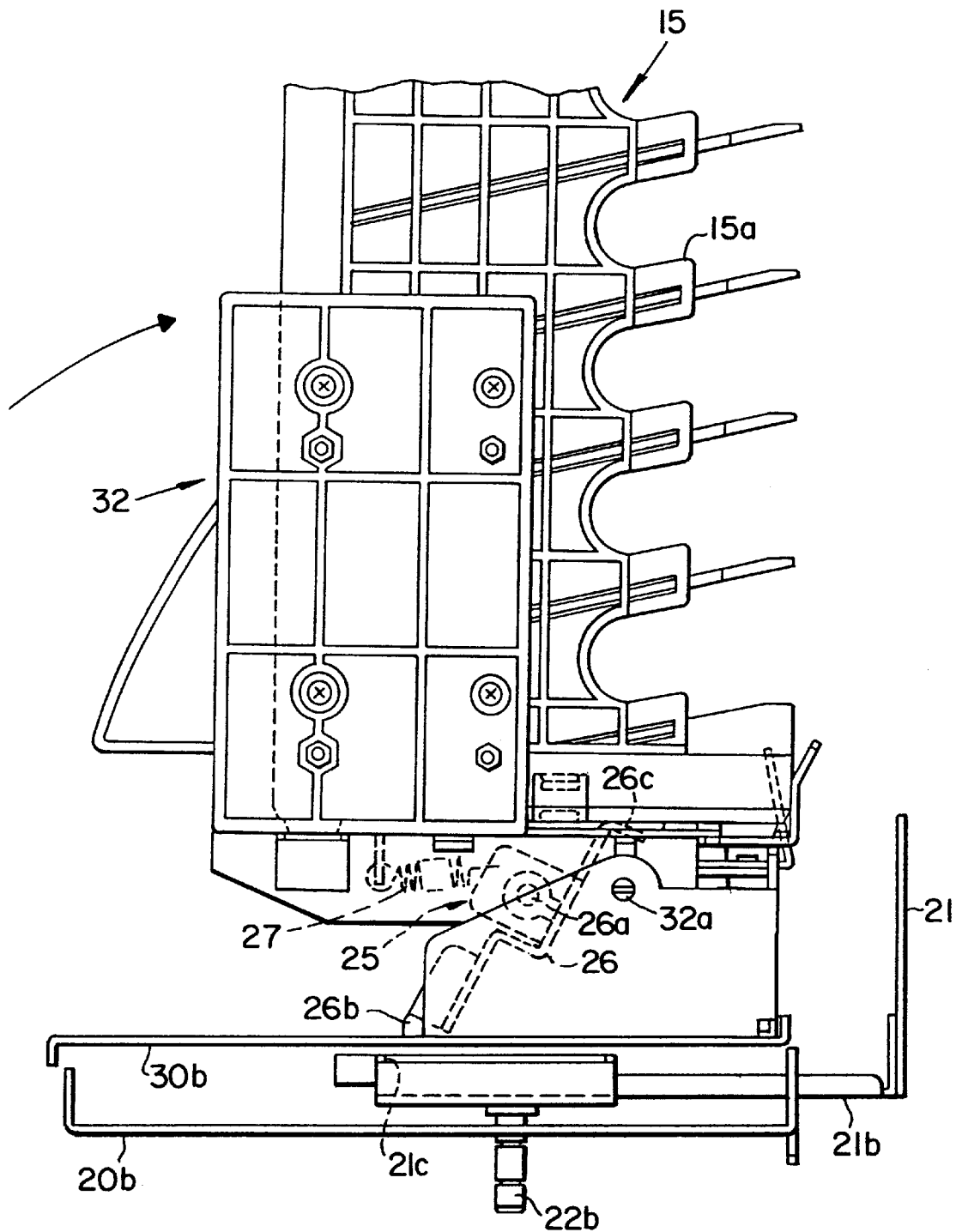
FIG. 8 is a side elevational view showing the first shutter locking mechanism (unlocking condition) according to the present invention.

Furthermore, the locking contact portion 26b retreats from the locking hole 21c (shutter 21 enters unlocked condition) only when the magazine 15 is engaged in the DEE 12 (FIG. 8).

Before describing the arrangement and operation of the shutter locking mechanism 40, a description will first be made of the composition and operation of the magazine holding mechanism 28 concerned with the operation of the shutter locking mechanism 40.

The magazine holding mechanism 28 includes the magazine holding lever 28a, pins 28b, a plate 28c and a spring 28d. The magazine holding mechanism 28 is provided on the top board 30a of the mechanical unit 30. Moreover, the magazine holding mechanism 28 is configured to hold the magazine 15 within the communication space 31 such that the insertion/removal side of the cartridges 10 faces the operating space 9 (FIGS. 10 to 13).

The magazine holding lever 28a protrudes downwardly with respect to the top board 30a. The magazine holding lever 28a holds the magazine 15 by engaging with the hole 15g in the magazine 15 upper surface. The magazine holding lever 28a has an elongated hole 28a-2 formed to extend vertically, and the plate 28c is provided to rise from the top board 30a. The magazine holding lever 28a is moveably attached to the plate 28c through upper and lower pins 28b, 28b penetrating the elongated hole 28a-2.

Furthermore, the magazine holding lever 28a is biased by the spring 28d to protrude downwardly. In addition, a tapered surface 28a-1-inclined upwardly toward the external space side is formed on the magazine holding lever 28a, and a magazine locking contact surface 28a-3 is formed on an upper portion of the magazine holding lever 28a. Notably, the contact surface 28a-3 functions as a magazine locking mechanism 50.

In engaging the magazine 15 in the DEE 12, the magazine 15 is inserted into the communication space 31 of the DEE 12 from the external space side (best seen in FIG. 11). During this process, a corner portion of an upper and front end side of the magazine 15 contacts the tapered surface 28a-1 of the magazine holding lever 28a. Further, in conjunction with the insertion of the magazine 15, the magazine holding lever 28a (FIG. 12) is moved by the tapered surface 28a-1 to be discharged upwardly against the biasing force of the spring 28d.

Figure 13:
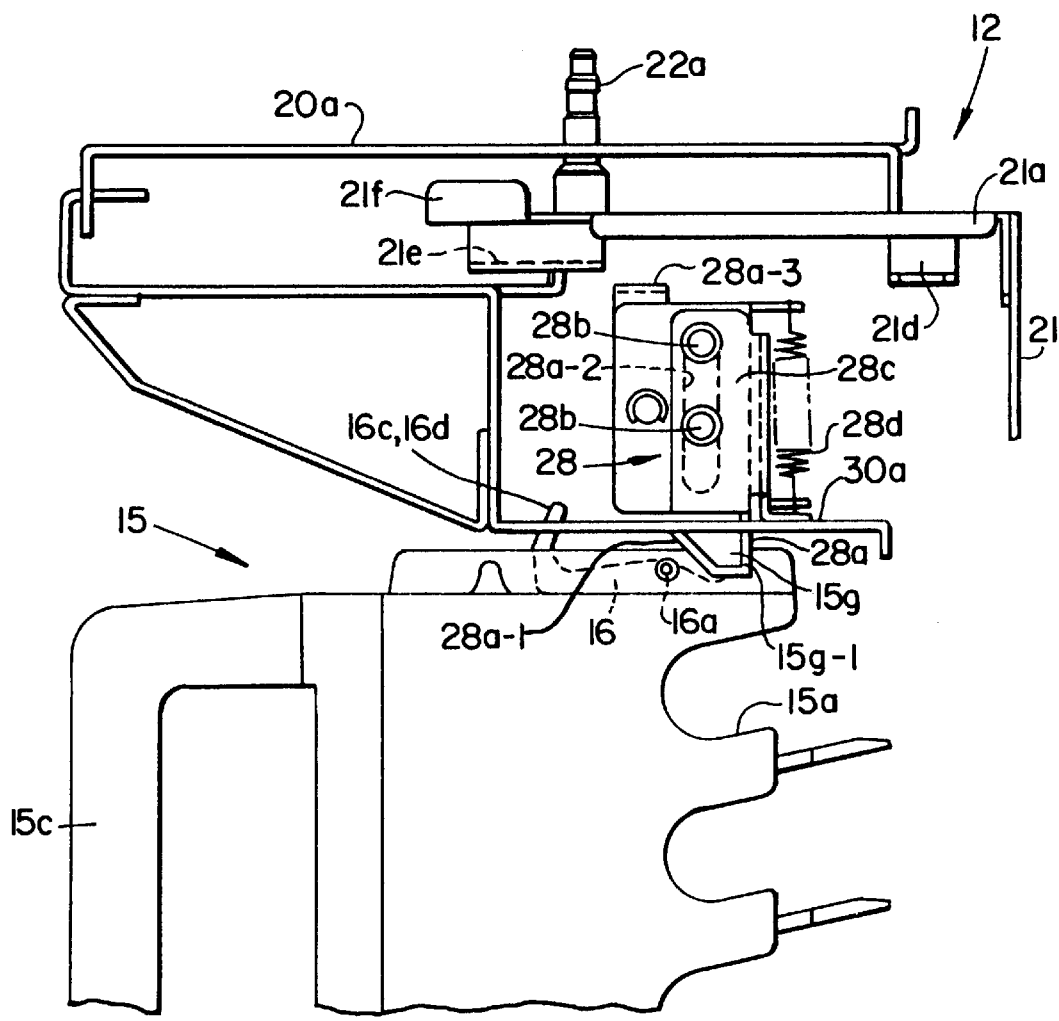
FIG. 13 is a side elevational view showing the magazine holding mechanism according to the present invention.

When the magazine 15 reaches the set position, the hole 15g in the top surface of the magazine 15 is positioned right below the magazine holding lever 28a (FIG. 13). In this state, the magazine holding lever 28a receives a biasing force from the spring 28d, forcing the lever 28a to protrude downwardly, thereby engaging with the hole 15g. Consequently, the magazine 15 is held in the set position within the DEE 12. At this time, the tapered surface 28a-1 of the magazine holding lever 28a is placed into contact with a hole 15g side tapered surface 15g-1.

Moreover, when the magazine holding lever 28a is engaged with the hole 15g, the end portion 16b of the interlocking lever 16 is pressed downwardly by the magazine holding lever 28a. At this time, the interlocking lever 16 rocks about the rotary shaft 16a, so that the end portions 16c, 16d are held in a state of protruding upwardly from the holes 15h, 15i. The result of the protrusion of the end portions 16c, 16d of the interlocking lever 16 is to operate the shutter locking mechanism 40 and the magazine set condition detecting mechanism 60.

Figure 10:
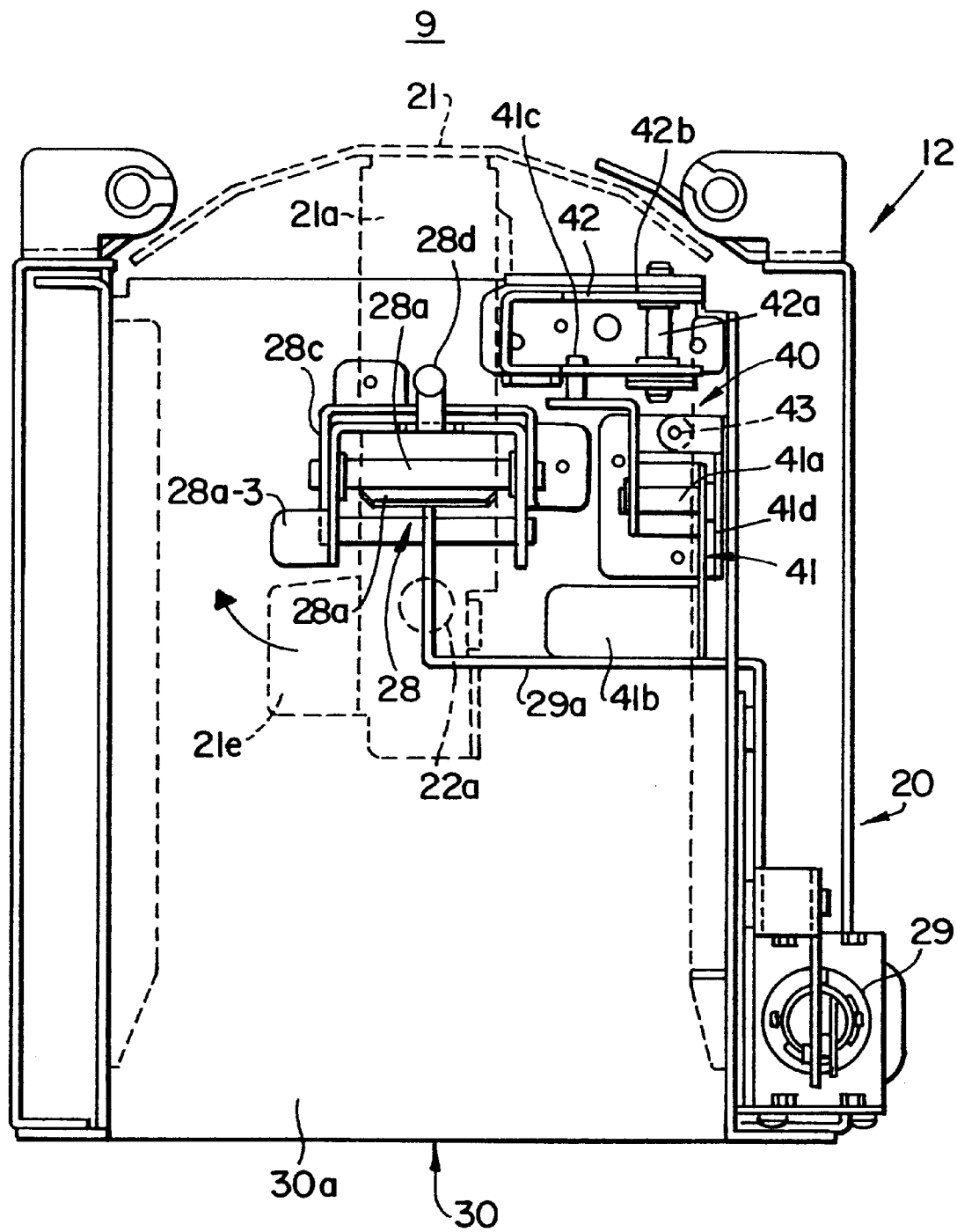
FIG. 10 is a plan view showing a magazine holding mechanism and a first shutter locking mechanism according to the present invention.

As shown in FIGS. 10 and 18, a magazine releasing solenoid 29 is connected to the magazine holding lever 28a through a connecting member 58a. As will be described later with reference to FIGS. 37 and 38, the solenoid 29 is designed to be excited when the operator actuates the switch (REMOVE SW) on the control panel 30e (see FIG. 1). Excitation of the solenoid 29 retracts a connecting member 29a so that the magazine holding lever 28a is lifted upwardly against the biasing force of the spring 28d.

Notably, the engagement between the magazine holding lever 28a and the hole 15g is canceled by the lifting of the lever 28a, thereby permitting the magazine 15 to be detached from the DEE 12.

The shutter locking mechanism 40 inhibits the opening operation of the shutter 21 in a state where the magazine 15 is not set in the DEE 12 (in a state in which the magazine holding mechanism 28 does not hold the magazine 15). Correspondingly, the shutter locking mechanism 40 which allows the opening of the shutter 21 when the magazine 15 is set in the DEE 12 (in a state in which the magazine holding mechanism 28 holds the magazine 15).

Figure 14:
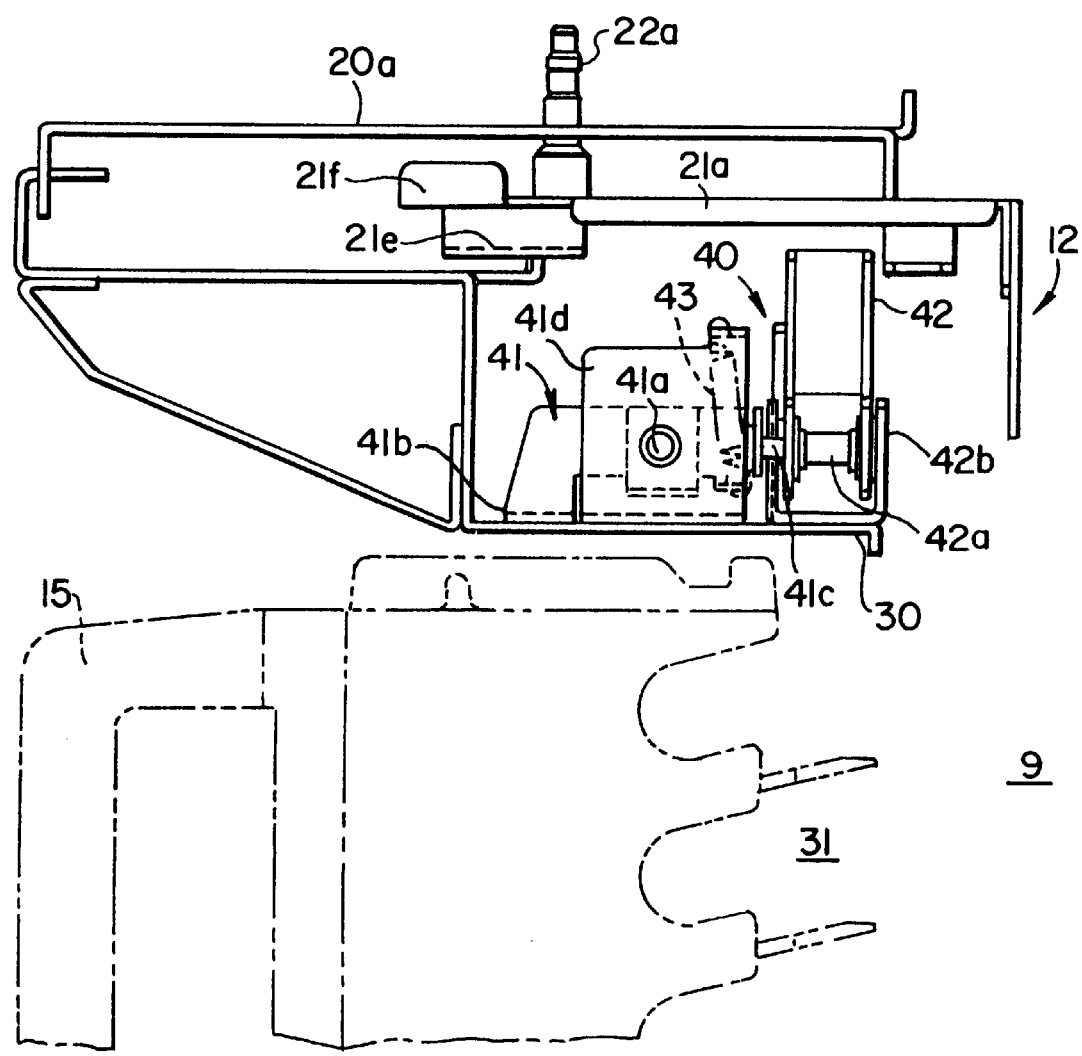
FIG. 14 is a side elevational view showing the first shutter locking mechanism (locking condition) on the upper side of the shutter according to the present invention.
Figure 15:
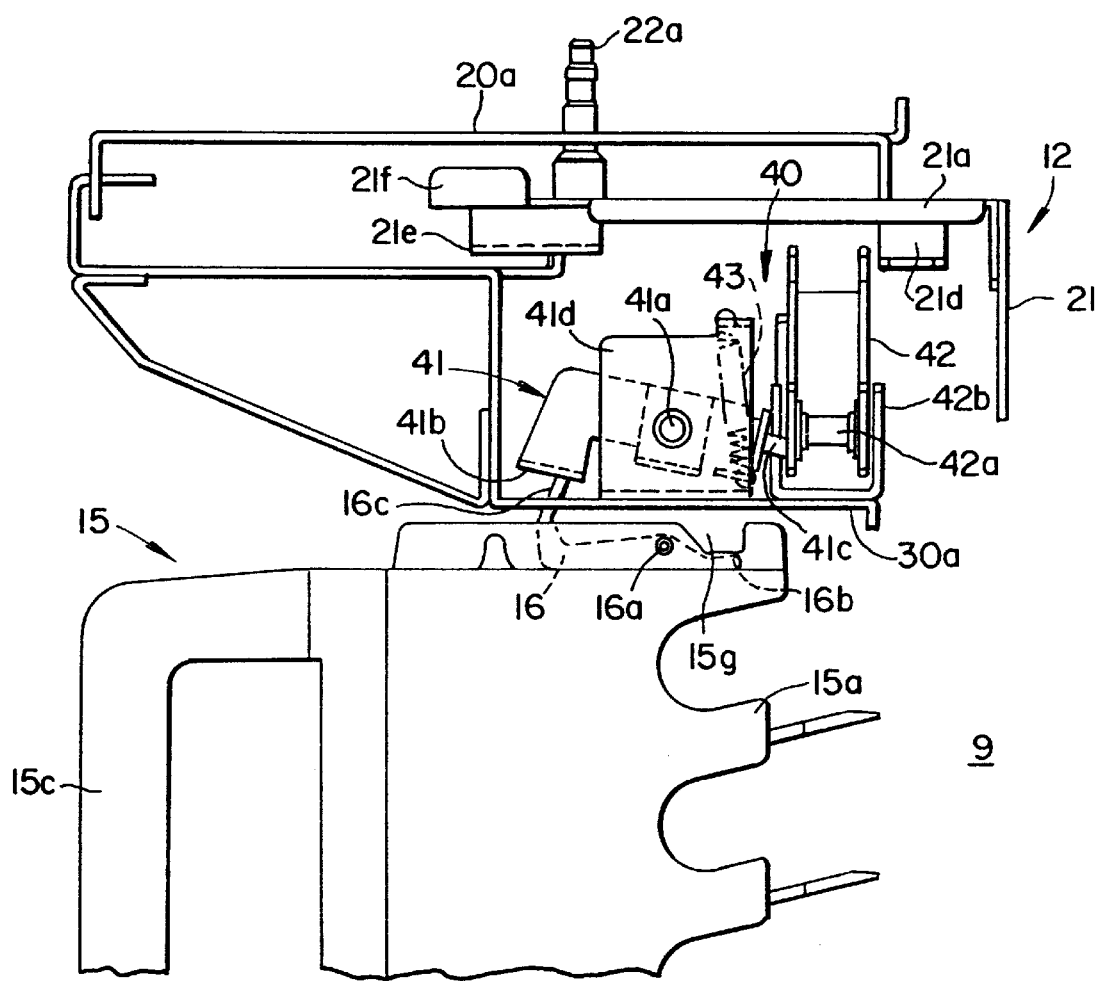
FIG. 15 is a side elevational view showing the first shutter locking mechanism (unlocking condition) on the upper side of the shutter according to the present invention.

The shutter locking mechanism 40 includes a shutter locking contact portion 21d formed on the supporting plate 21a of the shutter 21, a lever 41 attached onto the top board 30c of the mechanical unit 30, a locking lever 42 and a spring 43 (see FIGS. 10, 14 and 15). Moreover, the shutter locking contact portion 21d is configured to protrude downwardly from a lower surface portion of the supporting plate 21 a close to the shutter 21.

Furthermore, the lever 41 is swingably fitted through a pin 41a to a plate 41d on the top board 30a. At one end side portion of this lever 41 there is formed a contact surface 41b that contacts the end portion 16c of the interlocking lever 16. At the other end side portion of the lever 41 there is formed a contact pin 41c which contacts the locking lever 42 from below. The lever 41 is biased in the contact pin 41c lifting direction by means of the spring 43 interposed between the lever 41 and the top board 30a of the mechanical unit 30. Accordingly, when the end portion of the interlocking lever 16 protrudes upwardly from the hole 15h of the magazine 15, the contact surface 41b is pushed up by its end portion 16c, and the lever 41 swings in the contact pin 41 lowering direction against the biasing force of the spring 43.

Moreover, the locking lever 42 is rockably fitted through a pin 42a to a plate 42b on the top board 30a. The locking lever 42 has a rocking surface orthogonal to the rocking surface of the lever 41. In addition, the locking lever 42 is predisposed in a downward position under the force of its own weight and is supported by the contact pin 41c from below. Consequently, the height of the tip portion of the locking lever 42 is made to be adjustable in accordance with the height of the contact pin 41c. As shown in FIG. 14, when the contact pin 41c is in a lifted condition (locking condition), the tip portion of the locking lever 42 is within the rotating area of the contact portion 21d and contacts with the contact portion 21d, thereby regulating the opening operation of the shutter 21. On the other hand, in a state where the end portion 16c of the interlocking lever 16 protrudes upwardly to lower the contact pin 41c (unlocking condition), the tip portion of the locking lever 42 retreats from the rotating area of the contact portion 21d (FIG. 15).

Consequently, if the magazine 15 is detached while the shutter 21 closes the communication space 31 from the operating space 9 side, the lever 41 is placed in the locking position by the biasing force of the spring 43 (FIG. 14). At this locking position, the contact pin 41c of the lever 41 is lowered and the tip portion of the locking lever 42 is within the rotating area of the contact portion 21d. Consequently, the tip portion of the locking lever 42 and the contact portion 21d of the supporting plate 21a come into an interfering relation with each other to lock the shutter 21, thus inhibiting the opening operation of the shutter 21.

Furthermore, on setting the magazine 15 in the DEE 12, the magazine holding lever 28a engages with the hole 15g and presses the end portion 16b of the interlocking lever 16 downwardly. This, in turn, causes the interlocking lever 16 to rock about the rotary shaft 16a, and causes the end portion 16c of the interlocking lever 16 to protrude upwardly from the hole 15h. Incidentally, the top board 30a also has a hole (not shown) through which the end portion 16c passes.

The end portion 16c protruding upwardly contacts the contact surface 41b of the lever 41 to push the contact surface 41b upwardly. Following this operation, the lever 41 swings in the contact pin 41c lowering direction against the biasing force of the spring 43. As shown in FIG. 15, the tip portion of the locking lever 42 retreats from within the rotating area of the contact portion 21d. Consequently, the interference between the tip portion of the locking lever 42 and the contact portion 21d of the supporting plate 21a is canceled so that the shutter 21 gets into the unlocked condition to be in the openable condition.

Description of a Magazine Locking Mechanism

Figure 16:
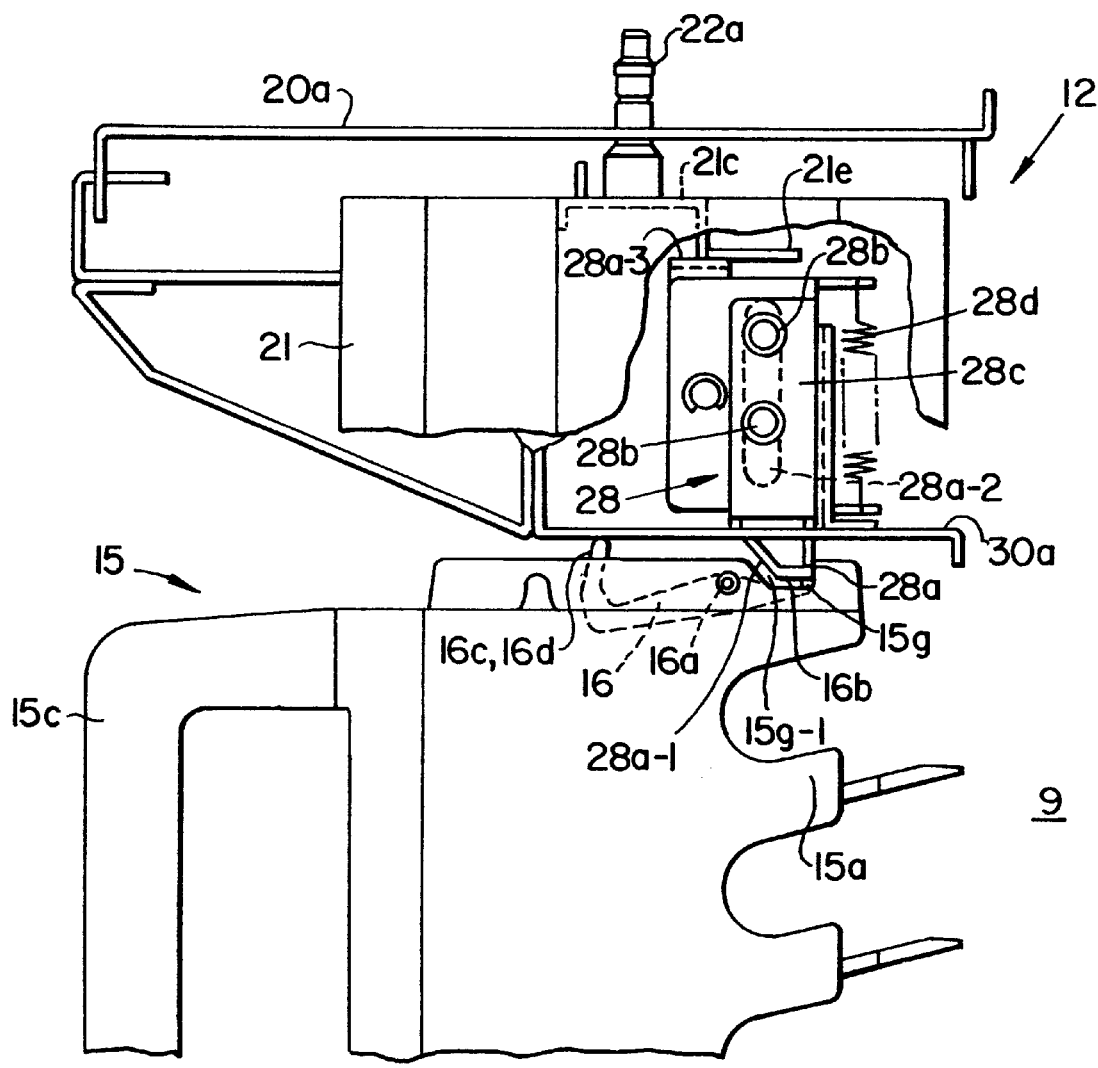
FIG. 16 is a side elevational view showing a magazine locking mechanism (locking condition) according to the present invention.

FIGS. 16 and 17 illustrate the magazine locking mechanism 50, and in particular FIG. 16 is a side elevational view showing its locking condition and FIG. 17 is a plan view showing its unlocking condition.

In FIG. 16, part of the shutter 21 is broken to show clearly the locking condition of the magazine locking mechanism 50. Further, in FIG. 17, the illustrations of the top board 20a of the shutter unit 20, the magazine holding mechanism 28, the shutter locking mechanism 40 are omitted to show clearly the magazine locking mechanism 50, while the illustrations of the magazine 15 set in the DEE 12 and the interlocking lever 16 within the magazine 15 are made. Moreover, in FIG. 17, the shutter 21 opening condition (locking condition) is shown with a solid line while the shutter 21 closing condition (unlocking condition) is shown with a two-dot chain line.

The magazine locking mechanism 50 inhibits (locks) the detaching operation of the magazine 15 when the shutter 21 is in the open condition and permits (unlocks) the detaching operation when shutter 21 is in the closed condition. As shown in FIGS. 16 and 17, the magazine locking mechanism 50 includes a magazine locking contact portion 21e attached onto the supporting plate 21a and the magazine locking contact surface 28a-3 formed on the upper portion of the magazine holding lever 28a.

The magazine locking contact portion 21e is located at a position retreating from above the magazine locking contact surface 28a-3 as indicated by the two-dot chain line in FIG. 17 (see, also FIGS. 11 to 15) in a state where the shutter 21 is in the closed condition. Correspondingly, the contact portion 21e is located right above the magazine locking contact surface 28a-3 as shown by the solid line in FIGS. 16 and 17 in a state where the shutter 21 is in the open condition. Accordingly, if the magazine holding lever 28a lifts in a state where the shutter 21 is open, the magazine locking contact surface 28a-3 and the contact portion 21e contact each other in the area indicated by oblique lines in FIG. 17 and create an interfering relation.

With this arrangement, if the shutter 21 is opened after the magazine 15 is set in the DEE 12, as shown in FIGS. 16 and 17, the contact portion 21e of the supporting plate 21a is located right above the magazine locking contact surface 28a-3. The magazine locking contact surface 28a-3 and the contact portion 21e interfere with each other to inhibit the lifting of the magazine holding lever 28a. Therefore, even if the lifting operation of the magazine holding lever 28a occurs due to the mistaken operation of the solenoid 29 or if a person tries to detach the magazine 15 by force, the magazine holding lever 28a cannot lift, thus making it impossible to remove the magazine 15.

Furthermore, on closing the shutter 21, as shown by the two-dot chain line in FIG. 17, the contact portion 21e of the supporting plate 21a separates from above the magazine locking contact surface 28a-3 to allow the magazine holding lever 28a to raise, which permits the removal of the magazine 15.

The shutter locking mechanisms 25 and 40 inhibit the opening operation of the shutter 21 at the detachment of the magazine 15. Similarly, the magazine locking mechanism 50 inhibits the detaching operation of the magazine 15 when the shutter 21 is in the open condition. Accordingly, the shutter locking mechanisms 25 and 40 and the magazine locking mechanism 50 enhance operator safety by preventing the operator from inserting a hand or the like into the operating space 9. In addition, the above-described locking/unlocking functions are easily realizable using a mechanical means linked with the operation of the magazine 15 or the shutter 21. Moreover, the present invention eliminates the need for a special space for the locking mechanisms 25, 40 and 50, therefore facilitating a space-saving.

Incidentally, the rotary shutter 21 may be locked using an electrical locking method or a mechanical locking method. However, the use of an electrical locking method is not advantageous due to cost considerations as well as the probability of failure. Likewise, the use of a mechanical locking method is not desirable because of difficulties in ensuring that the rotary shutter is maintained in a locking condition. In contrast, the shutter locking mechanisms 25, 40 of the present invention which lock the shutter 21 (in combination with the detaching operation of the magazine 15) using the levers 16, 26, 41, 41 is preferable in every respect including cost, ease of assembly, performance stability and development time.

Description of a Magazine Set Condition Detecting Mechanism

As mentioned previously, the magazine 15 is completely positioned within the DEE 12 at the time that the magazine holding lever 28a engages the hole 15g of the magazine 15. In detecting the set condition of the magazine 15, if the magazine 15 takes the incomplete set condition after once coming into the set condition, an error condition takes place. In addition, if the accessors 7A, 7B are put into action before the magazine is fully engaged, the safety of the operator may not be assured. Therefore, there is a need for developing a means for assuredly detecting whether the magazine 15 is completely set in the DEE 12.

Figure 19:
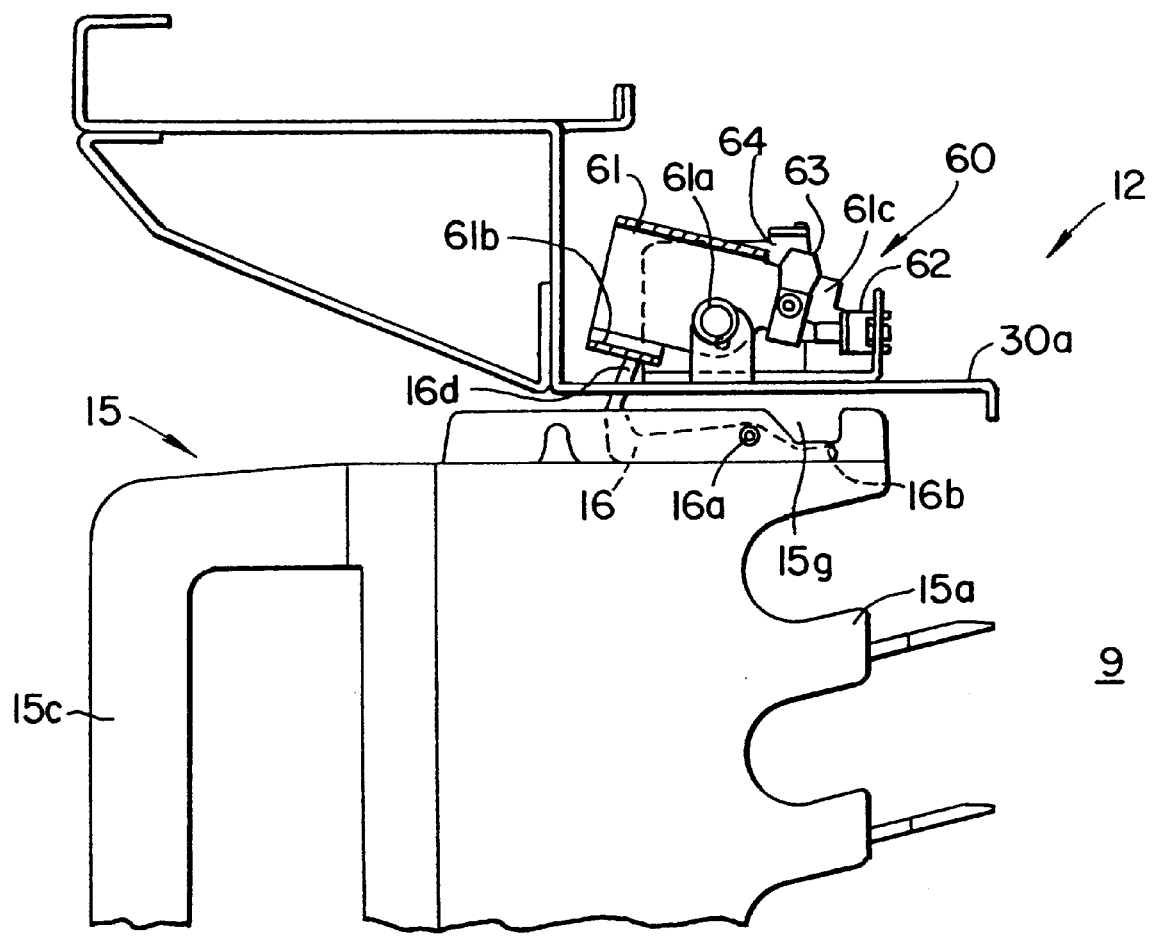
FIG. 19 is a side elevational view showing a detecting state of the magazine set condition detecting mechanism according to the present invention.
Figure 20:
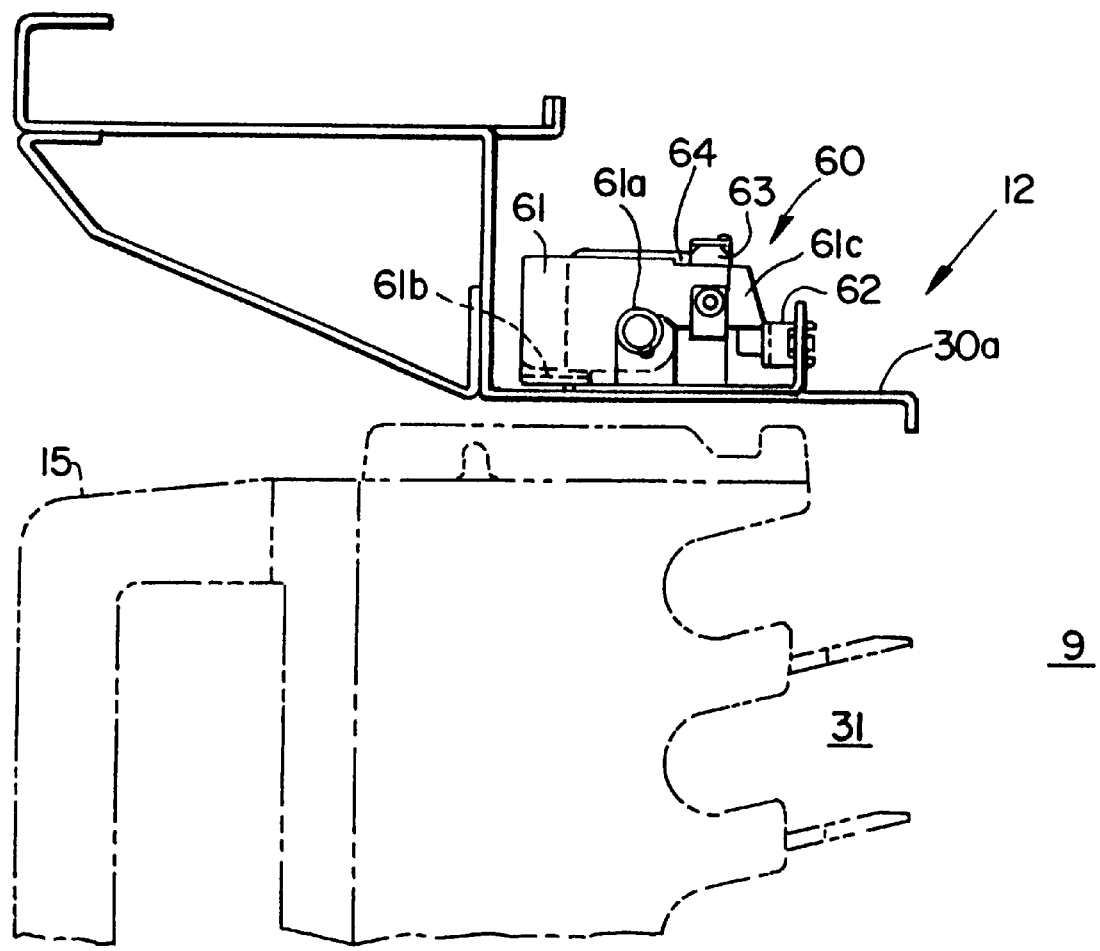
FIG. 20 is a side elevational view showing a "NO" detecting state of the magazine set condition detecting mechanism according to the present invention.

Thus, in this embodiment, there is provided the magazine set condition detecting mechanism 60 (see FIGS. 18 to 20) which detects the set condition of the magazine 15 in connection with the holding operation of the magazine holding mechanism 28. Only in the case that the magazine holding lever 28a of the magazine holding mechanism 28 completely engages the hole 15g will the mechanism 60 detect the magazine 15 set condition. Referring to FIGS. 18 to 20, a description will be made of the arrangement and operation of that magazine set condition detecting mechanism 60.

FIGS. 18 to 20 are illustrations of the magazine set condition detecting mechanism 60, and of these drawings, FIG. 18 is a plan view thereof, and FIGS. 19 and 20 are side elevational views showing its detecting condition and "NO" detecting condition, respectively. In FIG. 18, the shutter locking mechanism 40 is omitted from the illustration to show clearly the magazine holding mechanism 28 and the magazine set condition, detecting mechanism 60, and further the magazine 15 set in the DEE 12 and the interlocking lever 16 within the magazine 15 are shown therein.

As shown in FIGS. 18 to 20, the magazine set condition detecting mechanism 60 is located on the top board 30a of the mechanical unit 30 and is made to work with the operation of the magazine holding lever 28a. The magazine set condition detecting mechanism 60 includes a sensor lever 61, an optical magazine check sensor (MCS) 62, a spring 63, and a plate 64.

The sensor lever 61 is rotatably supported at its central portion by a pin 61a, and is installed onto a plate 64 standing on the top board 30a.

Furthermore, one side portion of the sensor lever 61 has a contact surface 61b configured to contact the end portion 16d of the interlocking lever 16. The sensor lever 61 is biased by the spring 63, interposed between the sensor lever 61 and the top board 30a, in a direction of lifting the other end portion 61c. Accordingly, when the end portion 16c of the interlocking lever 16 protrudes upwardly from the hole 15i of the magazine 15, the contact surface 61b is pushed up by the end portion 16d. This, in turn, causes the sensor lever 61 to rock the end portion 61c in a lowering direction against the biasing force of the spring 63.

When the end portion 61c of the sensor lever 61 is shifted downwardly to a predetermined position, it intervenes between a light-emitting device and light-receiving device of the optical magazine check sensor 62, thereby signaling a detecting condition as shown in FIG. 19. As shown in FIG. 20, if the magazine 15 is not set in the DEE 12, the sensor lever 61 is held in a state where its end portion 61c is lifted by the biasing force of the spring 63. In this state, the end portion 61c gets out of a position between the light-emitting device and light-receiving device of the MCS 62, indicating a "NO" detecting condition.

As described previously with reference to FIGS. 11 to 13, when the magazine 15 is set in the DEE 12, the magazine holding lever 28a engages the hole 15g and presses the end portion 16b of the interlocking lever 16 downwardly so that the interlocking lever 16 rocks about the rotary shaft 16a, and the end portion 16d thereof protrudes upwardly from the hole 15i. Incidentally, the top board 30a also has a hole (not shown) through which the end portion 16c passes.

The end portion 16d taking the upwardly protruding condition contacts the contact surface 61b of the sensor lever 61 and pushes it up. Accordingly, the sensor lever 61 rocks in the end portion 61c lowering direction against the biasing force of the spring 63, which causes the end portion 61c to intervene between the light-emitting device and light-receiving device of the MCS 62. Consequently, the MCS 62 gets into the detecting condition and detects the set condition of the magazine 15.

Thus, the magazine set condition detecting mechanism 60 according to this embodiment is designed so that the MCS 62 does not detect the set condition of the magazine 15 until the lever 28a of the magazine holding mechanism 28 completely engages in the hole 15g. Accordingly, after the detection is made of the completely set condition of the magazine 15 in the DEE 12, the accessors 7A, 7B are operable, which insures the safety of the operator or the like.

Description of a Cartridge Erroneous Insertion Preventing Structure and a Leader Block Pushing Structure To ensure proper handling of the cartridge by the accessors 7A, 7B, there arises a need to prevent the operator from inserting a magnetic tape cartridge 10 into the magazine 15 in an improper orientation. In particular, proper insertion of the cartridge 10 into the MTU 5a can only be accomplished when the accessors 7A, 7B grip the cartridge 10 in a correct posture from its front surface 10b (see FIGS. 21 to 24) side. Therefore, the cartridge 10 must be inserted in the cell 15a of the magazine 15 so that its front surface 10b faces the operating space 9 side and its top surface 10j (see FIGS. 21 to 24) faces upward.

Thus, according to one aspect of the present invention, a structure for preventing the erroneous insertion of the cartridge 10 is provided in each cell 15a. The structure is made to regulate the inserting condition of the cartridge 10 into the cell 15a by using the shape of the cartridge 10.

In addition, as shown in FIGS. 21 to 24, the cartridge 10 is provided with a leader block for pulling out the magnetic tape. Conventionally, the leader block 10a is engaged within the housing of the cartridge 10 (see, e.g., FIG. 21). The leader block 10a is drawn into the MTU 5a to pull out the magnetic tape from the interior of the cartridge 10. When a cartridge 10 having a misseated leader block 10a (FIG. 24) is inserted into the MTU 5a, the processing cannot be conducted for that cartridge 10. For this reason, according to one aspect of the present invention each cell 15a is equipped with a structure (a leader block pushing projection 15a-2; see FIGS. 21 to 24) for pushing (re-seating) the leader block 10a in the cartridge 19.

A detailed description will be made of the structure of the cartridge 10 according to this embodiment with reference to FIGS. 21 to 24. Subsequently, a description will be made of the structure (the engaging surface 15a-1) for preventing the erroneous insertion of the cartridge 10 and the structure (the leader block pushing projection 15a-2) for pushing the leader block 10a in the cartridge 10.

Figure 21:
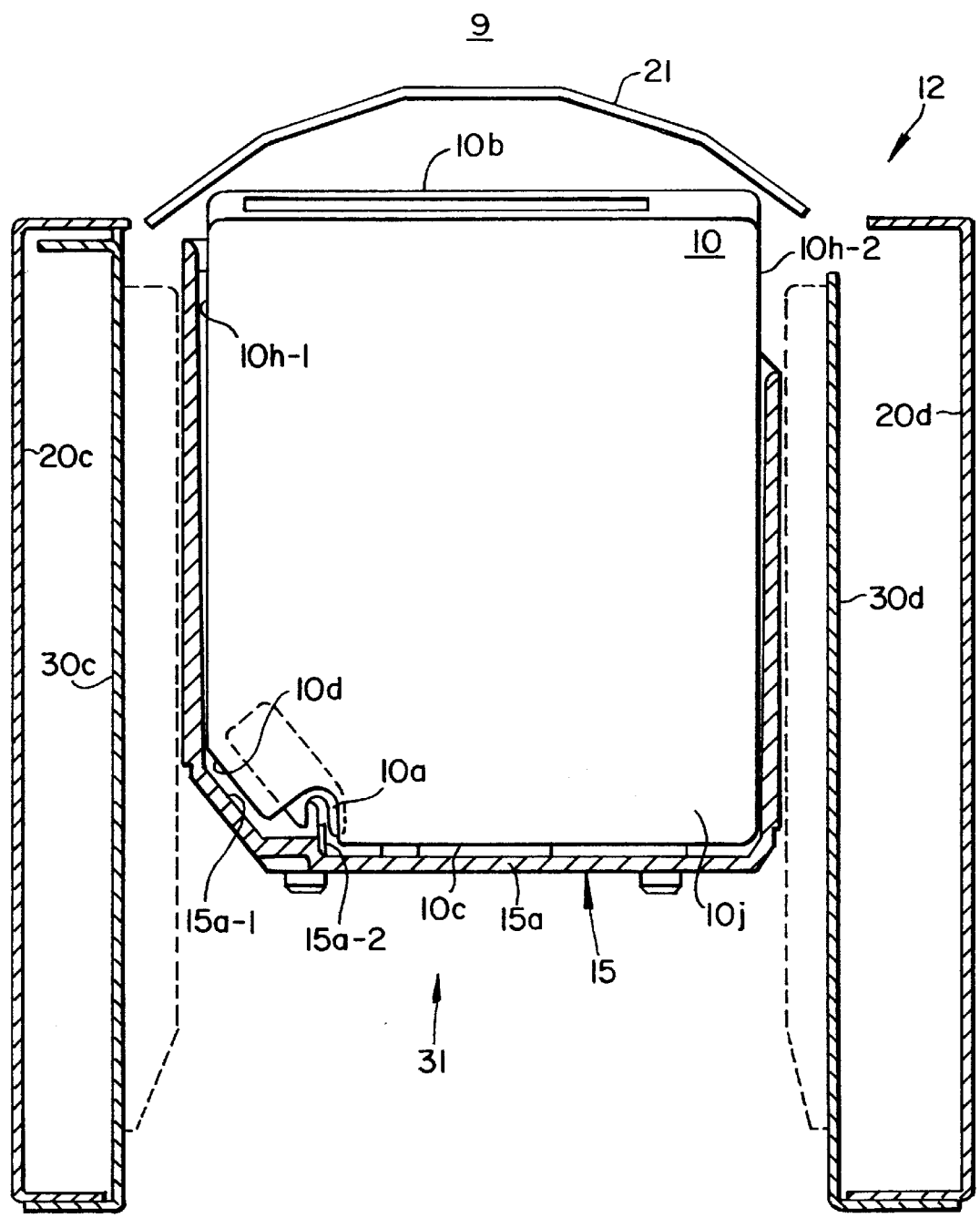
FIG. 21 is a horizontal cross-sectional view showing a magazine equipped with a cartridge erroneous insertion preventing structure and a leader block pushing structure according to the present invention.
Figure 22:
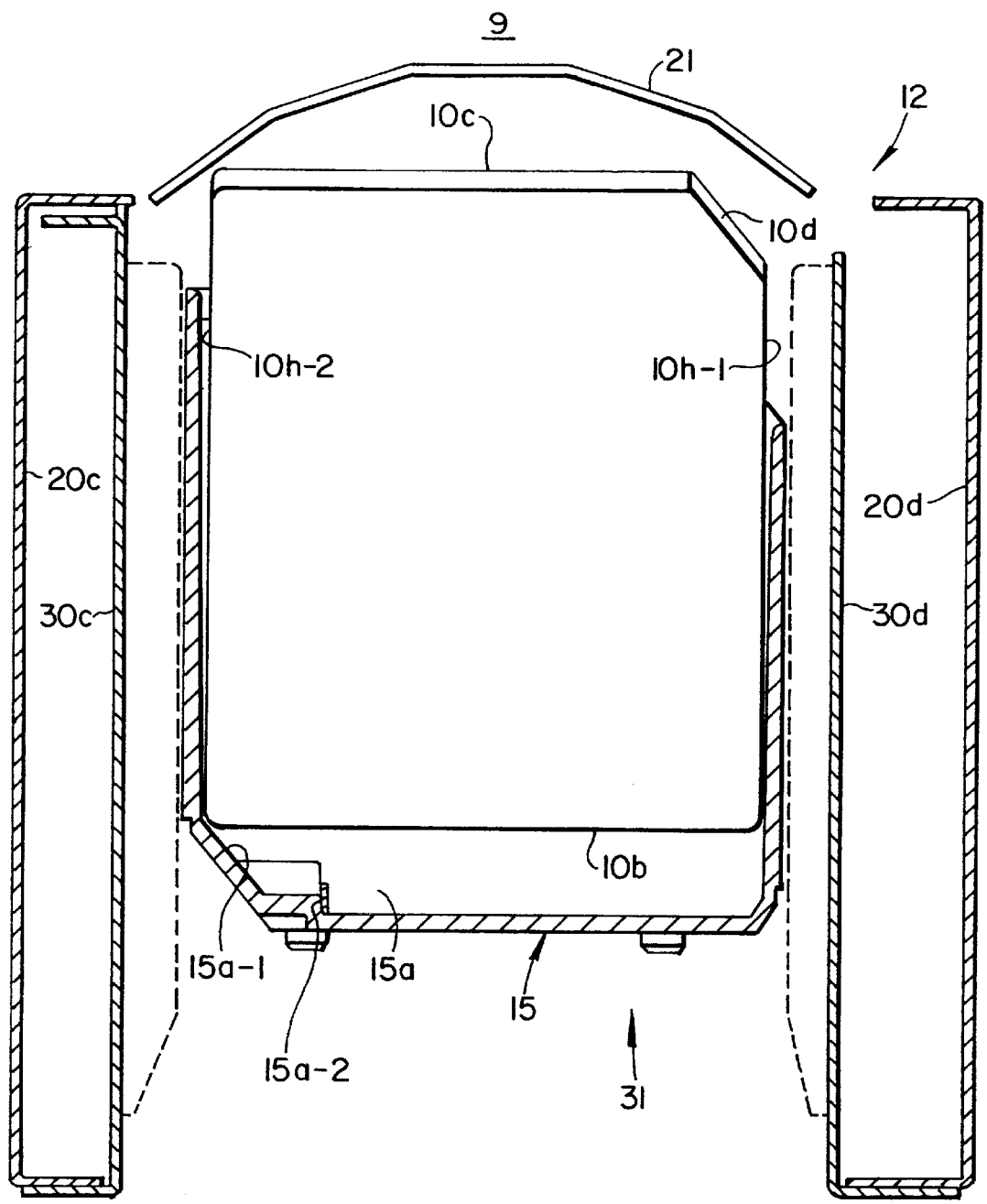
FIG. 22 is a horizontal cross-sectional view useful for explaining a function of the cartridge erroneous insertion preventing structure according to the present invention.
Figure 23:
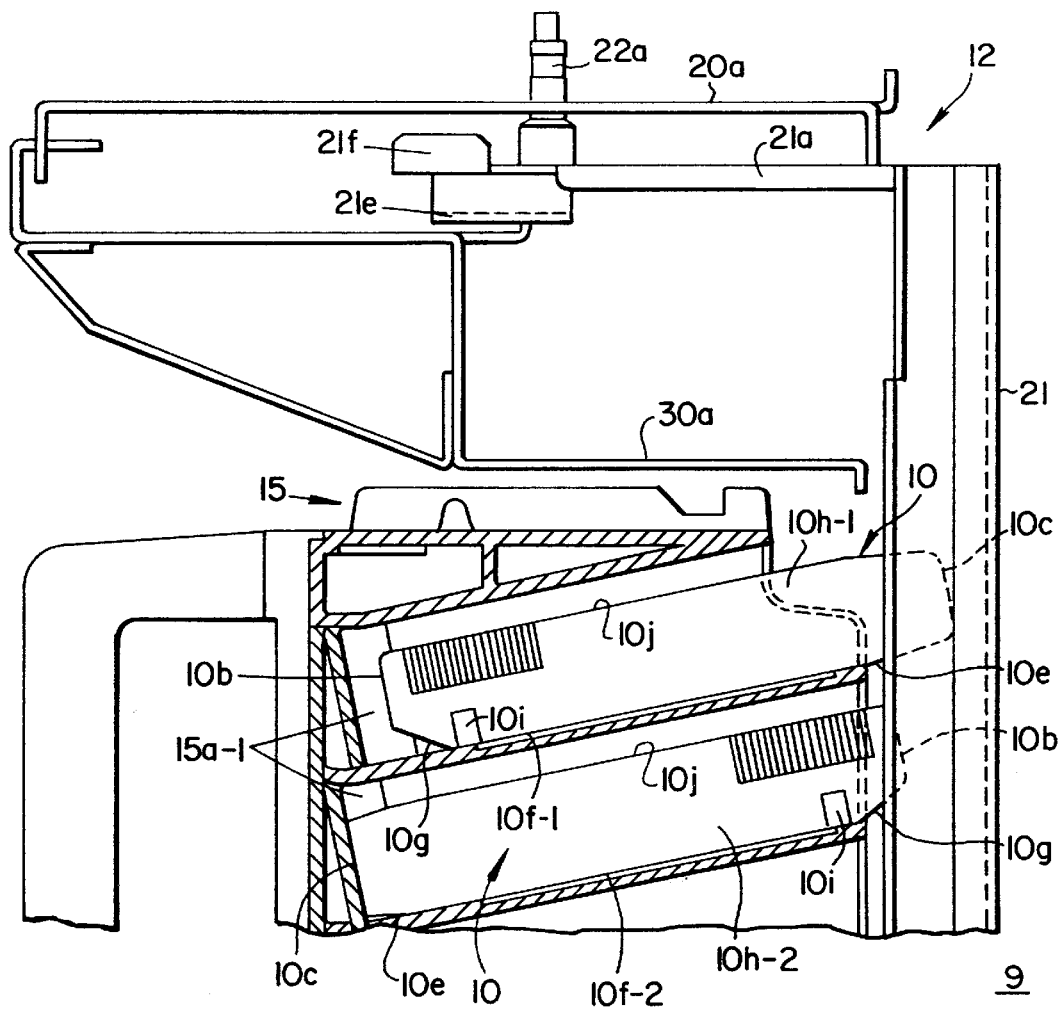
FIG. 23 is a vertical cross-sectional view useful for describing the function of the cartridge erroneous insertion preventing structure according to the present invention.
Figure 24:
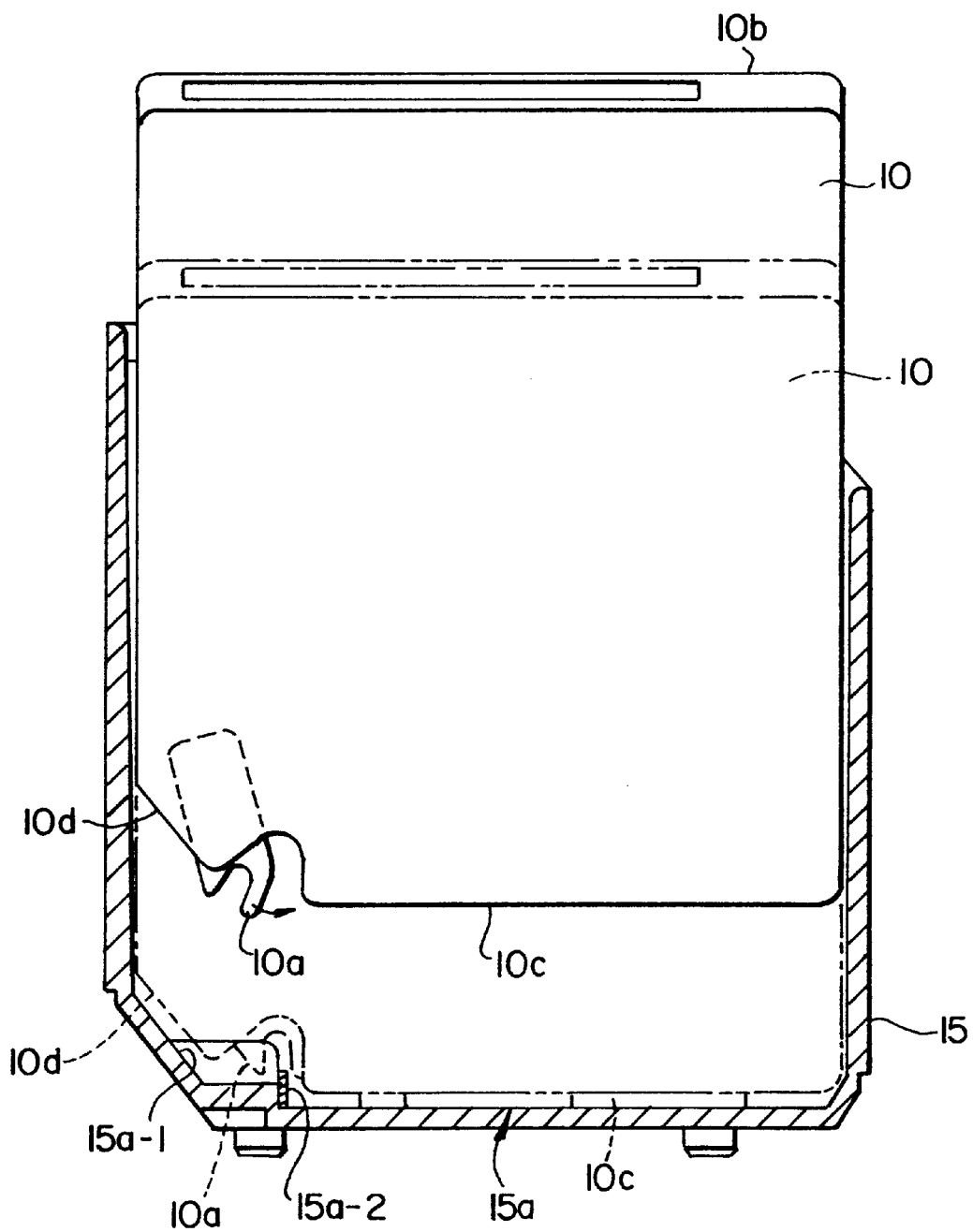
FIG. 24 is a horizontal cross-sectional view useful for describing a function of the leader block pushing structure according to the present invention.

FIG. 21 is a horizontal cross-sectional view showing the magazine 15 having these structures, FIGS. 22 and 23 are a horizontal cross-sectional view and vertical cross-sectional view for describing the operation of an engaging surface 15a-1 for a chamfered portion, and FIG. 24 is a horizontal cross-sectional view for explaining the operation of a leader block pushing projection 15a-2.

In this embodiment the magnetic tape cartridge 10 is, for example, of the 13480 type, and as shown in FIGS. 21 to 24, when the cartridge 10 is positioned in each cell 15a of the magazine 15, the cartridge 10 is inserted from its rear surface 10c side. A chambered portion 10d for housing the leader block 10a is formed between a rear surface 10c of the cartridge 10 and a left-hand side surface 10h-1 as one faces the rear surface 10c.

Two projections 10f-1 and 10f-2 are formed in parallel on a bottom surface of the cartridge 10 in the insertion direction of the cartridge 10. The projections 10f-1, 10f-2 are located so that the separation between the right-hand projection 10f-2 and a right-hand side surface 10h-2 is larger than the separation between the left-hand projection 10f-1 and a left-hand side surface 10h-1.

Still further, a tapered surface 10g is provided between the front surface 10b and bottom surface 10e of the cartridge 10, and positioning grooves 10i are formed on the front end side (near the tapered surface 10g) of the right- and left-hand side surfaces 10h-1.

Reference numeral 10j designates a top surface of the cartridge 10. Further, the leader block 10a is rotated about one rotational supporting point and is housed and locked through via the configuration and elasticity of the case of the cartridge 10 (FIG. 10).

As shown in FIGS. 21 to 24, a corner portion inside each cell 15a between a left-hand side surface and back surface of the magazine is made to protrude inwardly. Further, the engaging surface 15a-1 is formed to engage with the chamfered portion 10d of the cartridge 10 when the cartridge 10 is inserted in the normal condition (FIG. 21). In contrast, when the cartridge is inserted in an improper orientation, the engaging surface makes the cartridge 10 protrude outside the normally housed position within the magazine 15 (FIG. 22).

Furthermore, each cell 15a is provided with a leader block pushing projection (contact portion) near the engaging surface 15a-1. When the cartridge 10 is inserted in the normal condition, the projection 15a-2 contacts the tip portion of the leader block 10a, rotating the leader block 10a within the housing and thereby ensuring that the leader block is properly locked in the cartridge.

Due to the aforesaid construction, if the cartridge 10 is inserted in the magazine 15 in the normal condition (FIG. 21), the chamfered portion 10d of the cartridge 10 engages the engaging surface 15a-1 allowing the cartridge 10 to be completely inserted into the cell 15a. If each cartridge 10 is completely inserted into the cells 15a, the magazine 15 may be positioned in the DEE 12 without any trouble.

On the other hand, if a cartridge 10 is inserted into the magazine 15 in an improper orientation (FIG. 22), the corner between the side surface 10h-2 and front surface 10b of the cartridge 10 cannot engage with the engaging surface 15a-1 within the cell 15a. In this event, as shown in FIG. 22, the cartridge 10 is held in a state in which its rear surface 10c side protrudes outwardly by approximately 10 mm with respect to the normal housing position.

The separation between the inner surface of the shutter 21 and the cartridge 10 housed in the normal condition is small as shown in FIG. 21. Accordingly, if at least one cartridge 10 protrudes outwardly, the protruding portion (rear surface 10c side) of the cartridge 10 and the inner surface of the shutter 21 interfere with each other. In this event, the magazine 15 cannot be shifted to the fitting position of the magazine holding lever 28a and the hole 15g, and cannot be engaged in the DEE 12. Thus, the operator can recognize the erroneous insertion of the cartridge 10, thereby assuredly preventing the erroneous insertion of the cartridge 10.

On the other hand, if the operator notices that the leader block 10a is out of place (FIG. 24) when inserting the cartridge 10 in the magazine 15, the operator may reengage the leader block by simply pressing the cartridge 10 toward the magazine 15. The pressing of the cartridge causes the tip portion of the leader block 10a to contact the projection 15a-2, rotating and reengaging the leader block 10a in the cartridge 10.

Furthermore, as a matter of routine operation, the cartridge 10 is always pushed to the interior of the magazine 15 by the accessors 7A, 7B when they arrive to remove a cartridge 10. In this manner, proper seating of the leader block is assured.

As described above, the DEE 12 of the present invention is provided with an engaging surface 15a-1 in the cell 15a of the magazine 15 to prevent the erroneous insertion of the cartridge 10 into the magazine 15. Further, the structure is realizable with a simple arrangement without the addition of a special mechanism, that is, only by slightly altering the inner surface configuration of the magazine 15.

Moreover, the number of interruptions due to leader block related faults are reduced because the leader block 10a can assuredly be pushed in the cartridge 10 by the leader block pushing projection 15a-2. Accordingly, the DEE 12 of the present invention assures more effective use of a library apparatus.

Description of a Magazine Positioning Structure

When the accessors 7A, 7B take out/insert the cartridge 10 from the magazine 15, they optically read sensor targets 19a, 19b (see FIGS. 25 to 28 and 30) to recognize the position of the magazine 15 (cartridge 10). Accordingly, to assure the removal of a cartridge 10 from the magazine 15 by the accessors 7A, 7B, the magazine 15 must be oriented in a position within a constant allowable range with respect to the DEE 12, and the magazine 15 must be oriented in a predetermined position between the sensor targets 19a, 19b.

For these reasons, in this embodiment, positioning structures are provided on upper and lower sides of the magazine 15, respectively, and the sensor targets 19a, 19b are integrally mounted on the upper and lower positioning structures, respectively. Referring to FIGS. 25 to 31, a detailed description will be made below of the positioning structures of the magazine 15.

Figure 26:
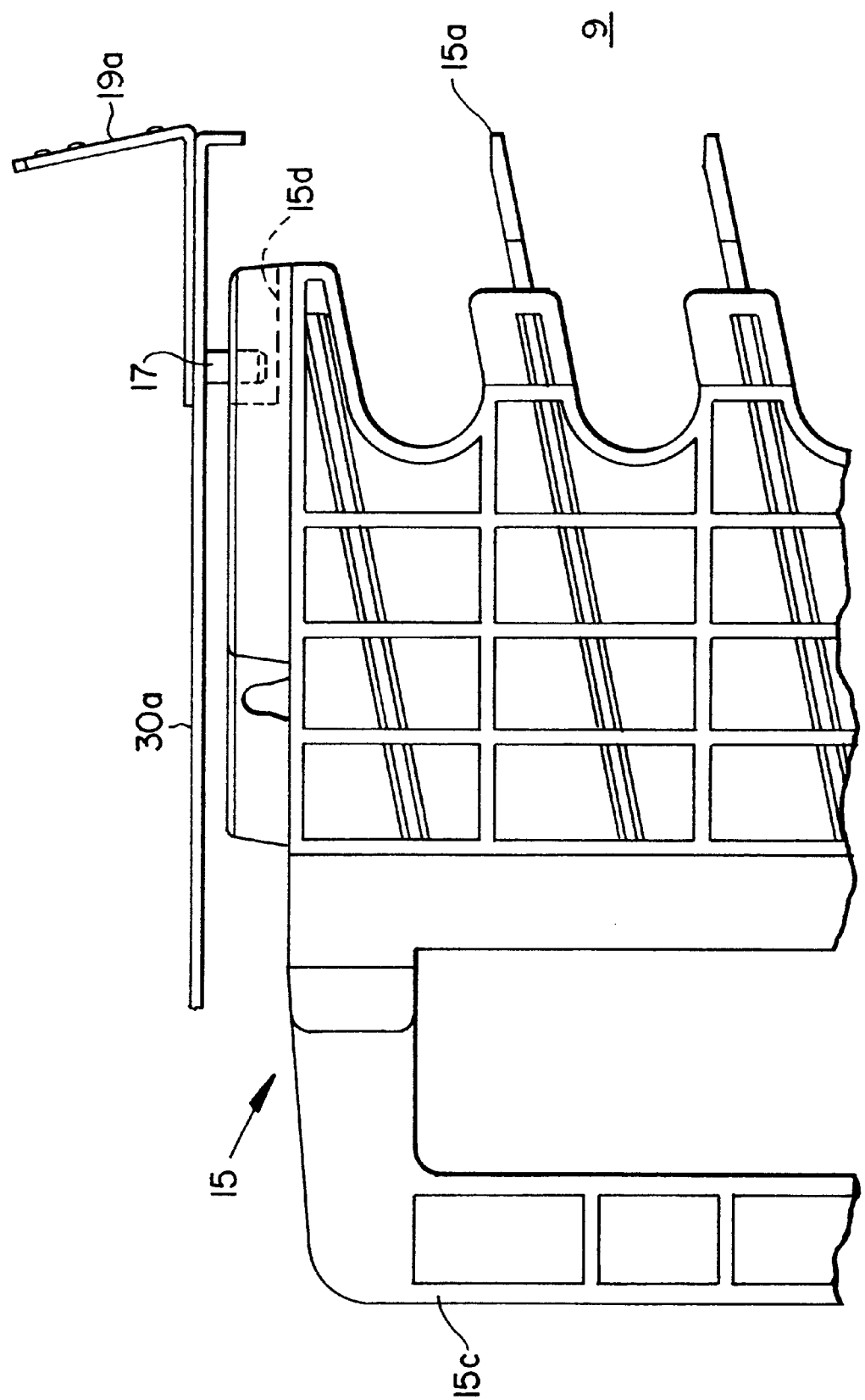
FIG. 26 is a side elevational view showing the positioning structure on the upper side of the magazine according to the present invention.
Figure 27:
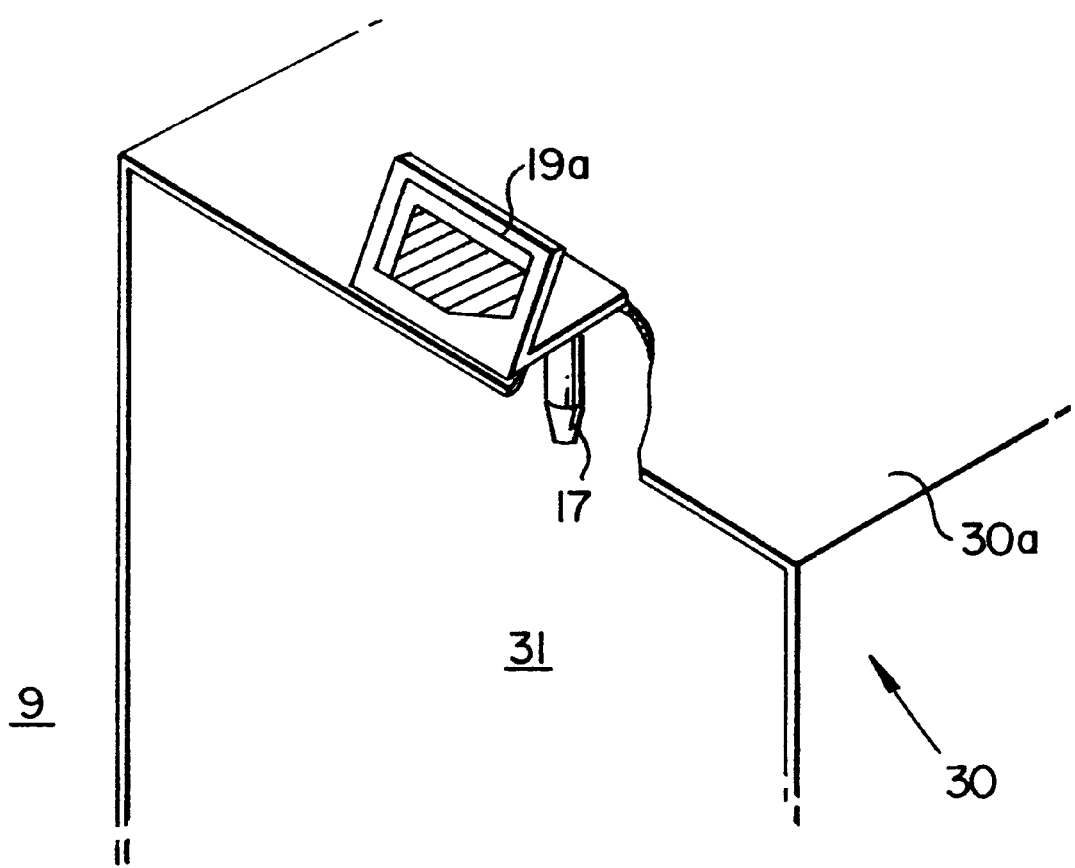
FIG. 27 is a partially broken perspective view showing a principal portion of the positioning structure on the upper side of the magazine according to the present invention.
Figure 28:
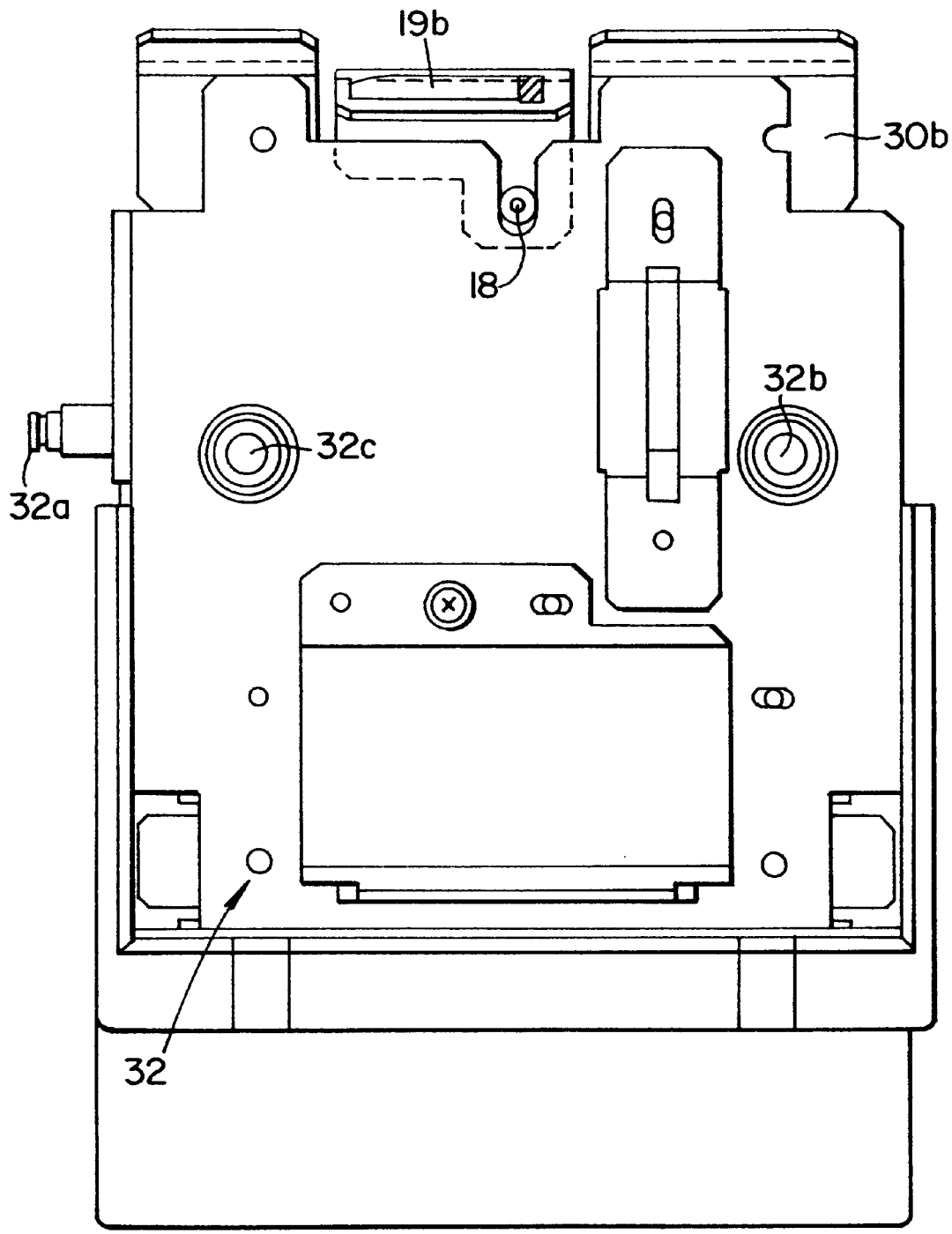
FIG. 28 is a plan view showing a positioning structure on the lower side of the magazine according to the present invention.
Figure 29:
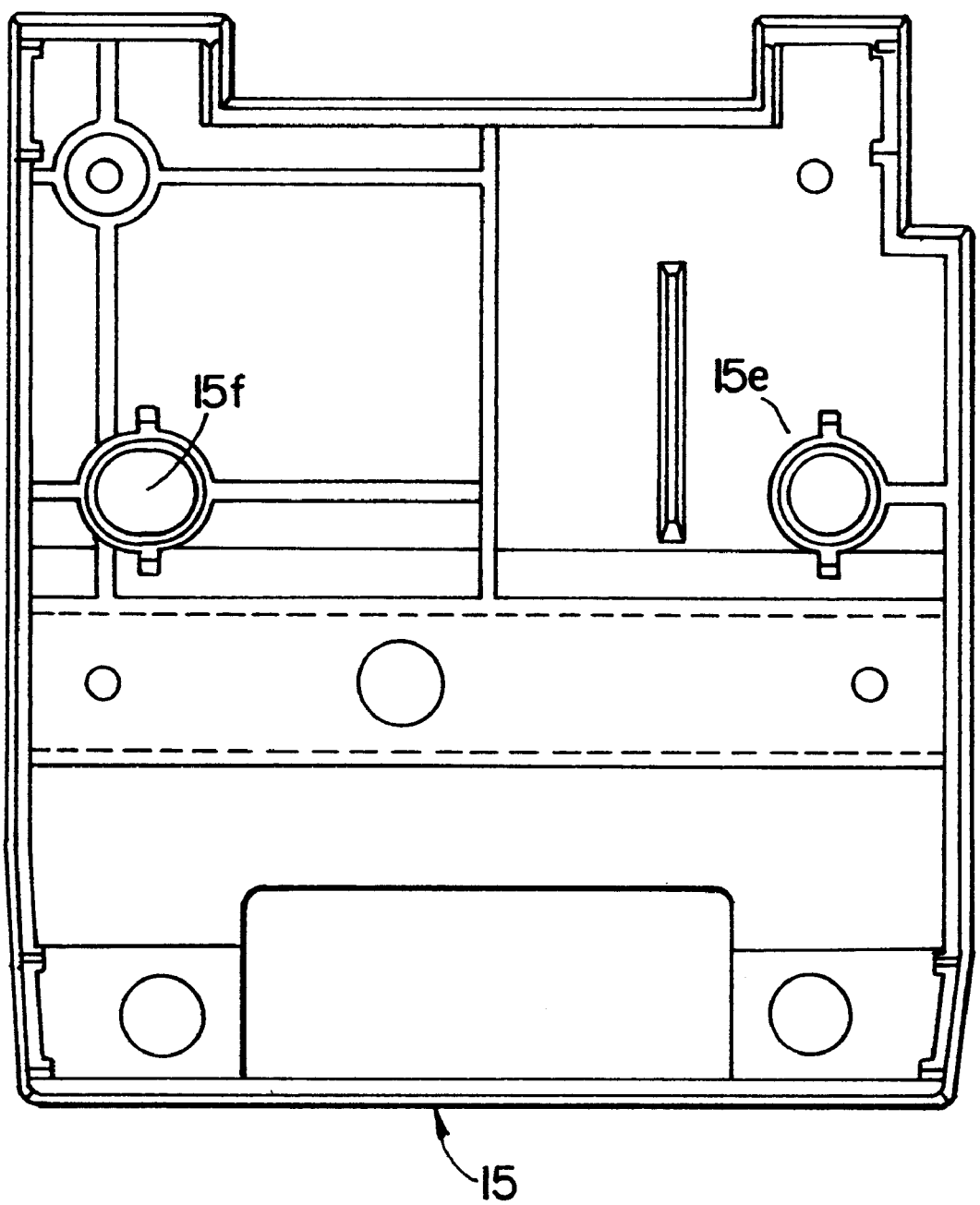
FIG. 29 is a plan view showing a bottom surface of the magazine according to the present invention.
Figure 30:
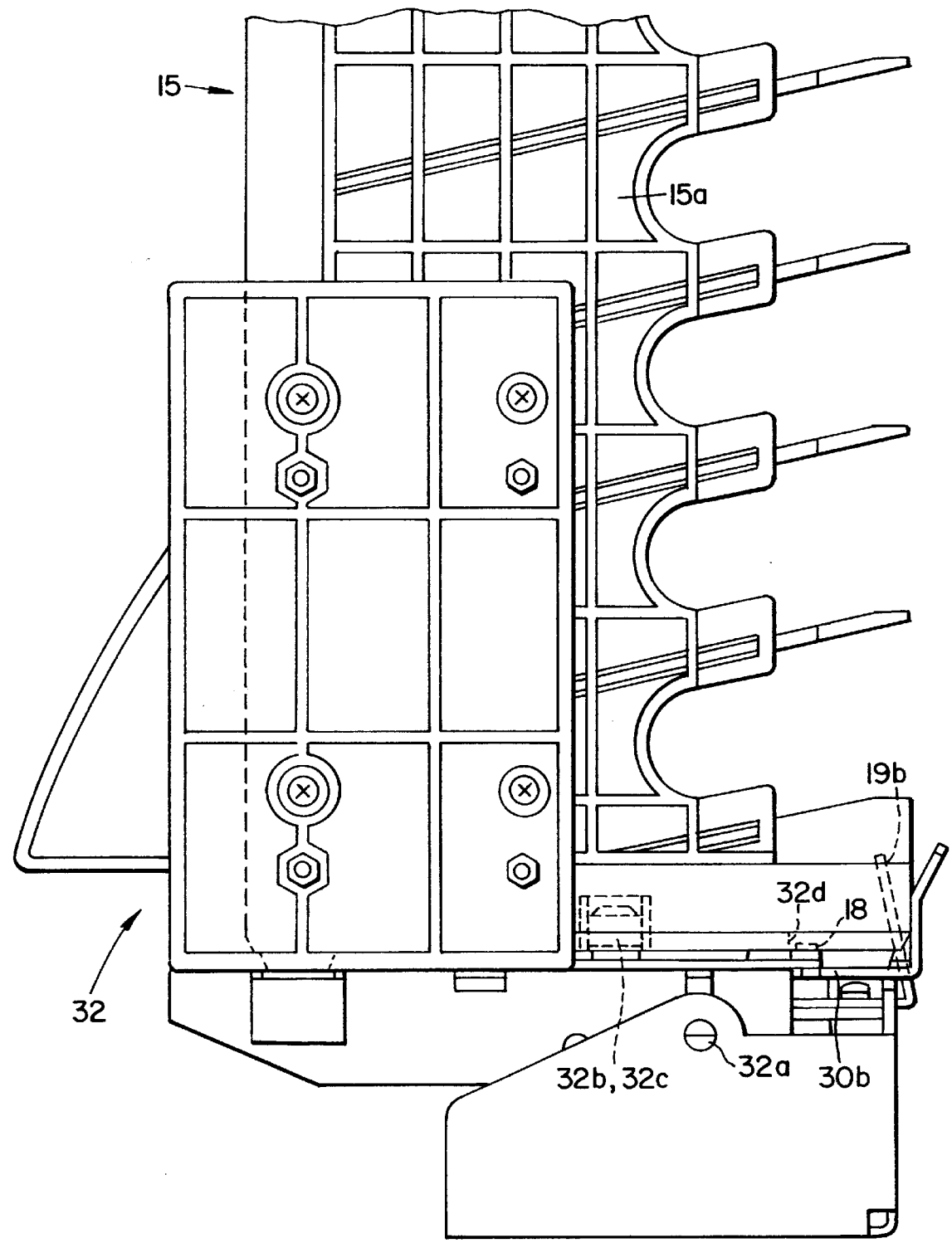
FIG. 30 is a side elevational view showing the positioning structure on the lower side of the magazine according to the present invention.
Figure 31:
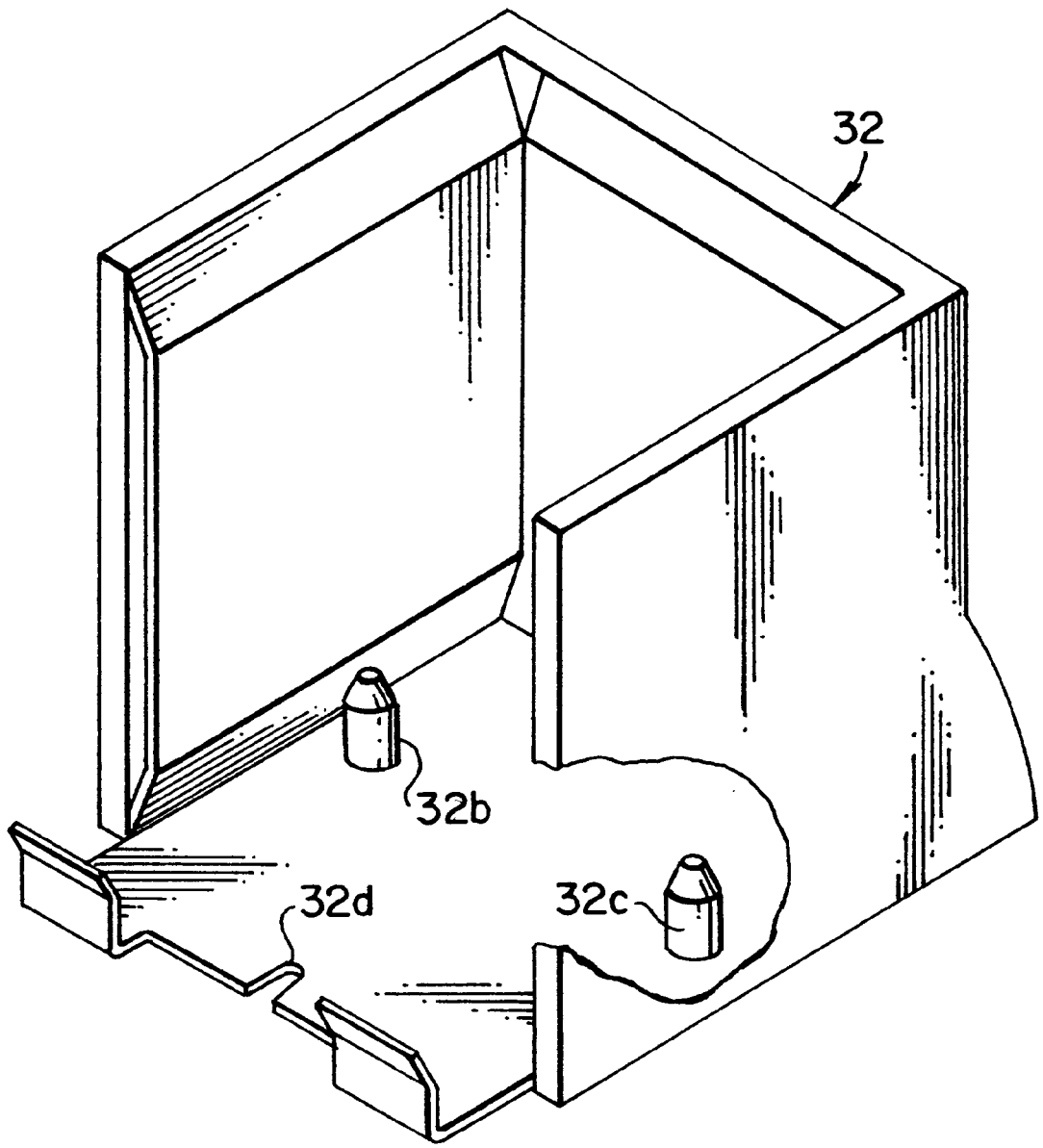
FIG. 31 is a partially broken perspective view showing a principal portion of the positioning structure of the magazine according to the present invention.

FIGS. 25 to 27 are illustrations of the positioning mechanism of the magazine 15.

As shown in FIGS. 25 to 27, the magazine positioning pin 17 is fitted to the top board 30a of the mechanical unit 30 to protrude downwardly (the communication space 31) from a position close to the operating space 9. Further, the upper sensor target 19a is formed integrally with the magazine positioning pin 17 and located on the top board 30a to turn to the operating space 9 side. Moreover, the magazine positioning pin 17 engages with a positioning groove (engaging portion) 15d made in the top surface of the magazine 15, thereby determining the holding position (set position) of the magazine 15 with respect to the sensor target 19a.

Furthermore, as shown in FIGS. 28 to 31, a tray positioning pin 18 is fitted to the bottom board 30b of the mechanical unit 30 to protrude upwardly into the communication space 31 from a position close to the operating space 9. In addition, the lower sensor target 19b is formed integrally with the tray positioning pin 18, on the bottom board 30b to face the operating space 9 side. The tray positioning pin 18 engages the positioning groove (engaging portion) 32d formed in the bottom board of the tray 32, thus determining the set position of the tray 32 with respect to the sensor target 19b.

Still further, the pair of right and left magazine positioning pins 32b, 32c are formed on the bottom board of the tray 32 to protrude upwardly. These magazine positioning pins 32b, 32c engage with the positioning holes (engaging portions) 15e, 15f made in the bottom surface of the magazine 15, respectively, thus determining the mounting position of the magazine 15 on the tray 32.

The accessors 7A, 7B detect the position and skew of the magazine 15 using the upper sensor target 19a and the lower sensor target 19b. In particular, the accessors 7A, 7B detect the positional differences in the right and left directions by using the upper sensor target 19a, and detect the positional differences in the right and left directions and in the vertical directions by using the lower sensor target 19b.

With this arrangement, when the operator sets the magazine in the DEE 12, on the upper side of the magazine 15, the magazine positioning pin 17 engages with the positioning groove 15d as shown in FIGS. 25 and 26 thereby determining a given orientation of the magazine 15 with respect to the sensor target 19a. At the same time, on the lower side of the magazine 15, the magazine positioning pins 32b, 32c engage with the positioning holes 15e, 15f, respectively (FIG. 30), thereby determining the mounting position of the magazine 15 with respect to the tray 32. Meanwhile, the tray positioning pin 18 engages with the positioning groove 32d, thereby determining the set position of the tray 32 relative to the sensor target 19b.

Since as described above the positioning pin 17 and the sensor target 19a are in a fixed relation to each other on the upper side of the magazine 15, the positional difference of the magazine 15 with respect to the sensor target 19a depends upon the accuracy of only one part. In addition, on the lower side of the magazine 15, the positional difference of the magazine 15 relative to the sensor target 19b depends upon the accuracy of two parts (the positioning pins 32b (32c) and 18) and surely lies in the allowable range. Accordingly, the magazine 15 can be positioned within the allowable range with respect to the mechanical unit 30 (DEE 12) where the delivery and reception of the cartridges 10 between the magazine 15 and the accessors 7A, 7B are possible.

Description of a Second Shutter Locking Mechanism and a Mechanical Unit Locking Mechanism In the DEE 11 of the present invention, the action of the shutter unit makes it possible to prevent an operator from inserting a hand or the like into the operating space 9, even if the mechanical unit 30 is in the detached condition. In addition, by providing the DEE 11 with a second shutter locking mechanism 45 (FIGS. 32 and 33) it is possible to inhibit a person from opening the shutter 21 at the detachment of the mechanical unit 30. Still further, the pair of upper and lower mechanical unit locking mechanisms 70, 75 (see FIGS. 34 to 36) inhibit a person from detaching the mechanical unit 30 at the opening of the shutter 21, still further enhancing operator safety. Referring to FIGS. 32 to 36, a detailed description will now be made of the locking mechanisms 45, 70 and 75.

Description of a Second Shutter Locking Mechanism

Figure 32:
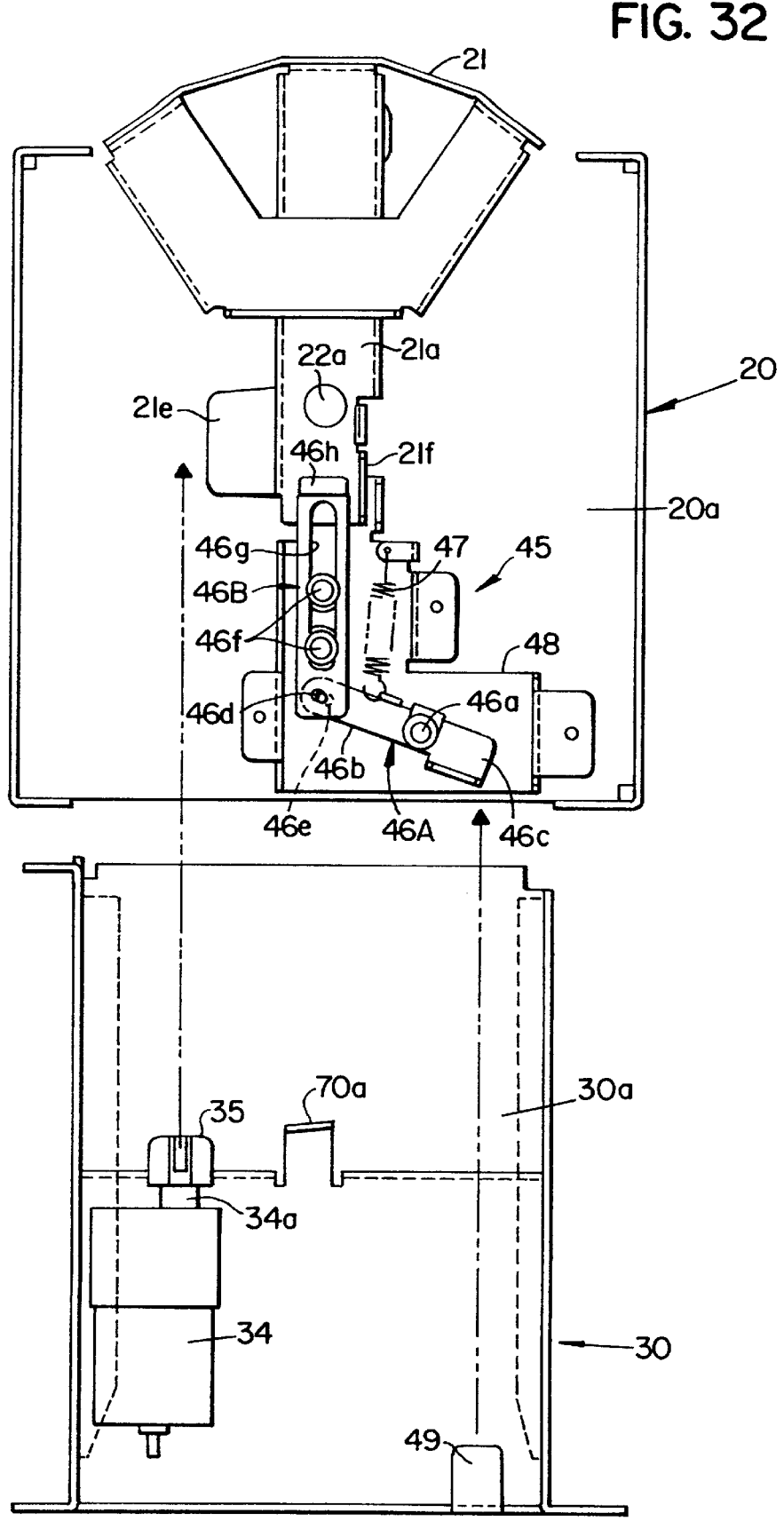
FIG. 32 is a plan view showing a locking condition of a second shutter locking mechanism according to the present invention.
Figure 33:
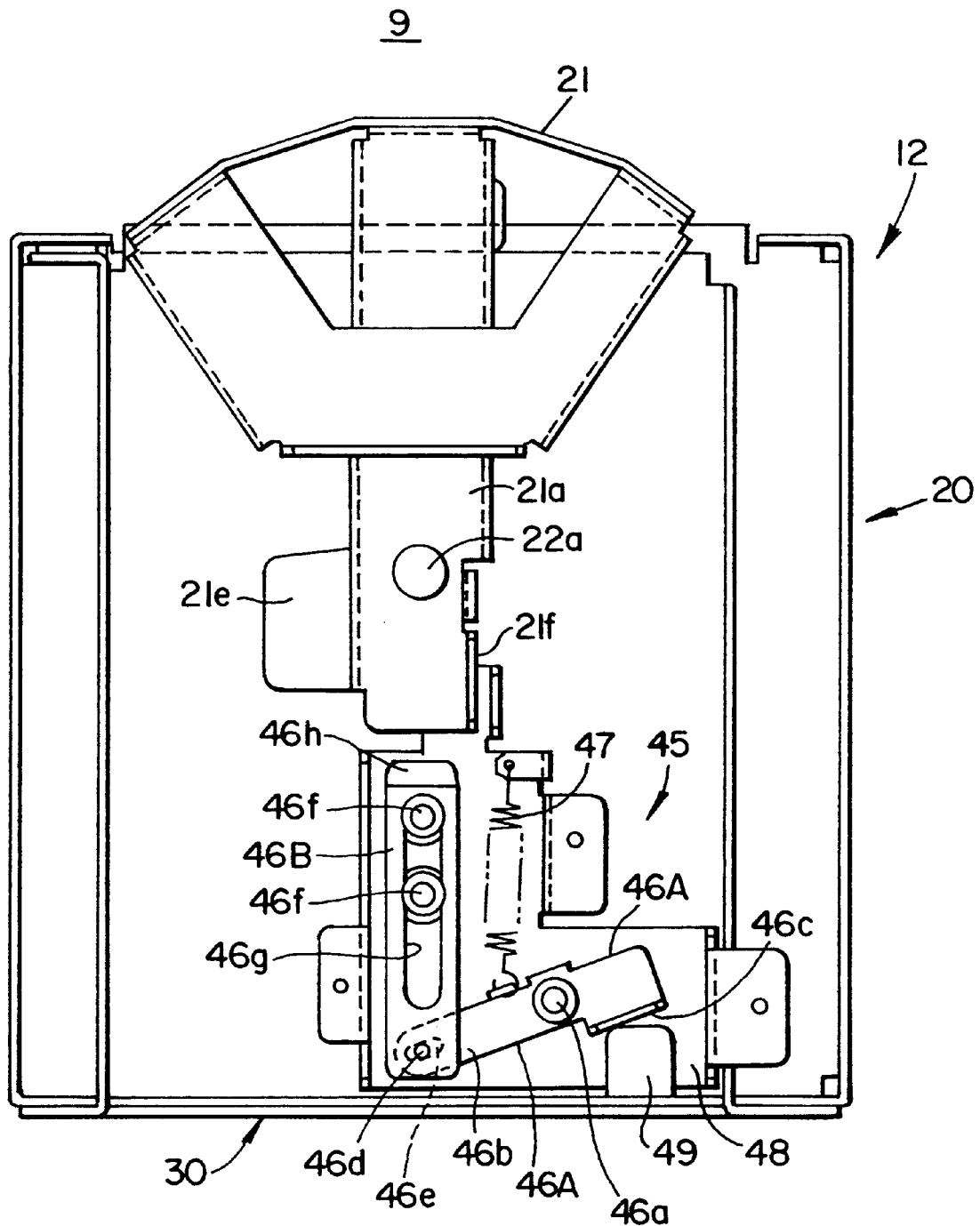
FIG. 33 is a plan view showing an unlocking condition of the second shutter locking mechanism according to the present invention.

As shown in FIGS. 32 and 33, the second shutter locking mechanism 45 inhibits (locks) the opening of the shutter 21 when the mechanical unit 30 is detached from the shutter unit 20. Correspondingly, the second shutter locking mechanism 45 permits (unlocks) the opening of the shutter 21 when the mechanical unit 30 is attached to the shutter unit 20. The second shutter locking mechanism 45 is made up of a shutter locking contact portion 21f formed on the supporting plate 21a of the shutter 21, a shutter lock-releasing projection 49 fitted to the mechanical unit 30, shutter locking levers 46A, 46B attached to the lower surface of the top board 20a of the shutter unit 20, and a spring 47. The shutter locking contact portion 21f is formed by bending part of the supporting plate 21a upwardly on the side opposite to the shutter 21 with respect to the rotary shaft 22a.

The shutter locking lever 46A is rotatably fitted to the lower surface of the top board 20a through a rotary shaft 46a of the shutter unit 20 to be rotatable within a plane of the supporting plate 21a. At one end side portion of this lever 46A there is formed a shutter lock-releasing contact portion 46c that contacts the shutter lock-releasing projection 49. Further, the lever 46A has an elongated hole 46e formed in its other end side portion (end portion 46b), and an end portion 46b of the lever 46A is connected to the shutter locking lever 463 through a connecting pin 46d penetrating the elongated hole 46e.

The proximal side of the lever 46B is connected to the lever 46A, whereas the tip side portion thereof has a shutter locking contact portion 46h formed to contact the shutter clocking contact portion 21f of the supporting plate 21a. In addition, the lever 46B has an elongated hole 46g therein, and is swingably fitted to a cover 48 through two pins 46f. With this mechanism, the rotational movement of the lever 46A is converted into the forward and backward linear movements of the lever 46B. The cover 48 is attached to the lower surface of the top board 20 to cover the second shutter locking mechanism 45 from below.

Moreover, the levers 46A and 46B are biased in the direction of the locking position by the spring 47 (FIG. 32). In the locking position, the contact portion 46h of the lever 46B is situated within the rotating area of the contact portion 21f of the supporting plate 21a. Moreover, in this state the contact portion 46h is brought into contact with the contact portion 21f to regulate the opening operation of the shutter 21.

Figure 34:
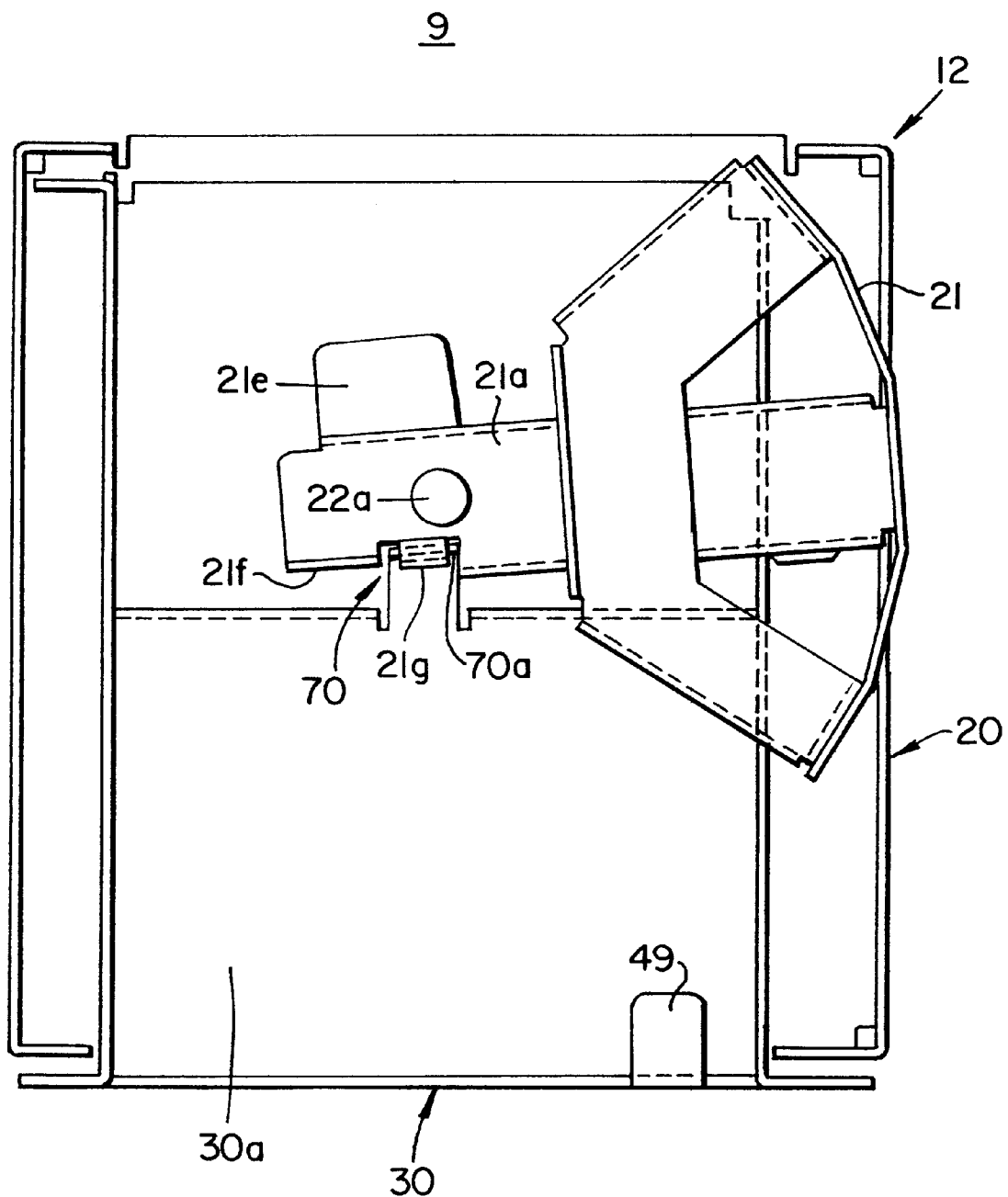
FIG. 34 is a plan view showing a locking condition of a mechanical unit locking mechanism on the upper side of the shutter according to the present invention.

In FIG. 32, reference numeral 71a represents a mechanical stopper formed on the top board 30a to constitute the mechanical unit locking mechanism 70 (see FIGS. 34, 36).

Furthermore, when the mechanical unit 30 is installed to the shutter unit 20 or when the mechanical unit 30 is detached from the shutter unit 20, the above-mentioned magazine holding mechanism 28 or the shutter locking mechanism 40 is located below the aforesaid second shutter locking mechanism 45 (the cover 48), and therefore it does not interfere with the second shutter locking mechanism 45.

With the above-described arrangement, when the mechanical unit 30 is detached from the shutter unit 20 in a state where the communication space 31 is closed by the shutter 21 from the operating space 9 side as shown in FIG. 32, the levers 46A, 46B receive the biasing force of the spring 47 to be placed at the locking position. At this locking position, the contact portion 46b of the lever 46B and the contact portion 21e of the supporting plate 21a come into the contacting relation to each other to cause the shutter 21 to be locked, thus inhibiting the opening operation of the shutter 21.

Furthermore, when the mechanical unit 30 is attached to the shutter unit 20, the projection 49 of the mechanical unit 30 come into contact with the contact portion 46c of the lever 46A. The pushing of the contact portion 46c rotates the lever 46A counterclockwise against the biasing force of the spring 47, and places the lever 46A in the unlocked position (FIG. 33). In the unlocked position, the contact portion 46h of the lever 46B retreats from the rotating area of the contact portion 21f of the supporting plate 21a. Accordingly, the contact portion 21f and the contact portion 46h no longer interfere with one another, and the shutter 21 may be opened.

Description of Mechanical Unit Locking Mechanisms

Figure 35:
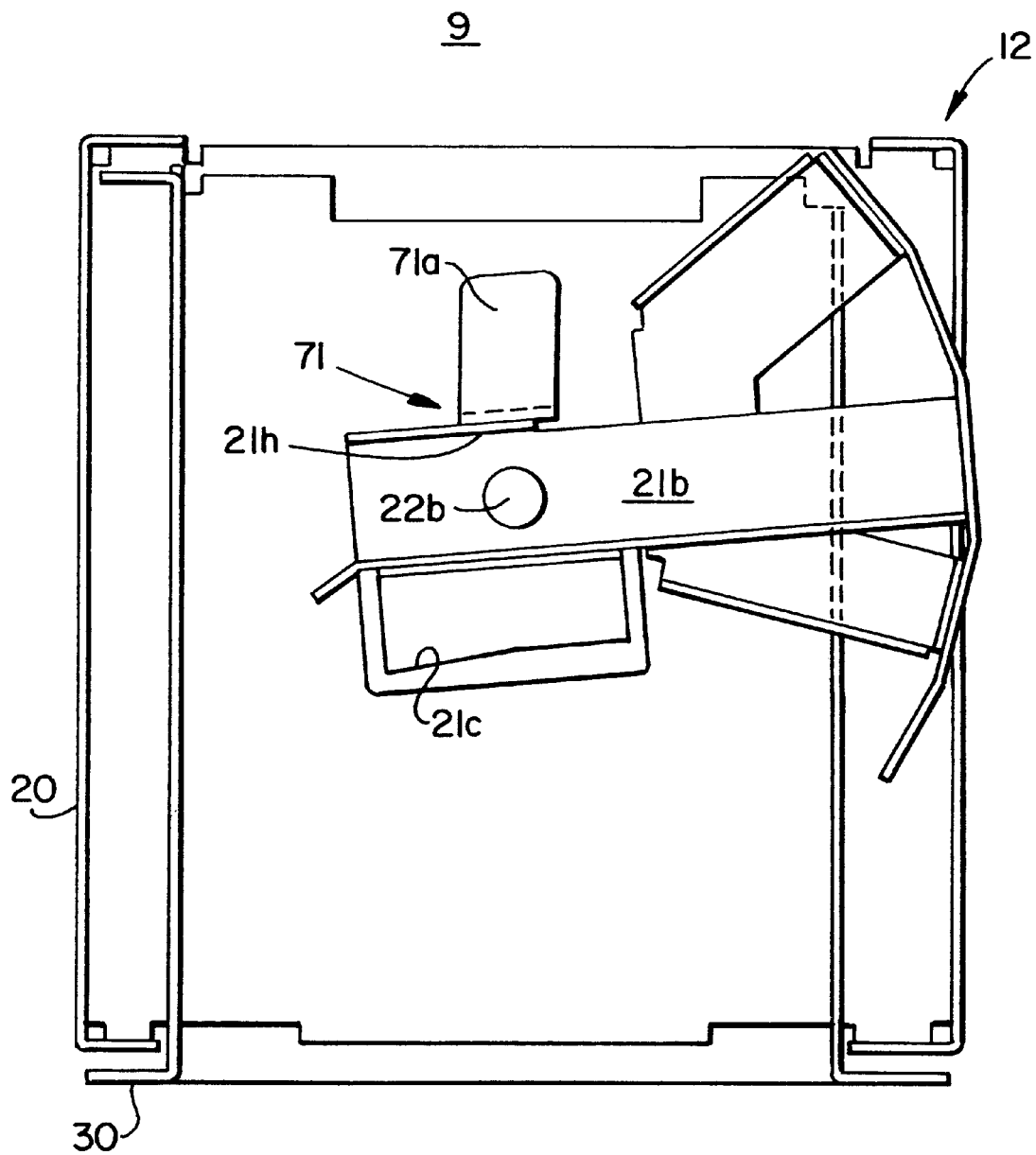
FIG. 35 is a plan view showing a locking condition of a mechanical unit locking mechanism on the lower side of the shutter according to the present invention.

FIGS. 34 to 36 are illustrations of mechanical unit locking mechanisms 70, 71 placed on the upper and lower sides of the shutter 21. In particular, FIG. 34 is a plan view showing the locking condition of the upper mechanical unit locking mechanism 71, FIG. 35 is a plan view showing the locking condition of the lower mechanical unit locking mechanism 71, and FIG. 36 is a partially broken side elevational view showing the locking conditions of the upper and lower mechanical unit locking mechanisms 70, 71.

In FIG. 34, the top board 20a of the shutter unit 20, the drive motor 34, the gear mechanism 23, and the locking mechanisms 40, 45 are omitted to illustrate only the portions relating to the upper mechanical unit locking mechanism 70. Further, in FIG. 35, the bottom board 30b of the mechanical unit 30 is omitted to show only the portions concerned with the lower mechanical unit locking mechanism 71.

Both the mechanical unit locking mechanisms 70 and 71 inhibit (lock) the detaching operation of the mechanical unit 30 from the shutter unit 20 when the shutter 21 is in the open condition. Correspondingly, the mechanical unit locking mechanisms 70 and 71 allow (unlock) the detaching operation when the shutter 21 is in the closed condition.

As shown in FIGS. 34 and 36, the upper mechanical unit locking mechanism 70 includes a stopper 71 formed on the top board 30c of the mechanical unit 30 to turn upwardly, and a mechanical unit locking contact portion 21g formed on the supporting plate 21a to turn downwardly. The lower mechanical unit locking mechanism 71 is made up of a stepper 71 provided on the bottom board 300b of the mechanical unit 30 to turn downwardly and a mechanical unit locking contact portion 21h formed on the supporting plate 21b to turn upwardly.

As shown in FIGS. 34 to 36, the contact portions 21g, 21h are respectively formed on the supporting plates 21a, 21b to be placed to face mechanical stoppers 70a, 71a on the mechanical unit 30 side from the external space side when the shutter 21 is in the open condition. In addition, the contact portions 21g, 21h are respectively formed on the supporting plates 21a, 2b to retreat from the external space side (the area through which the mechanical stoppers 70a, 71a pass at the detachment of the mechanical unit 30) of the mechanical stoppers 70a, 71a in accordance with the closing operation of the shutter 21 when the shutter 21 comes into the closed condition.

With the above-described arrangement, when the shutter 21 is in the open condition, since, as shown in FIGS. 34 to 36, the contact portions 21g, 21h are respectively located to be in an opposed relation to the mechanical steppers 70a, 71a from the external space side, the mechanical steppers 70a, 71a interfere with these contact portions 21g, 21h, respectively, thus regulating the detaching operation of the mechanical unit 30 from the shutter unit 20.

Furthermore, when the shutter 21 is in the closed condition, the mechanical unit 30 may be detached from the shutter unit 20. Notably, when the shutter 21 is in the closed condition, the contact portions 21g, 21h retreat from the external space side of the mechanical stoppers 70a, 71a, such that no interference with the mechanical stoppers 70a, 71a of the mechanical unit 30 occurs.

Thus, in the DEE 12 according to this embodiment, the second shutter locking mechanism 45 inhibits the opening operation of the shutter 21 at the detachment of the mechanical unit 30. Further, the mechanical unit locking mechanisms 70, 71 inhibit the detaching operation of the mechanical unit 30 in the opening condition of the shutter 21. Thus, the combination of the second shutter locking mechanism 45 and the mechanical unit locking mechanisms 70, 71 assuredly prevent an operator from inadvertently accessing the operating space 9. Thus, operator safety is assured even if the mechanical unit 30 is detached for the maintenance of the DEE 12. Moreover, these safety features prevent the mechanical unit 30 from being detached by mistake when the shutter 21 is in the open condition. In addition, the above-described locking/unlocking functions are readily realizable using a mechanical means linked with the operation of the shutter 21 or the detaching operation of the mechanical unit 30.

Incidentally, the rotary shutter 21 may be locked using an electrical locking method or a mechanical locking method. However, the use of an electrical locking method is disadvantageous due to cost considerations and the probability of failure. Likewise, the use of a mechanical locking method is not desirable because of difficulties in ensuring that the rotary shutter is maintained in a locking condition. In contrast, the shutter locking mechanism 45 locks the shutter 21 (in combination with the detaching operation of the mechanical unit 30) using the levers 46A and 46B preferable in every respect including cost, ease of assembly, performance stability and development time.

Description of a Magazine Replacement Operation by a DEE

The CSU 4 includes a plurality of DEEs 12 that operate in one of two modes. In the first mode, the CSU 4 is used as a fixed rack, and the replacement of the magazine 15 (with cartridges 10) is performed after the magazine 15 is first engaged in the DEE 12. In the second mode, however, the replacement of the magazine is frequently performed and the replacement of the magazine 15 is permitted any time a LED indicative of "MAGAZINE REMOVE" is signaled on the control panel 30e of the DEE 12.

Figure 37:
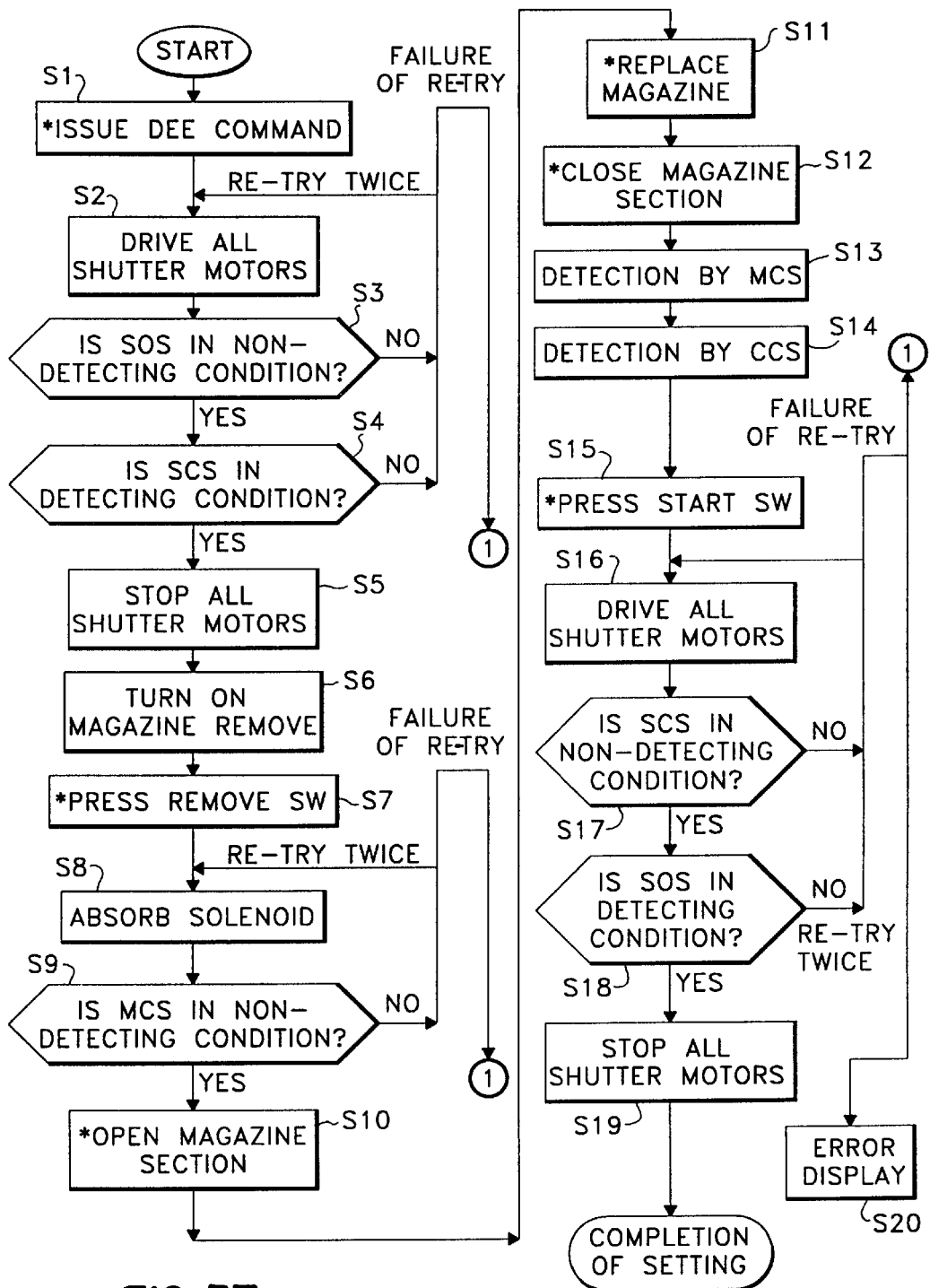
FIG. 37 is a flow chart useful for explaining a basic operation according to this embodiment taken for when the replacement of the magazine is made in a first mode.

First, referring to the flow chart of FIG. 37, a description will be made below of the basic operation for replacement of the magazine in the first mode. In FIG. 37, the steps indicated with the mark "*" signifies the procedures conducted by the operator.

In replacing the magazine 15 in the first mode, the operator first issues a DEE command (step S1) to actuate all the shutter motors 34 in the CSU 4 to close the shutters 21 of all the DEEs 12 (step S2).

At this time, when the controller (not shown) which manages the operation of the library apparatus 1 makes a judgment that (1) a shutter open sensor (not shown) for detecting the completely opened condition of the shutter 21 is in a "NO" detecting condition (the decision "YES" in step S3) and further makes a judgment that (2) a shutter close sensor (SCS; not shown) for detecting the completely closed condition of the shutter 21 is in a detecting condition (the decision "NO" in step S4), the controller stops the operation of all the shutter motors 34 (step S5).

However, when a decision is made that (1) the SOS is in the "NO" detecting condition (the decision "NO" in step S3) or when a decision is made that (2) the SCS is in the "NO" detecting condition (the decision "NO" in step S4), the controller re-tries the drive of all the shutter motors 34 (step S2), re-evaluates the decision regarding the condition of the SOS (step S3) and re-evaluates the decision regarding the condition of the SCS (step S4) twice. Nevertheless, if a decision can be made that the SOS is in the "NO" detecting condition or if a decision can be made that the SCS is in the "NO" detecting condition, an error display takes place (step S20).

In response to stopping the operations of the shutter motors 34, an LED (MAGAZINE REMOVE LED) representative of the fact that the magazine 15 is in the detachable condition goes on the control panel 30e (step S6), and the operator confirms the lighting thereof and actuates a switch (REMOVE SW) on the control panel 30e for the detachment of the magazine 15 (step S7).

On actuating this switch, the magazine releasing solenoid 29 is excited to retract the connecting member 29a upwardly against the biasing force of the spring 28d (step S8). Whereupon, the magazine holding lever 28a and the hole 15g of the magazine 15 is released from engagement so that the MCS 62 of the magazine set condition detecting mechanism 60 gets into the "NO" detecting condition.

Thus, the foregoing controller checks whether or not the MCS 62 is in the "NO" detecting condition (step S9). If a "NO" judgment decision is made regarding the detecting condition, the controller retries (1) retracting the solenoid 29 (step S8); and (2) the decision on the detecting condition of the MCS 62 (step S9) twice. Nevertheless, if a "NO" judgment is made regarding the "NO" detecting condition of the MCS 62, the error display takes place (step S20).

If the decision in step S9 is that the MCS 62 is in the "NO" detecting condition, the operator opens the magazine section of the CSU 4 (step S10) and performs the replacement of the magazine 15 (step S11) and then closes the magazine section (step S12).

Thereafter, the MCS 62 detects the set condition of the magazine 15 (step S13), and the cartridge check sensor (not shown; CCS) detects the fact that the cartridge 10 is housed in the replaced magazine 15 (step S14). After the completion of the detection by the MCS 62 and the CCS, the operator presses a switch (START SW) on the control panel 30e (step S15), so that the accessors 7A, 7B receive a signal indicative of permitting the removal of the cartridge 10 from the DEE 12 and, at the same time, all the shutters motors 34 are put into operation to open all the shutter 21 (step S16).

Furthermore, when the controller makes a decision that the SCS is in the "NO" detecting condition (the decision "YES" in step S17) and makes a decision that the SOS comes is in the detecting condition (the decision "YES" in step S18), the operations of all the shutter motors 34 are stopped, thus completing the operations in the first mode.

However, if a judgment is made that the SCS is in the "NO" detecting condition (the decision "NO" in step S17) or if a judgment is made that the SOS is in the "NO" detecting condition (the decision "NO" in step S18), the controller re-tries: (1) the drive by all the shutter motors 34 (step S16); (2) the decision on the "NO" detecting condition of the SCS (step S17); and (3) the decision on the detecting condition of the SOS (step S18) twice. Nevertheless, if difficulty is experienced in judging that the SCS is in the "NO" detecting condition or that the SOS is in the "NO" detecting condition, the error display takes place (step S20).

Figure 38:
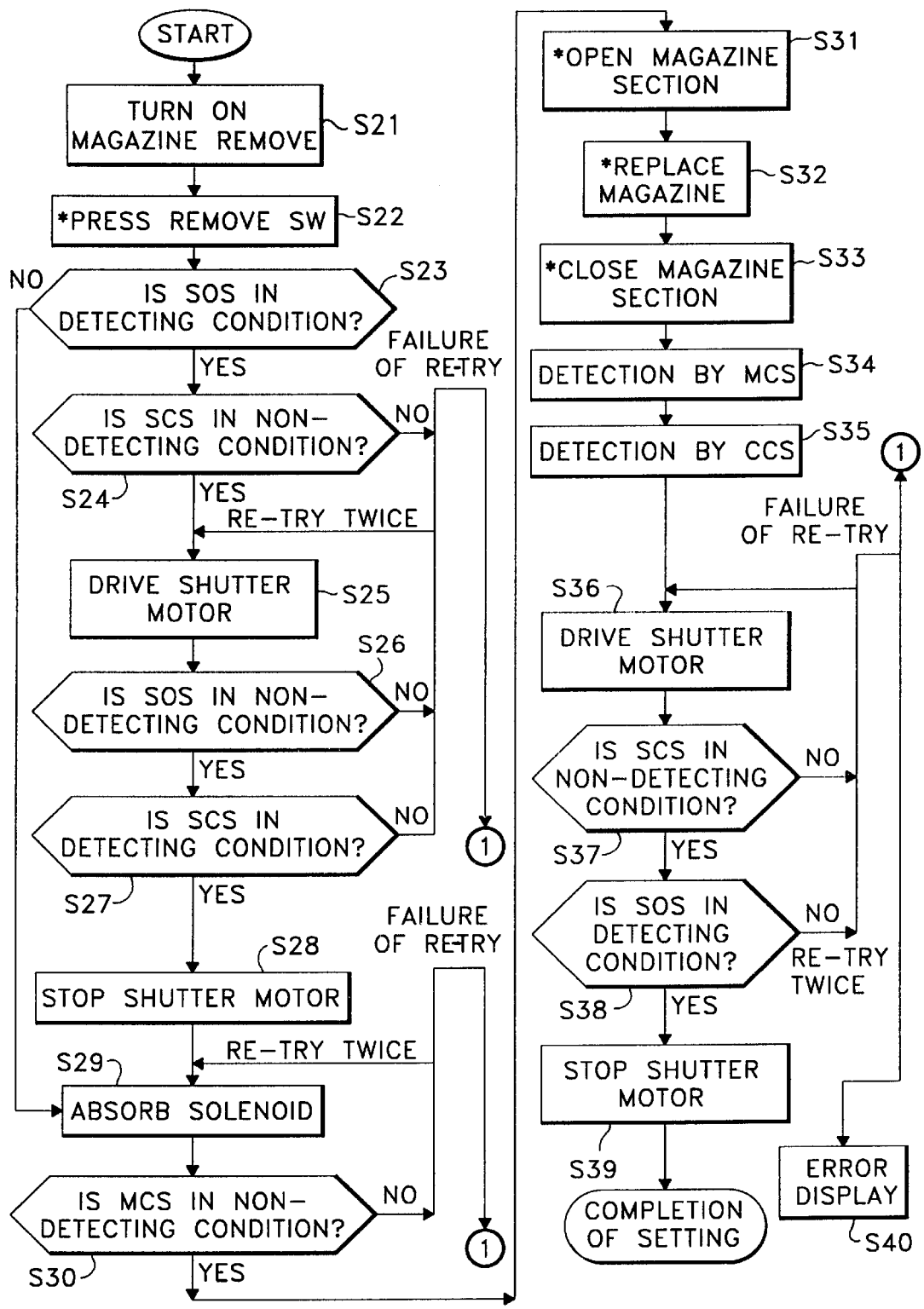
FIG. 38 is a flow chart useful for explaining a basic operation according to this embodiment taken for when the replacement of the magazine is made in a second mode.

Secondly, referring to the flow chart (steps S21 to S40) of FIG. 38, a description will be made of the basic operation taken in the case that the replacement of the magazine 15 is done in the above-mentioned second mode. In FIG. 38, the steps indicated with the mark "*" signify the procedures to be conducted by the operator. This second mode is only for the DEE 12 undergoing the replacement of the magazine 15.

In the case of carrying out the replacement of the magazine 15 in this second mode, the operator confirms the lighting condition of the LED (MAGAZINE REMOVE LED) on the control panel 30e of each of the DEEs 12 (step S21) and then presses the switch (REMOVE SW) on the control panel 30e undergoing the magazine replacement (step S22).

Subsequently, the aforesaid controller checks whether or not the SOS is in the detecting condition (step S23). If the decision is made that the SOS is not in the detecting condition, the operation immediately advances to a step S29 which will be described later. On the other hand, if the decision is made that the SOS is in the detecting condition, the controller checks whether or not the SCS is in the "NO" detecting condition (step S24). If the SCS is in the "NO" detecting condition, the shutter motor is put into operation to close the shutter 21 (step S25). However, if a decision is made that the SCS is in the "NO" detecting condition (the decision "NO" in step S24), the controller re-tries the same decision (step S24) twice. Nevertheless, in the case that the decision is made that the SCS is in the "NO" detecting condition, an error display takes place (step S40).

At the closing operation of the shutter 21, when the controller judges that the SOS has entered a "NO" detecting condition (the decision "YES" in step S26) and decides that the SCS has entered a detecting condition (the decision "YES" in step S27), the controller stops the operation of the shutter motor 34 (step S27). However, if a judgment is made that the SOS is in the "NO" detecting condition (the decision "NO" in step S26) or if a judgment is made that the SCS is in the "NO" detecting condition (the decision "NO" in step S27), the controller re-tries: (1) the drive by the shutter motor 34 (step S25); (2) the decision on the detecting condition of the SOS; and (3) the decision on the detecting condition of the SCS (step S27) twice. Nevertheless, in the case that difficulty is encountered in judging that the SOS is in the "NO" detecting condition or that the SCS is in the "NO" detecting condition, the error display is carried out (step S40).

When the shutter motor 34 comes to stop or if a judgment is made in step S23 that the SOS is in the detecting condition, the magazine releasing solenoid 29 undergoes the excitation. As a result, the magazine holding lever 28a retracts upwardly against the biasing force of the spring 28d (step S29), releasing the magazine holding lever 28a from engagement with the hole 15g so that the MCS 62 of the magazine set condition detecting mechanism 60 gets into the "NO" detecting condition.

Thus, the controller checks whether or not the MCS 62 is in the "NO" detecting condition (step S30). If a "NO" decision is made regarding the detecting condition, it re-tries the absorption by the solenoid (step S29) and the decision on the detecting condition of the MCS 62 (step S30) twice. Nevertheless, if a decision is made that the MCS 62 is in the "NO" detecting condition, the error display is carried out (step S40).

In the case that the decision of the step S30 is that the MCS 62 is in the "NO" detecting condition, as well as the first mode described before referring to FIG. 37, the operator opens the magazine section of the CSU 4 (step S31), and after the replacement of the magazine 15 (step S32) closes that magazine section (step S32).

Thereafter, the MCS 62 detects the set condition of the magazine 15 (step S34) and the CCS detects that the cartridge 10 is housed in the replaced magazine 15 (step S35). After the completion of the detection by the MCS 62 and the CCS, the shutter motor 34 is automatically put into operation to open the shutter 21 (step S36).

Furthermore, if the controller makes a judgment that: (1) the SCS is in the "NO" detecting condition (the decision "YES" in step S37) and (2) that the SOS is in the detecting condition (the decision "YES" in step S38), the controller stops the operation of the shutter motor 34 (step S39), then completing the operations in the second mode.

However, if a judgment is made that the SCS is in the "NO" detecting condition (the decision "NO" in step S37) or if a judgment is made that the SOS is in the "NO" detecting condition (the decision "NO" in step S38), the controller re-tries: (1) the drive by the shutter motor 34 (step S36); (2) the decision on the "NO" detecting condition of the SCS (step S37); and (3) the decision on the detecting condition of the SOS (step S38) twice. Nevertheless, in the case that the judgment is made that the SCS is in the "NO" detecting condition or that the SOS is in the "NO" detecting condition, the error display is done (step S40).

In operation the cartridge direct entry/exit station (DEE) receives a magazine accommodating plural cartridges 10 in a magazine holding mechanism. The DEE provides selective access to the magazine from one of an operating side and an external space side. Namely, the DEE provides access to the magazine holding mechanism from the operating space side while isolating the magazine holding mechanism from the external space side. Similarly, the DEE provides access to the magazine holding mechanism from the external space side while isolating the magazine holding mechanism from the operating space side. Moreover, the cartridges 10 are not rotated in the communication space 31 while other cartridges are processed by the accessors 7A, 7B.

A preferred embodiment of the cartridge direct entry/exit station of the present invention has been described herein. It is to be understood, of course, that changes and modifications may be made in the embodiment without departing from the true scope and spirit of the present invention as defined by the appended claims.

What is claimed is:

1. A cartridge direct entry/exit station for use in a library apparatus which stores plural storage media cartridges, the library apparatus including a drive unit and a transferring mechanism, said cartridge direct entry/exit station being configured to receive a magazine accommodating a plurality of cartridges, thereby facilitating the simultaneous entry or exit of plural cartridges, said cartridge direct entry/exit station comprising:

a communication space adjacent to an operating space for the transferring mechanism in the interior of the library apparatus and an external space of the library apparatus; and a magazine holding mechanism for holding the magazine in a state where an insertion/removal side of the cartridges is turned to face the operating space within the communication space, without rotating the cartridges within the communication space as other cartridges are processed by the transferring mechanism.

2. A cartridge direct entry/exit station for a library apparatus as defined in claim 1, further comprising:

means for selectively providing (i) access to said magazine holding mechanism from an operating space side while isolating said magazine holding mechanism from an external space side, and (ii) access to said magazine holding mechanism from the external space side while isolating said magazine holding mechanism from the operating space side.

3. A cartridge direct entry/exit station for a library apparatus as defined in claim 2, wherein said selective access means comprises:

a shutter for covering the magazine held by said magazine holding mechanism, from said operating space side; and a drive mechanism for driving said shutter into one of an open and a closed condition.

4. A cartridge direct entry/exit station for a library apparatus as defined in claim 3, further comprising:

a first shutter locking mechanism for inhibiting an opening operation of said shutter when the magazine is not properly engaged with said magazine holding mechanism and for allowing said opening operation thereof when the magazine is properly engaged with said magazine holding mechanism; and a magazine locking mechanism for inhibiting a detaching operation of the magazine when said shutter is in an open condition and for allowing said detaching operation thereof when said shutter is in a closed condition.

5. A cartridge direct entry/exit station for a library apparatus as defined in claim 3, comprising:

a shutter unit including said shutter; and a mechanical unit fitted inside said shutter unit and including said drive mechanism and said magazine holding mechanism, said mechanical unit being configured to be detachable from said shutter unit.

6. A cartridge direct entry/exit station for a library apparatus as defined in claim 5, further comprising:

a second shutter locking mechanism for inhibiting an opening operation of said shutter when said mechanical unit is detached from said shutter unit and for allowing an opening operation of said shutter when said mechanical unit is attached to said shutter unit; and a mechanical unit locking mechanism for inhibiting a detaching operation of said mechanical unit from said shutter unit when said shutter is in an open condition and for allowing a detaching operation when said shutter is in a closed condition.

7. A cartridge direct entry/exit station for a library apparatus as defined in claim 1, wherein an inner surface configuration of the magazine is made to engage with a chamfered portion of a cartridge when the cartridge is inserted in a properly oriented condition while coming into contact with the cartridge to cause the cartridge to protrude outside of its normal storing position when inserted in an improperly oriented condition, thus regulating an insertion orientation of the cartridge into the magazine.

8. A cartridge direct entry/exit station for a library apparatus as defined in claim 1, further comprising:

a plurality of positioning pins fixedly provided to determine a holding position of the magazine by said magazine holding mechanism; and a plurality of engaging portions formed on the magazine to engage with said plurality of positioning pins in a state where the magazine is held by said magazine holding mechanism.

9. A cartridge direct entry/exit station for a library apparatus as defined in claim 8, wherein at least one of said plurality of positioning pins is integrally provided with a sensor target used for recognizing a position of the magazine when said transferring mechanism transfers a cartridge.

10. A cartridge direct entry/exit station for a library apparatus as defined in claim 1, wherein said cartridge accommodates a magnetic tape as the storage medium and has a leader block for drawing out the magnetic tape in the processing section, and the magazine is equipped with a contact portion which comes into contact with the leader block of the cartridge when the cartridge is inserted, whereby the contact portion pushes and reseats the leader block within the cartridge.

11. A cartridge direct entry/exit station for a library apparatus as defined in claim 1, further comprising:

a magazine detecting mechanism for detecting an engagement condition of the magazine with said magazine holding mechanism.

12. A library apparatus which stores a cartridge accommodating a storage medium, the apparatus comprising a drive unit, a transferring mechanism, and a cartridge direct entry/exit station for receiving a magazine accommodating a plurality of cartridges, thereby facilitating the simultaneous entry or exit of the plurality of cartridges, said cartridge direct entry/exit station including:

a communication space adjacent to an operating space for the transferring mechanism in the interior of the library apparatus and an external space of the library apparatus; and a magazine holding mechanism for holding the magazine in a state where an insertion/removal side of the cartridge is turned to face the operating space within said communication space, without rotating the cartridge within the communication space as other cartridges are processed by the transferring mechanism.

13. A library apparatus as defined in claim 12, further comprising:

means for selectively providing (i) access to said magazine holding mechanism from a operating space side while isolating said magazine holding mechanism from the external space side, and (ii) access to said magazine holding mechanism from a external space side while isolating said magazine holding mechanism from the operating space side.

14. A library apparatus as defined in claim 13, wherein said selective access means comprises:

a shutter for covering the magazine held by said magazine holding mechanism, from the operating space side;

a drive mechanism for driving said shutter into one of an open and a closed condition;

a shutter locking mechanism for inhibiting an opening operation of said shutter when the magazine is not in engagement with said magazine holding mechanism and for allowing said opening operation thereof when the magazine is in engagement with said magazine holding mechanism; and a magazine locking mechanism for inhibiting a detaching operation of said magazine when said shutter is in an open condition and for allowing said detaching operation thereof when said shutter is in a closed condition.

* * * * *

UNITED STATES PATENT AND TRADEMARK OFFICE
CERTIFICATE OF CORRECTION

PATENT NO. : 5,940,243
DATED : August 17, 1999
INVENTOR(S) : Kanetsuku et al.

It is certified that error appears in the above-indentified patent and that said Letters Patent is hereby corrected as shown below:

Claim 10, line 2, before "said" insert --a--

Claim 10, line 4, after "magnetic tape in"

delete "the" and insert --a--

Claim 13, line 4, after "mechanism from"

delete "a" and insert --an-- therefor

UNITED STATES PATENT AND TRADEMARK OFFICE
CERTIFICATE OF CORRECTION

PATENT NO. : 5,940,243
DATED : August 17, 1999
INVENTOR(S) : Kanetsuku et al

It is certified that error appears in the above-indentified patent and that said Letters Patent is hereby corrected as shown below:

Claim 13, line 6, before "external" delete "the"

and insert --an-- therefor

Claim 13, line 7, before "external" delete "a"

and insert --the therefor

Signed and Sealed this

Twentieth Day of March, 2001

Attest:

NICHOLAS P. GODICI

*Attesting Officer*    *Acting Director of the United States Patent and Trademark Office*